(12) United States Patent
Damberg et al.

(10) Patent No.: US 9,906,760 B2
(45) Date of Patent: Feb. 27, 2018

(54) NUMERICAL APPROACHES FOR FREE-FORM LENSING: AREA PARAMETERIZATION FREE-FORM LENSING

(71) Applicant: MTT INNOVATION INCORPORATED, Vancouver (CA)

(72) Inventors: Gerwin Damberg, Vancouver (CA); Anders Ballestad, Vancouver (CA); Raveen Kumaran, Burnaby (CA); James Gregson, Vancouver (CA)

(73) Assignee: MTT Innovation Incorporated, Vancouver (CA)

( * ) Notice: Subject to any disclaimer, the term of this patent is extended or adjusted under 35 U.S.C. 154(b) by 0 days.

(21) Appl. No.: 15/406,942

(22) Filed: Jan. 16, 2017

(65) Prior Publication Data

US 2017/0127025 A1   May 4, 2017

Related U.S. Application Data

(63) Continuation of application No. PCT/CA2015/050730, filed on Jul. 31, 2015.

(60) Provisional application No. 62/031,250, filed on Jul. 31, 2014, provisional application No. 62/194,728, filed on Jul. 20, 2015.

(51) Int. Cl.
| | |
|---|---|
| G06K 9/00 | (2006.01) |
| H04N 9/31 | (2006.01) |
| G02F 1/133 | (2006.01) |
| G02B 27/00 | (2006.01) |
| G02B 3/02 | (2006.01) |

(52) U.S. Cl.
CPC ............... *H04N 9/312* (2013.01); *G02B 3/02* (2013.01); *G02B 27/0012* (2013.01); *G02F 1/13306* (2013.01); *H04N 9/3155* (2013.01); *H04N 9/3182* (2013.01)

(58) Field of Classification Search
None
See application file for complete search history.

(56) References Cited

U.S. PATENT DOCUMENTS

| | | | |
|---|---|---|---|
| 8,625,182 B2 * | 1/2014 | Cable ................... | G03H 1/0808 359/9 |
| 9,049,413 B2 * | 6/2015 | Richards .............. | H04N 9/3126 |

(Continued)

FOREIGN PATENT DOCUMENTS

| | | |
|---|---|---|
| WO | 2010039440 A1 | 4/2010 |
| WO | 2012145200 A1 | 10/2012 |

*Primary Examiner* — Soo Park
(74) *Attorney, Agent, or Firm* — Oyen Wiggs Green & Mutala LLP

(57) ABSTRACT

A free-form lens (for example a phase modulator, lens or deformable mirror) may be made to reproduce a light pattern specified by image data. Source regions on the free-form lens are mapped to target regions areas on an image. Areas of the source regions are adjusted to vary the amount of light delivered to each of the target regions. Adjustment of the source areas may be achieved using a L-BFGS optimization which preferably incorporates smoothness and curl regularizers. Embodiments apply parallel processing to obtain control values for a free form lens in real time or near real time. Apparatus may process image data and display an image by controlling a dynamically variable free form lens using the processed image data.

30 Claims, 38 Drawing Sheets

(56) References Cited

U.S. PATENT DOCUMENTS

| | | | | |
|---|---|---|---|---|
| 9,453,970 B2 * | 9/2016 | Blanche | ................. | G02B 26/06 |
| 2011/0122467 A1 * | 5/2011 | Futterer | ............ | G02F 1/133524 |
| | | | | 359/9 |
| 2016/0004219 A1 * | 1/2016 | Leister | .................... | G02B 5/32 |
| | | | | 359/9 |
| 2016/0295178 A1 * | 10/2016 | Damberg | ............. | G03H 1/2294 |
| 2017/0052324 A1 * | 2/2017 | Blanche | ............... | G02B 6/3518 |
| 2017/0085846 A1 * | 3/2017 | Damberg | ............... | G02B 26/06 |

\* cited by examiner

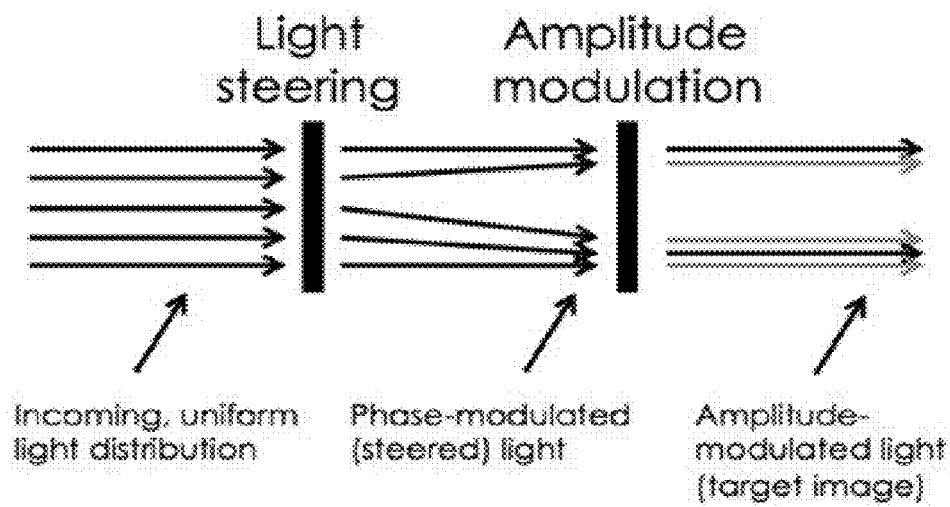
FIG. 1
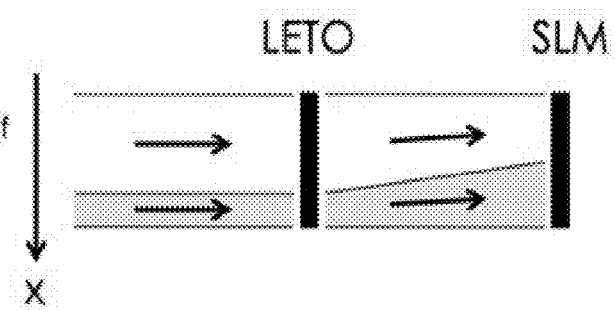
FIG. 2A Spatial illustration of incoming uniform light distribution
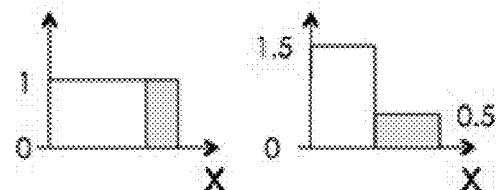
FIG. 2B Intensity distribution across beam

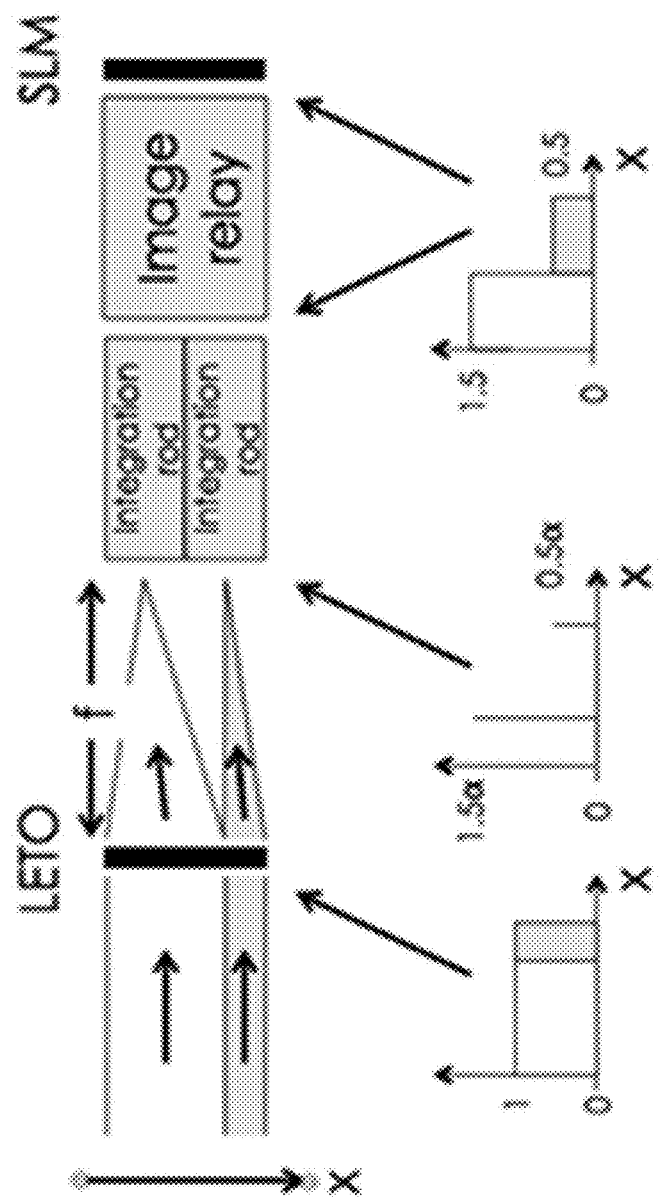
FIG. 3A Spatial illustration of incoming uniform light distribution
FIG. 3B Intensity distribution across beam

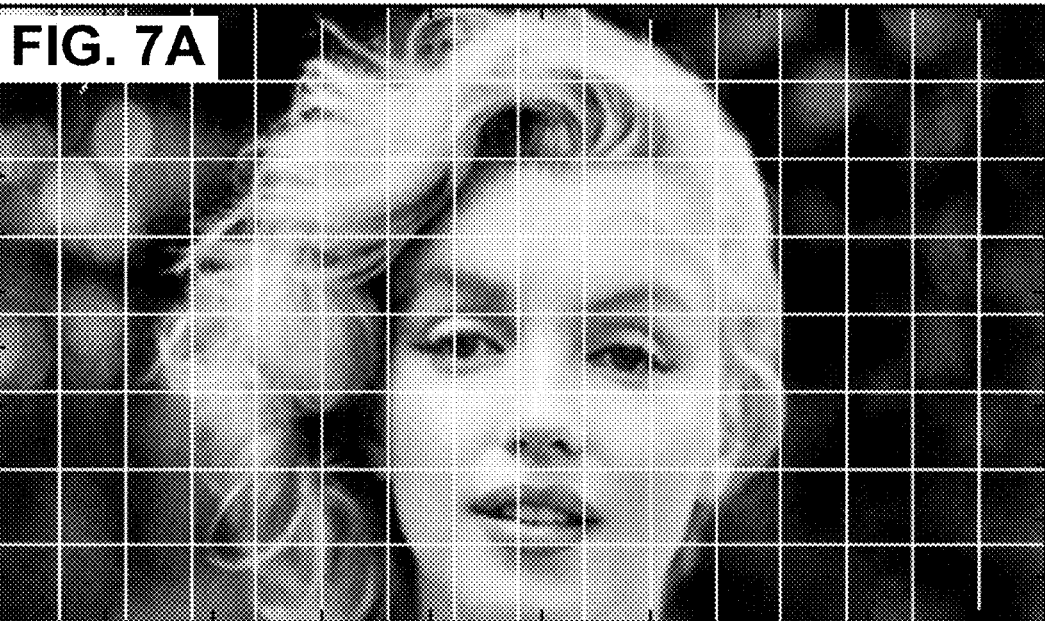
FIG. 7A
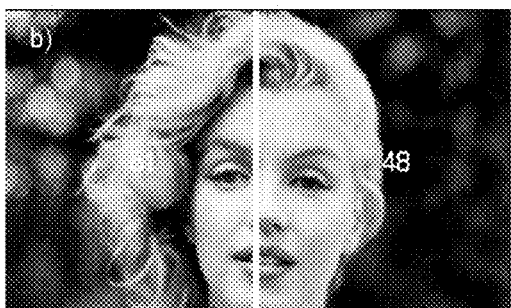 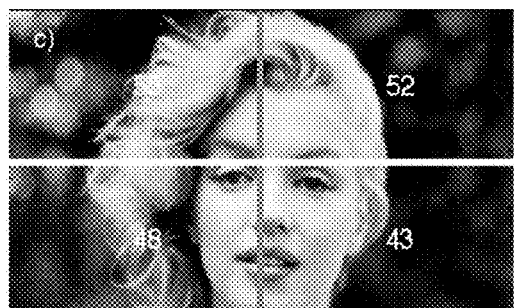
FIG. 7B　　　　　FIG. 7C

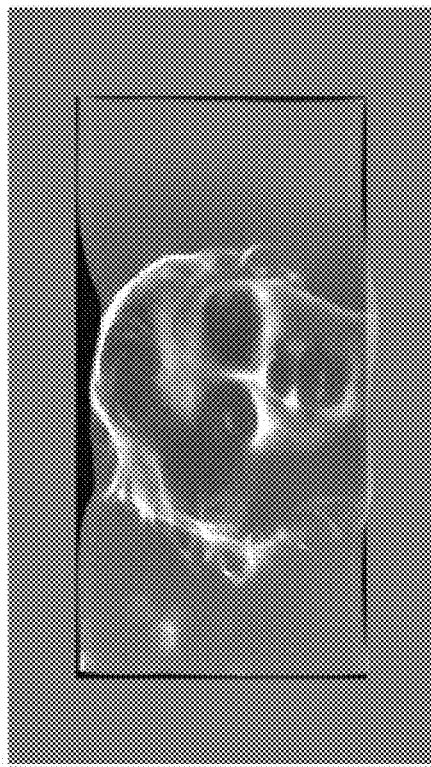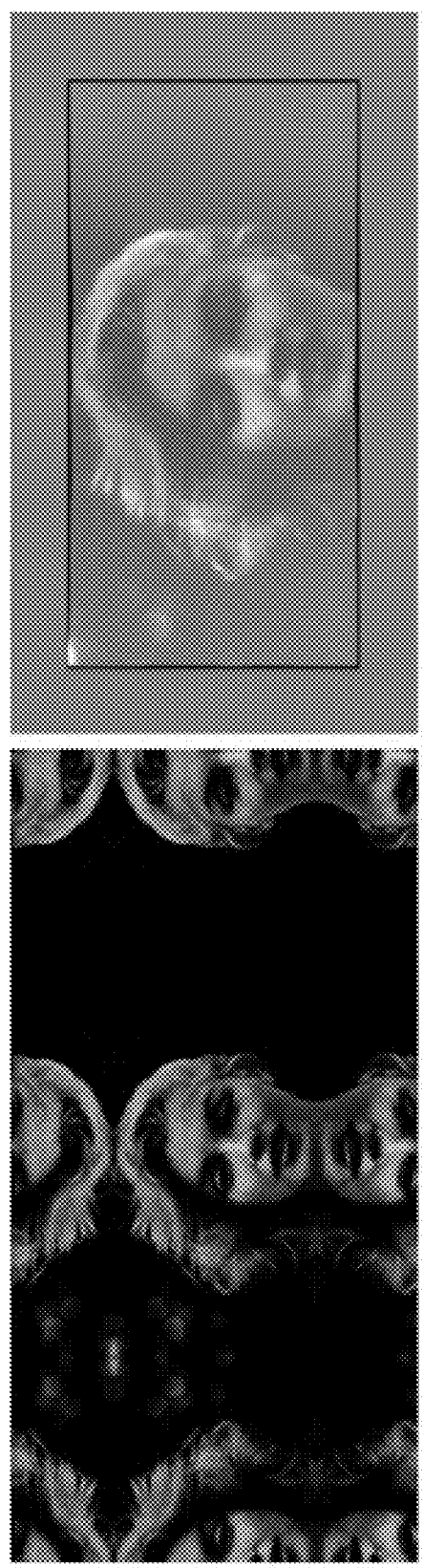
FIG. 16A Without padding
FIG. 16B Padded target
FIG. 16C Mirrored padded

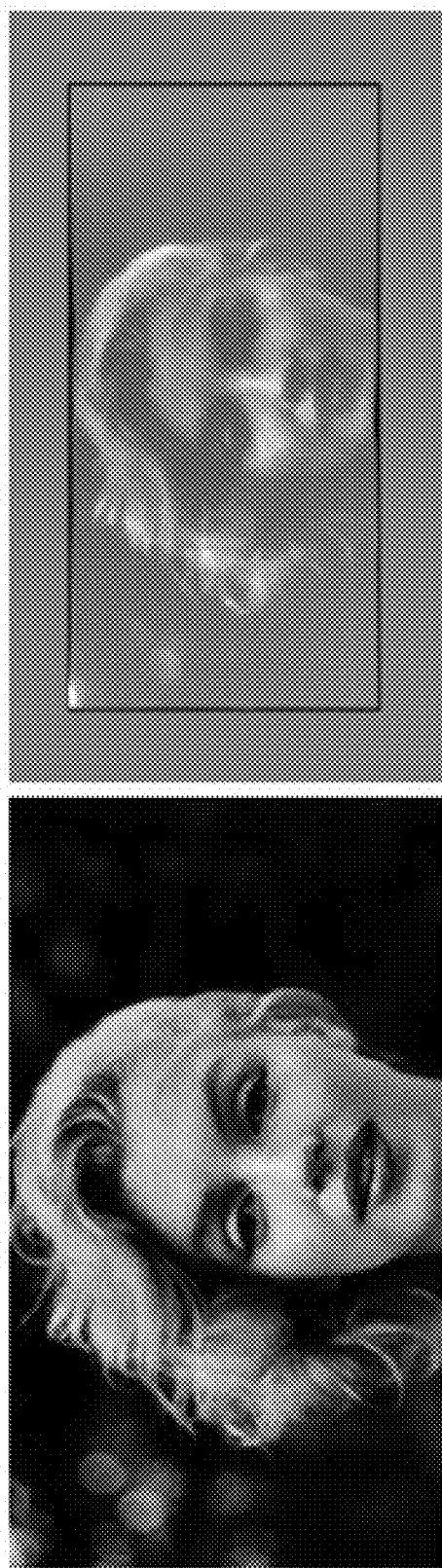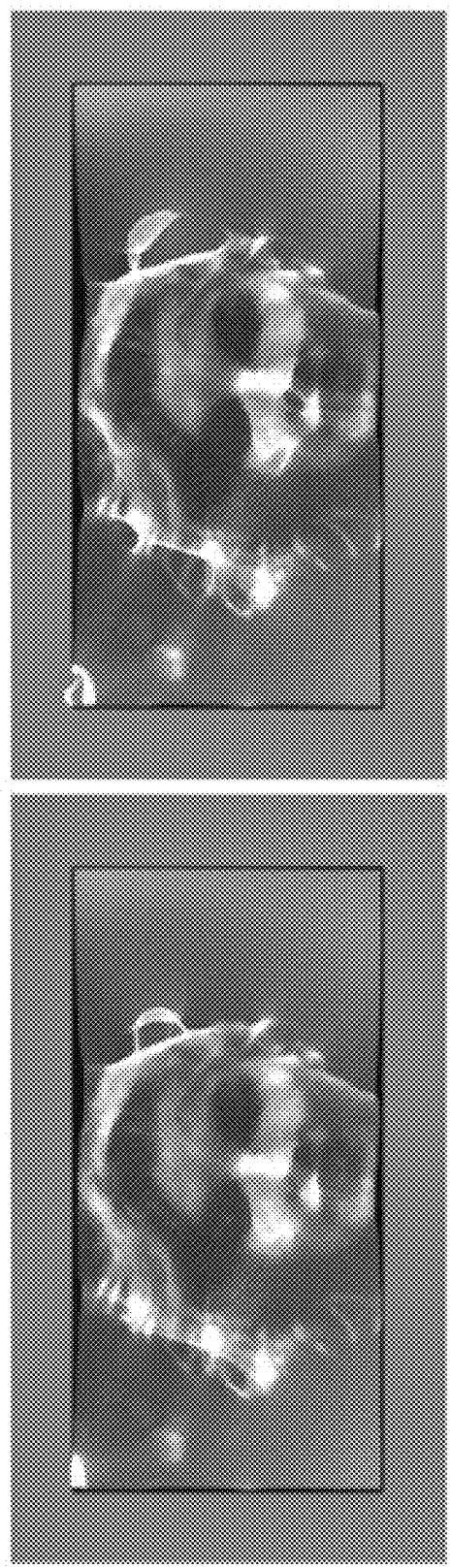
FIG. 17A target
FIG. 17B α = 2.0
FIG. 17C α = 0.2
FIG. 17D α = 0.02

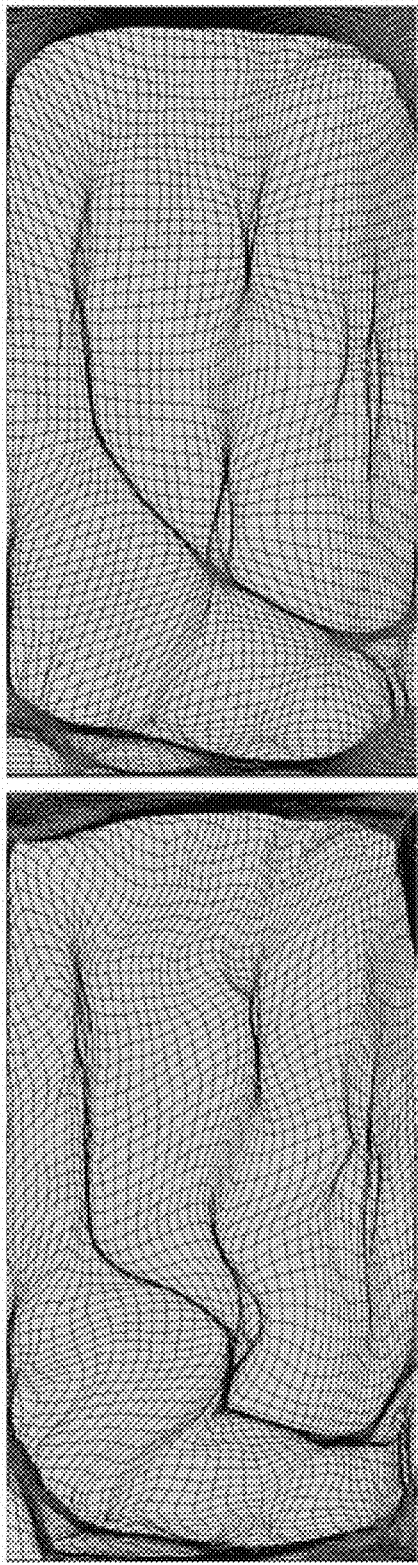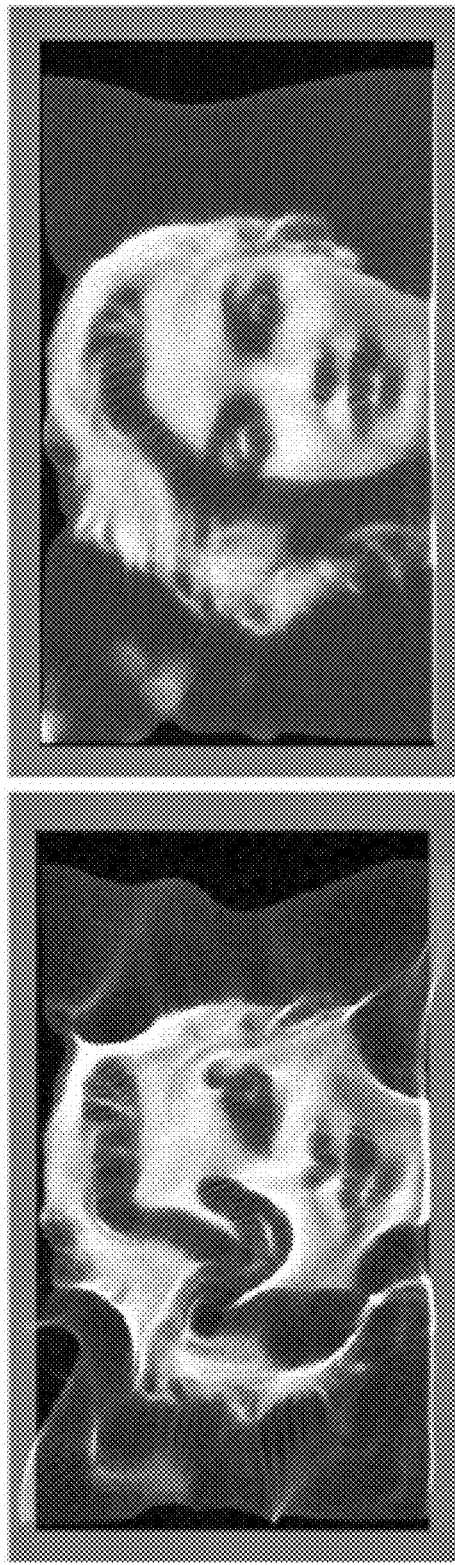
FIG. 18A unregularized point mappings  FIG. 18B regularized point mappings
FIG. 18C unregularized rendering  FIG. 18D regularized rendering

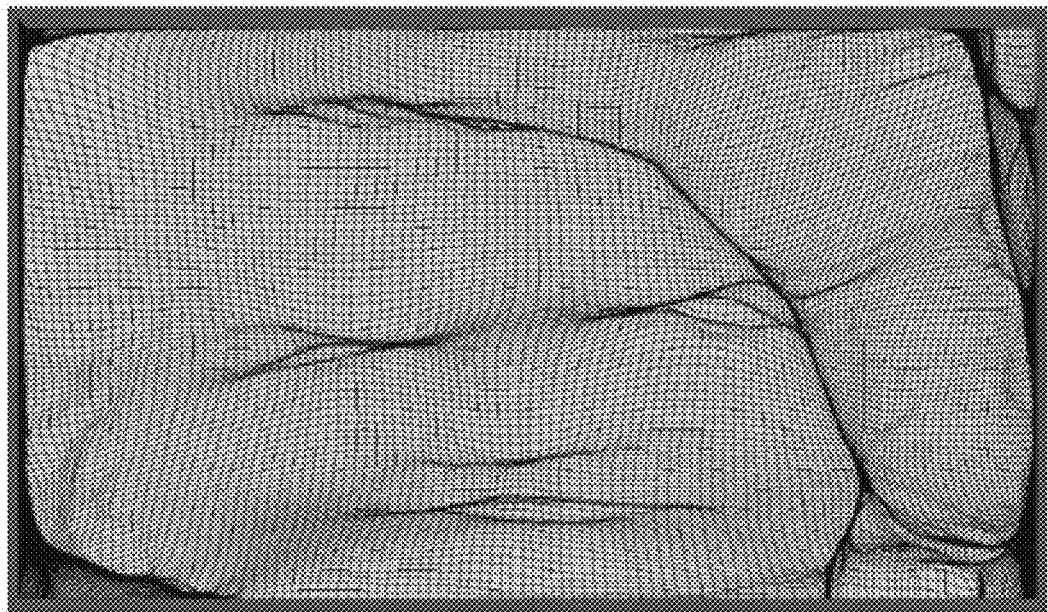
FIG. 19A Mapped point positions
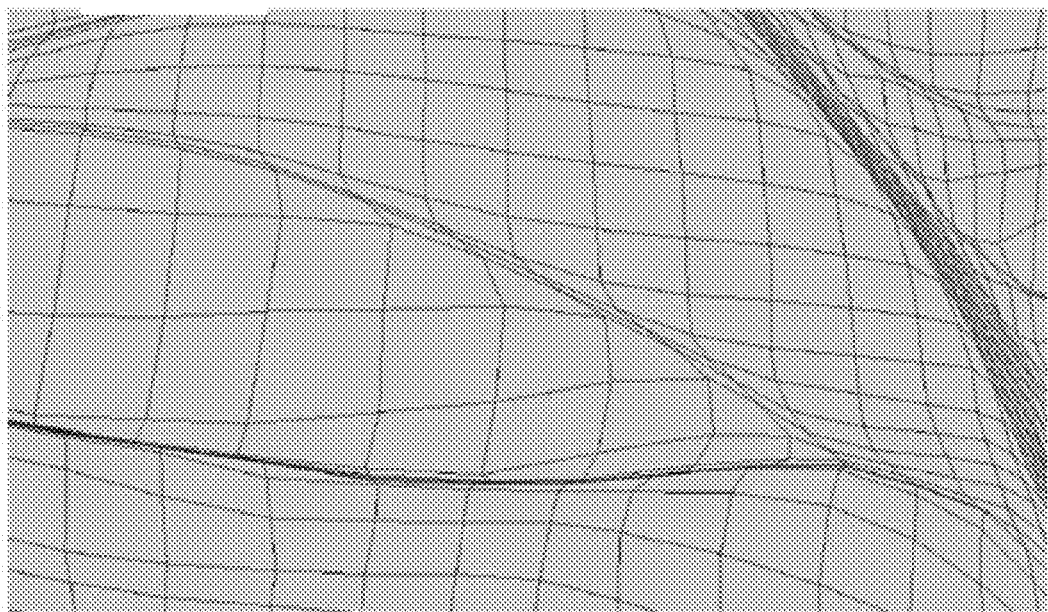
FIG. 19B Zoom into eye on right side of image

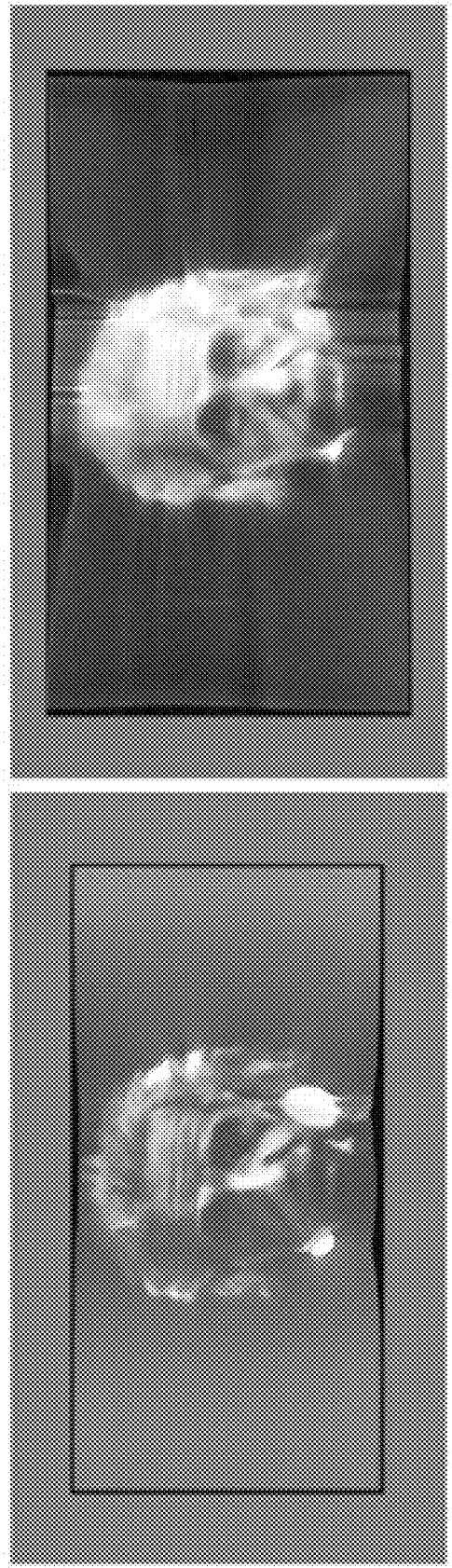
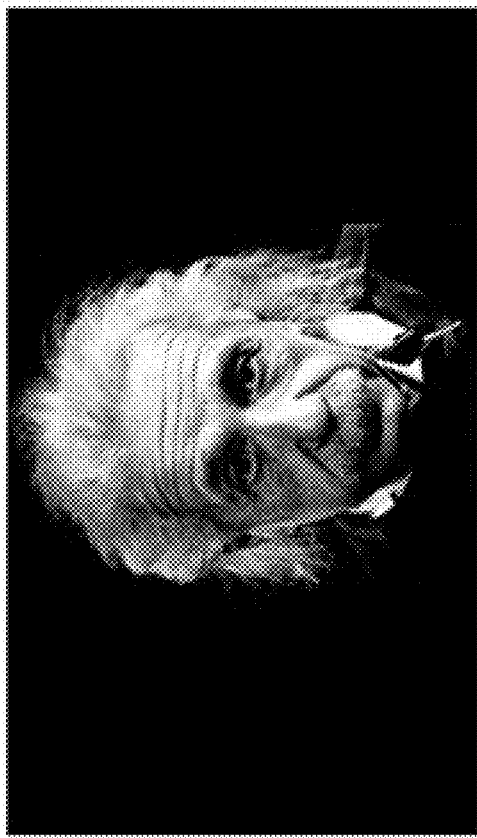
FIG. 20A Fourier
FIG. 20B Area-Parameterization
FIG. 20C target

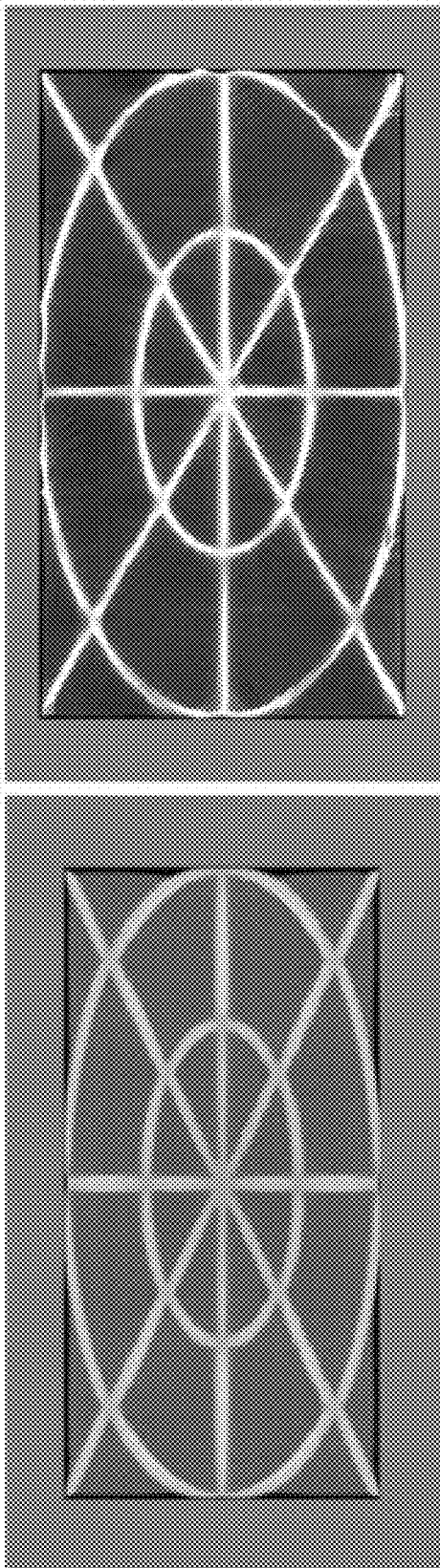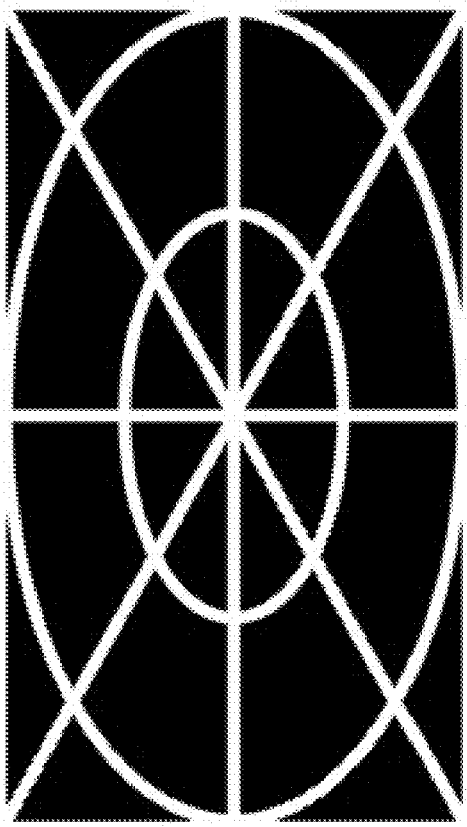
FIG. 21A  Deblurring
FIG. 21B  Area-Parameterization
FIG. 21C  target

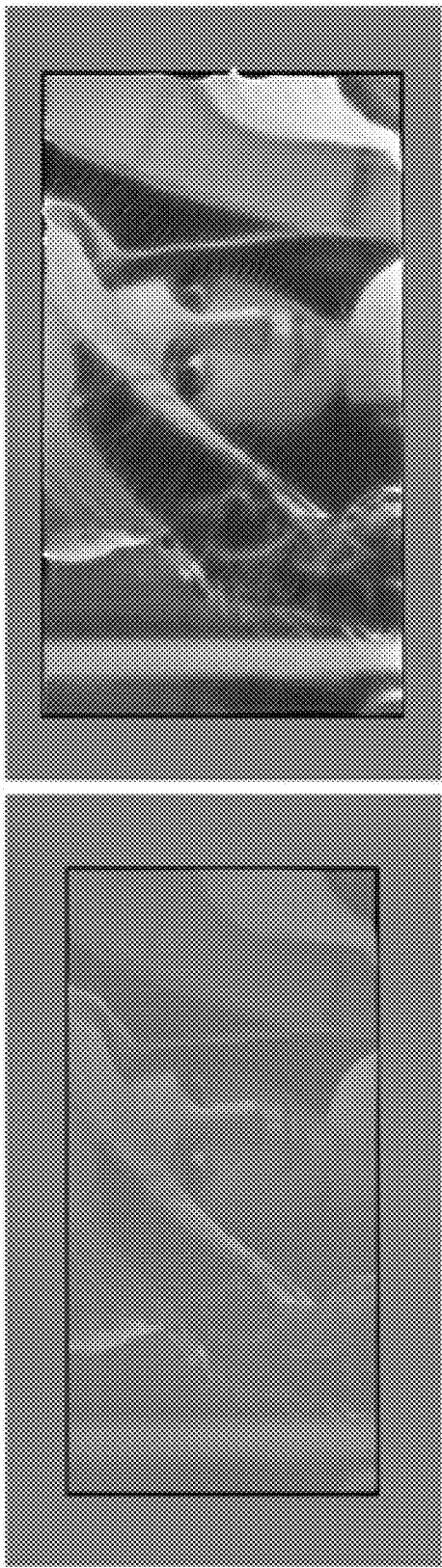
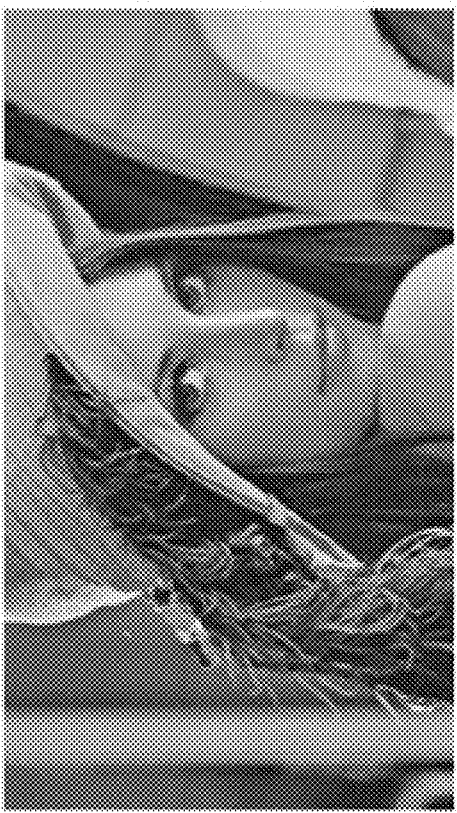
FIG. 22A Deblurring   FIG. 22B Area-Parameterization   FIG. 22C target

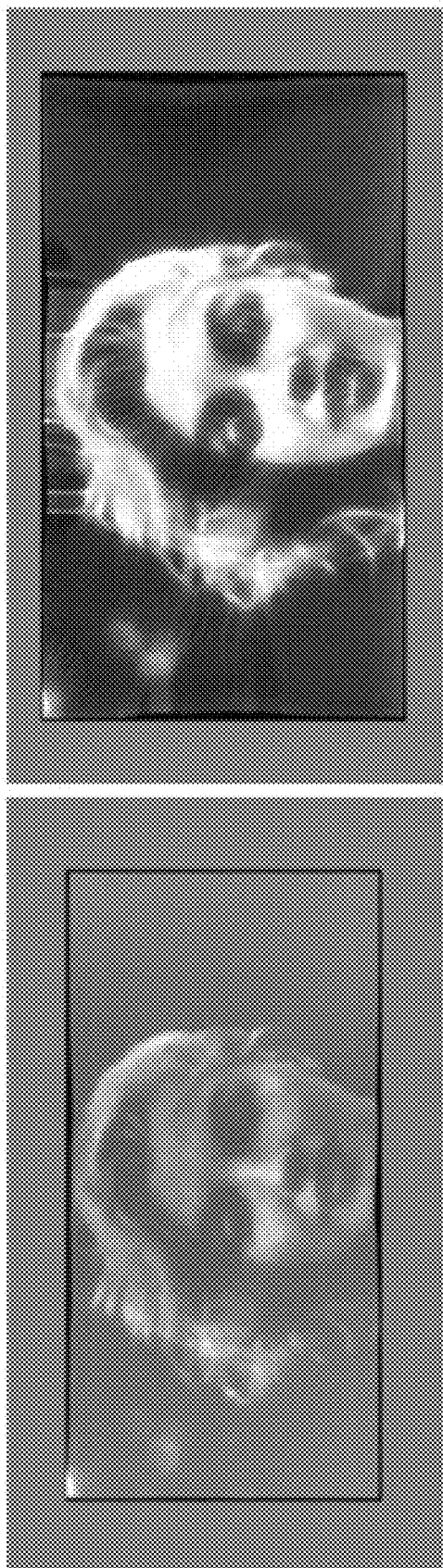
FIG. 23A Deblurring
FIG. 23B Area-Parameterization
FIG. 23C target

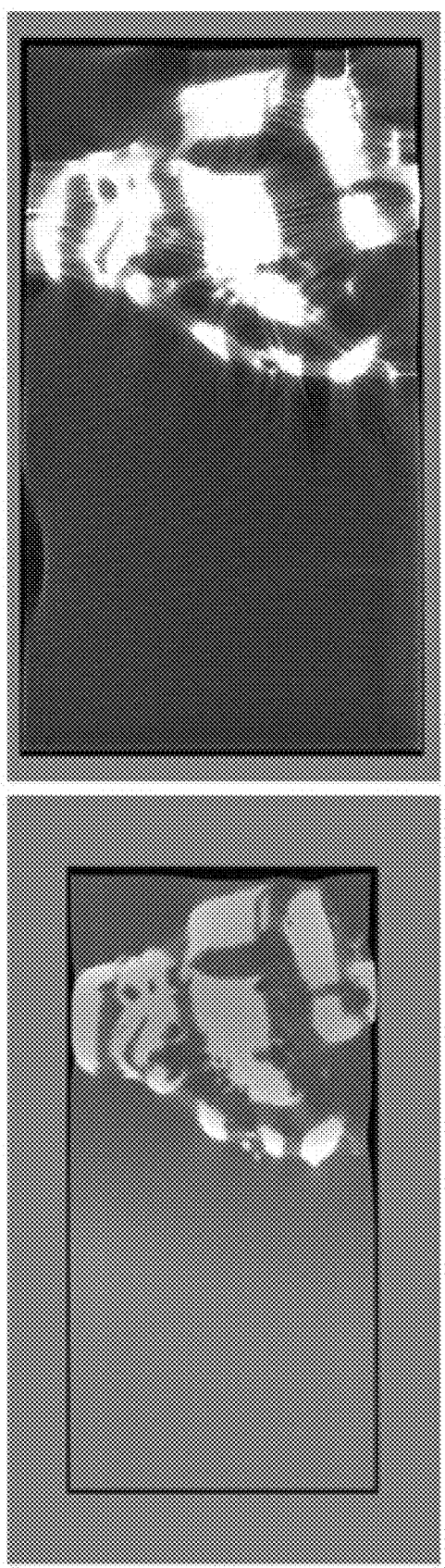
FIG. 24A Deblurring
FIG. 24B Area-Parameterization
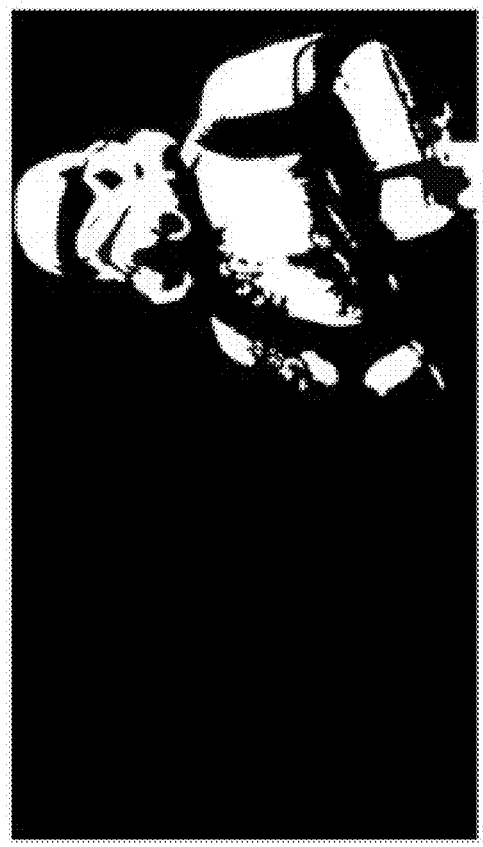
FIG. 24C target

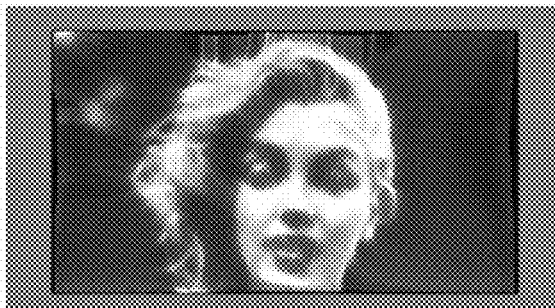
FIG. 25A Scale 0.125     FIG. 25B Scale 0.25
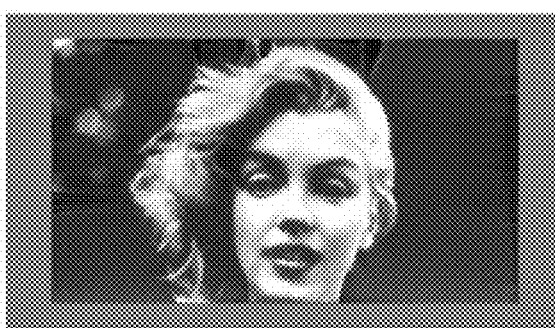
FIG. 25C Scale 0.5     FIG. 25D Scale 1.0
FIG. 25E target

FIG. 26A $\beta = 0.1$
FIG. 26B $\beta = 1.0$
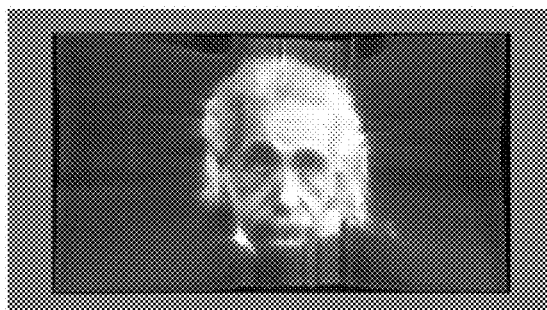
FIG. 26C $\beta = 10.0$
FIG. 26D $\beta = 100.0$
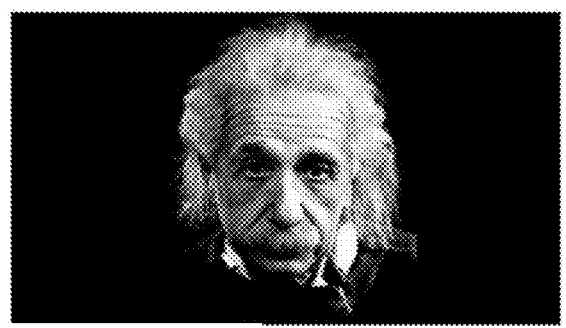
FIG. 26E target

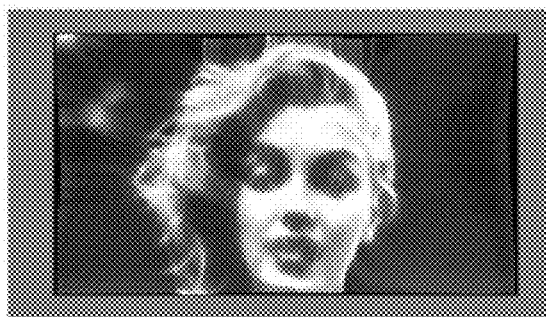
FIG. 27A $\alpha = 0.001$
FIG. 27B $\alpha = 0.01$
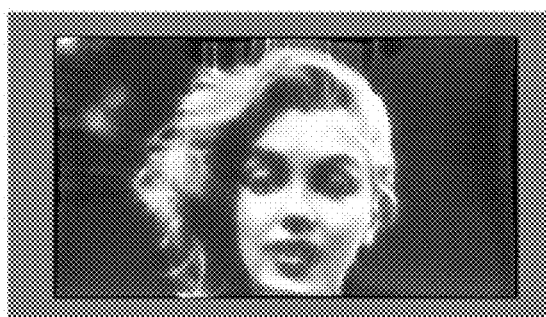
FIG. 27C $\alpha = 0.1$
FIG. 27D $\alpha = 1.0$
FIG. 27E target

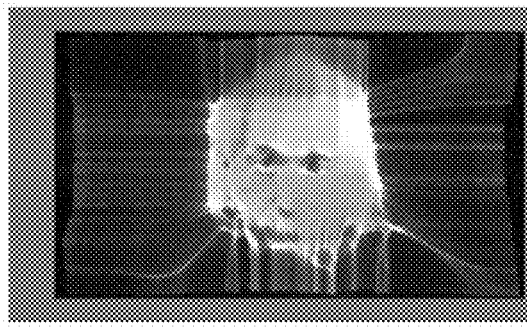
FIG. 28A $\epsilon = 0.001$
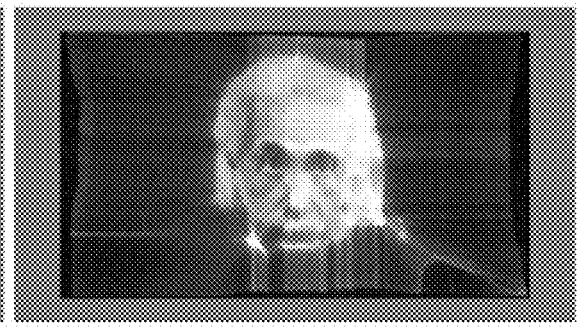
FIG. 28B $\epsilon = 0.01$
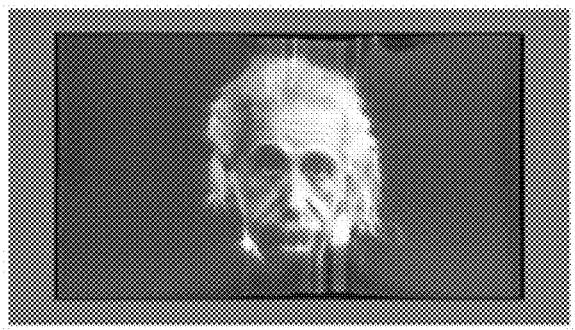
FIG. 28C $\epsilon = 0.1$
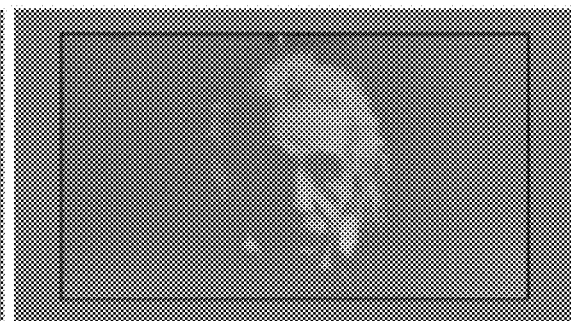
FIG. 28D $\epsilon = 1.0$
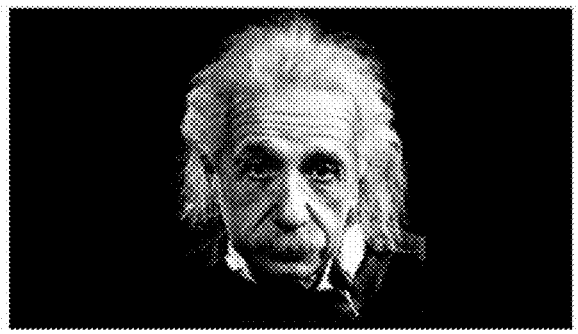
FIG. 28E target

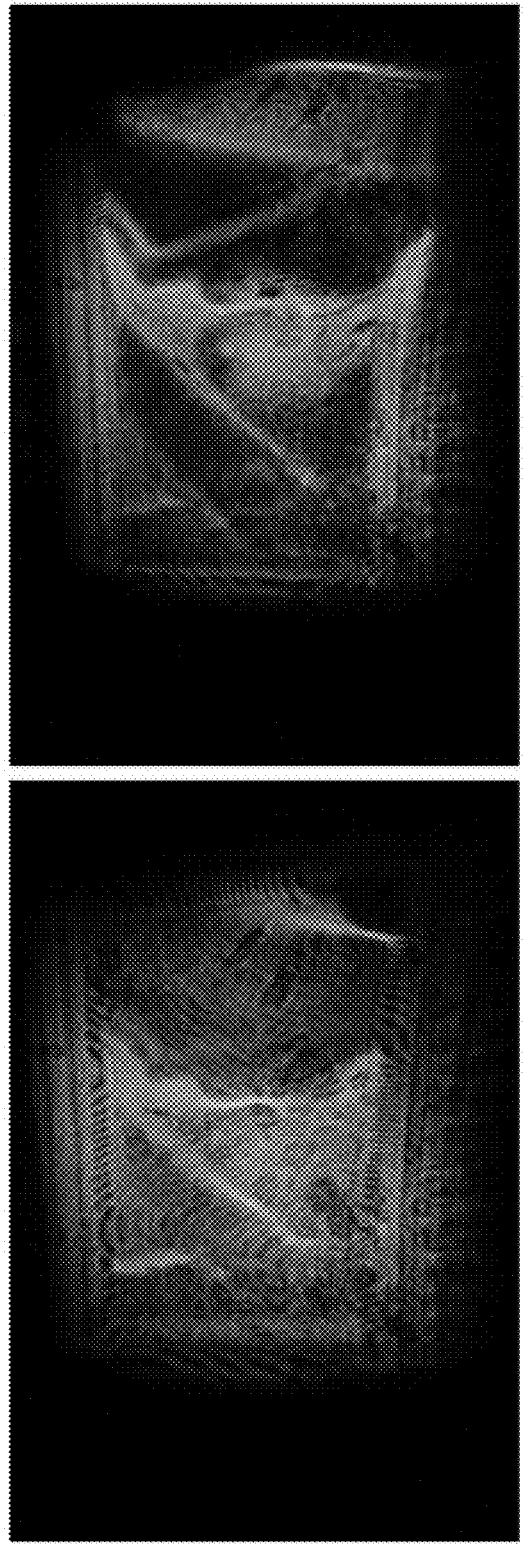
FIG. 29A target
FIG. 29B b) Paraxial Deblurring
FIG. 29C Area-Parameterization

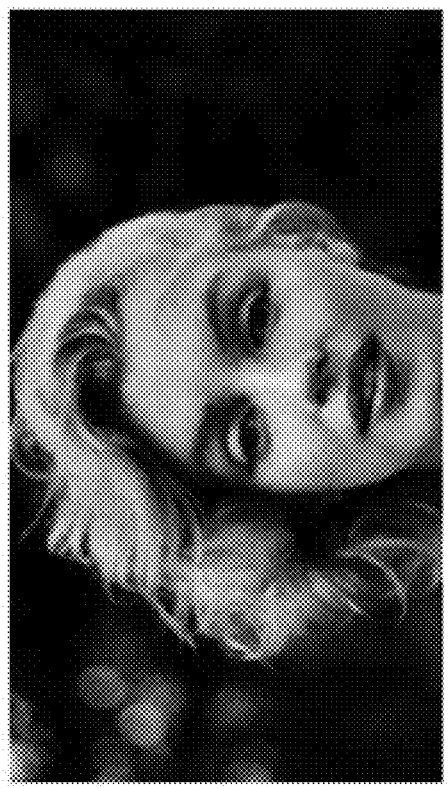
FIG. 30A  target
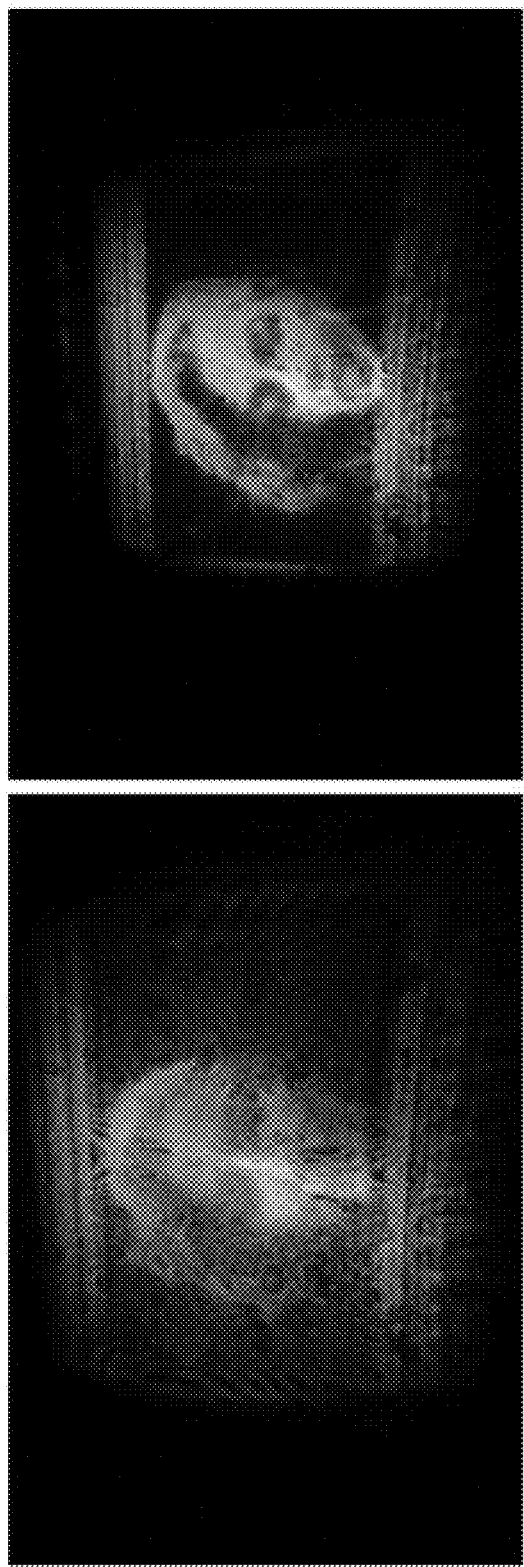
FIG. 30B  Paraxial Deblurring
FIG. 30C  Area-Parameterization

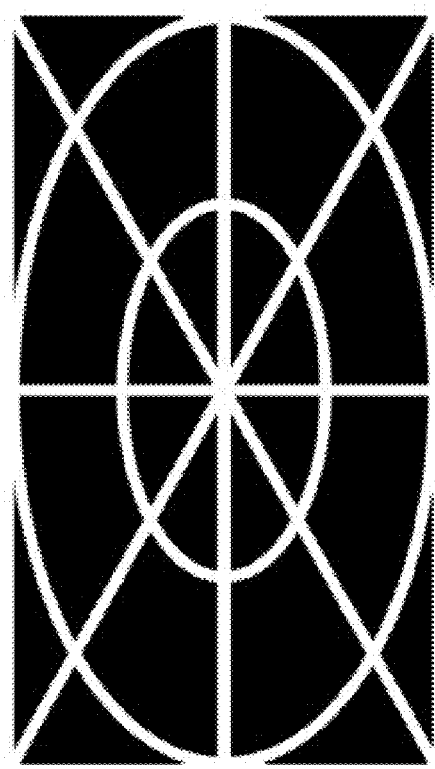
FIG. 31A target
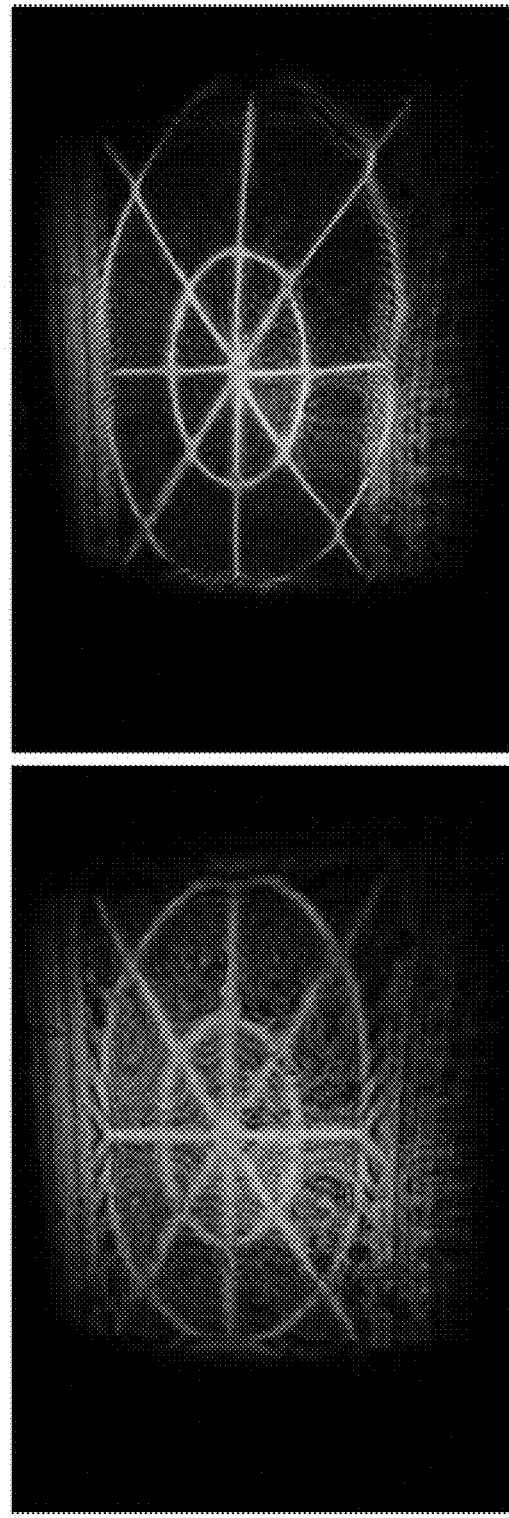
FIG. 31B Paraxial Deblurring
FIG. 31C Area-Parameterization

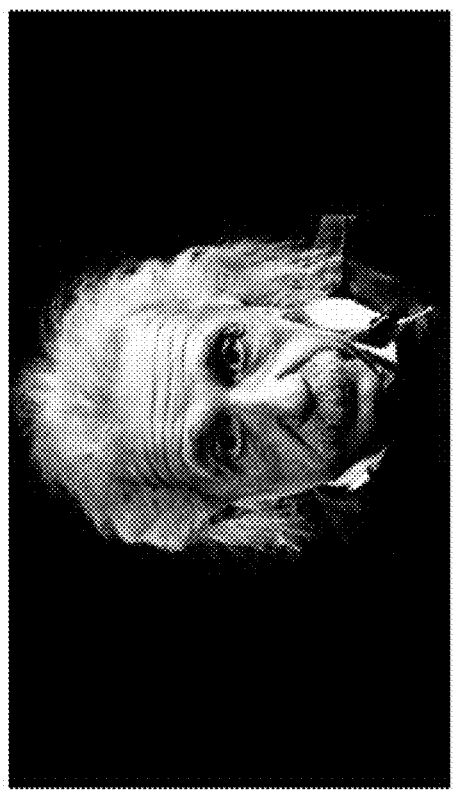
FIG. 32A target
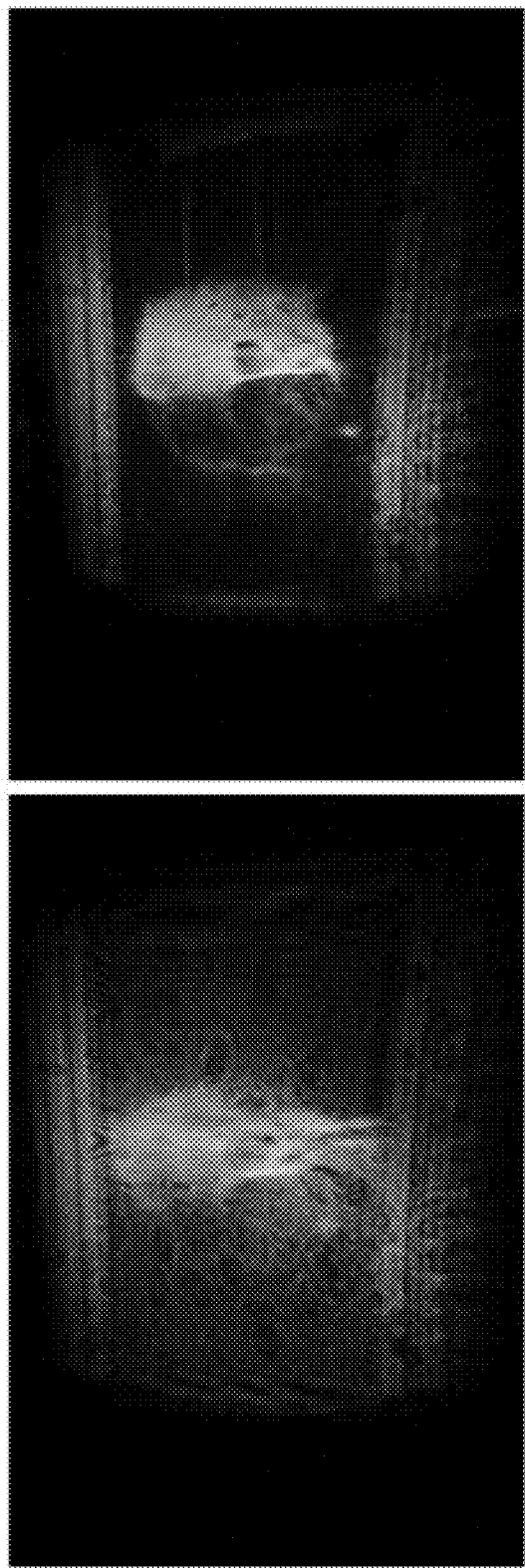
FIG. 32B Paraxial Deblurring
FIG. 32C Area-Parameterization

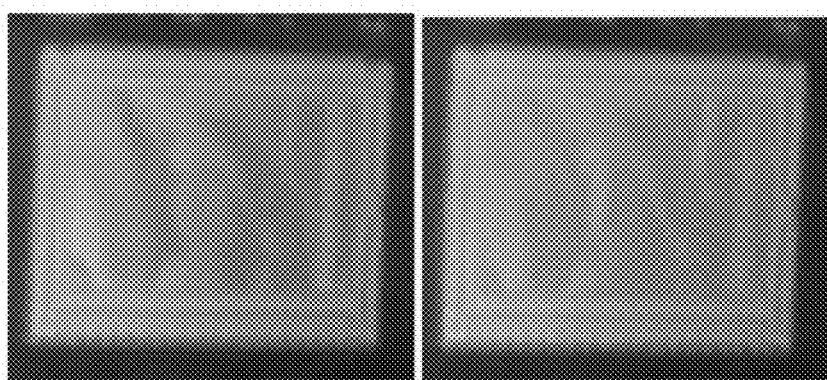
FIG. 33A  lena area    FIG. 33B  lena paraxial
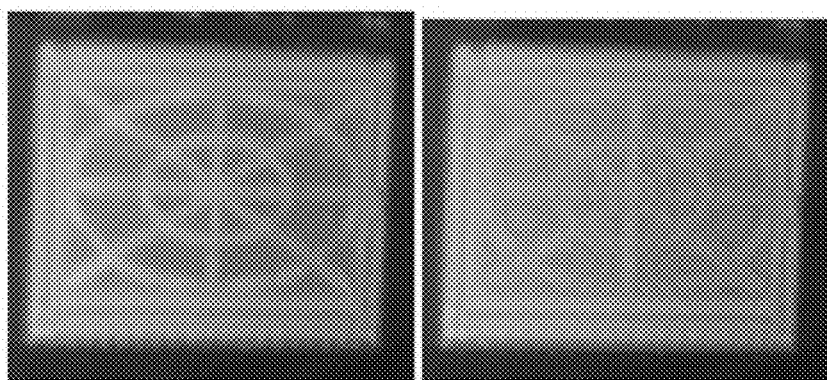
FIG. 33C  fram-ref area    FIG. 33D  fram-ref paraxial
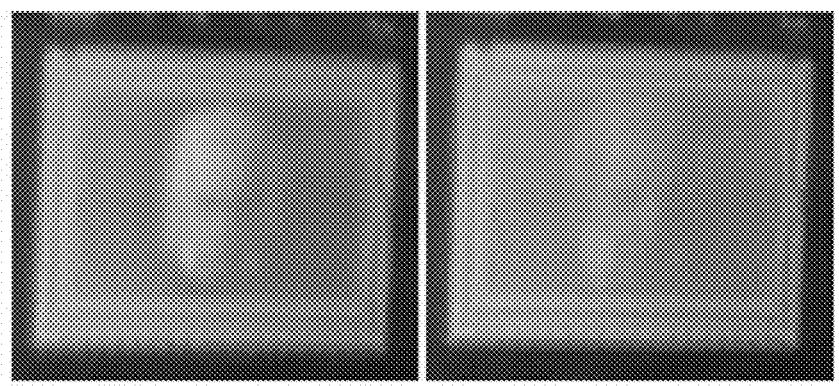
FIG. 33E  einstein area    FIG. 33F  einstein paraxial
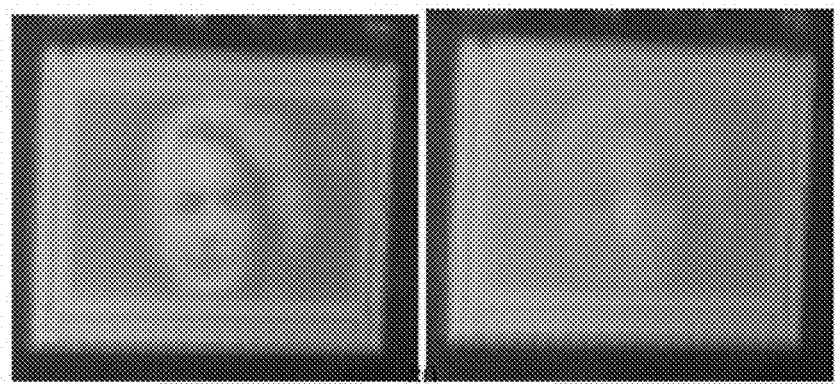
FIG. 33G  marilyn area    FIG. 33H  marilyn paraxial

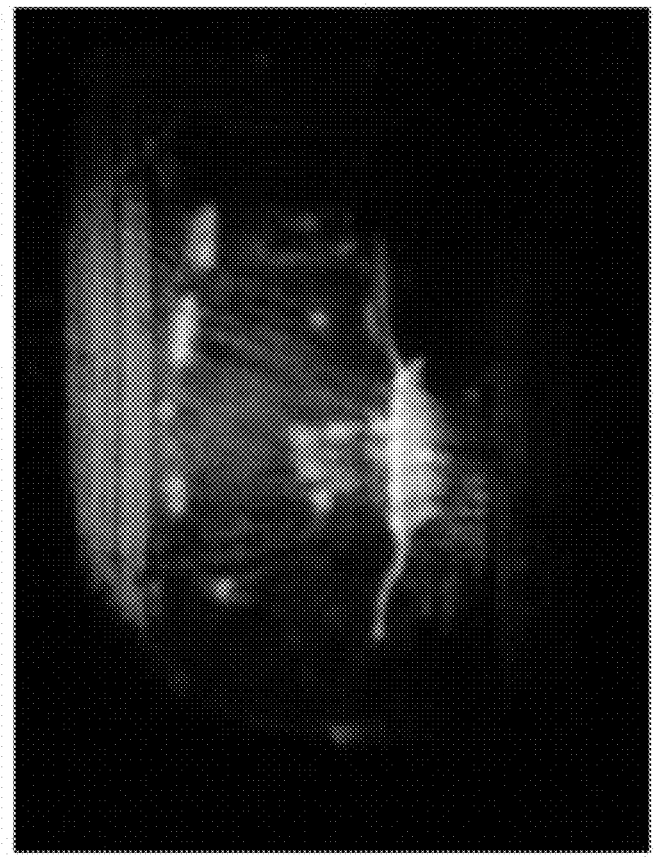
FIG. 35A target
FIG. 35B Area-Parameterization

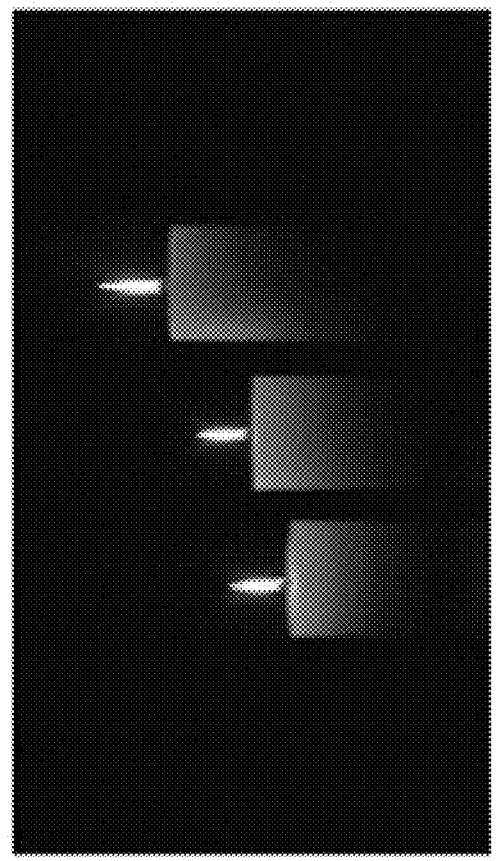
FIG. 36B Area-Parameterization
FIG. 36A target

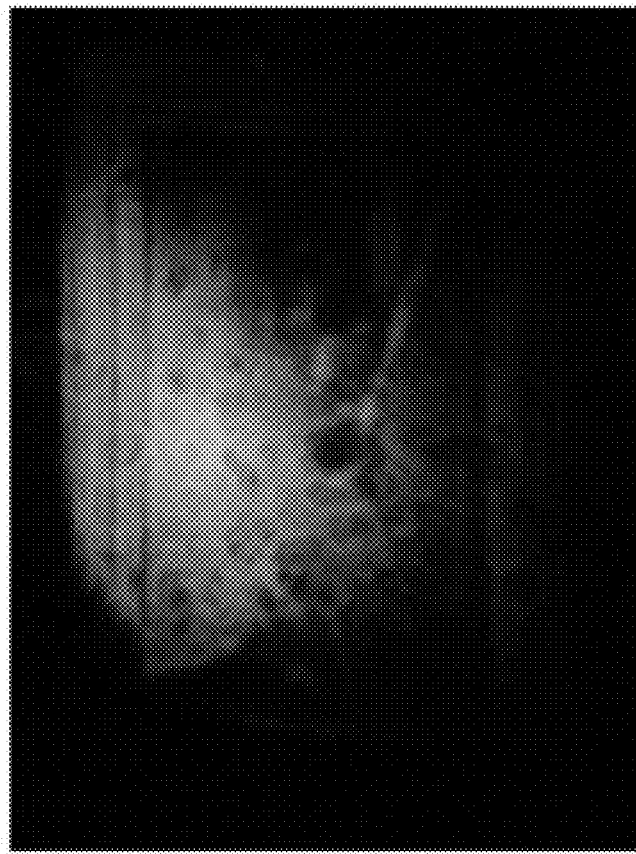
FIG. 37B Area-Parameterization
FIG. 37A target

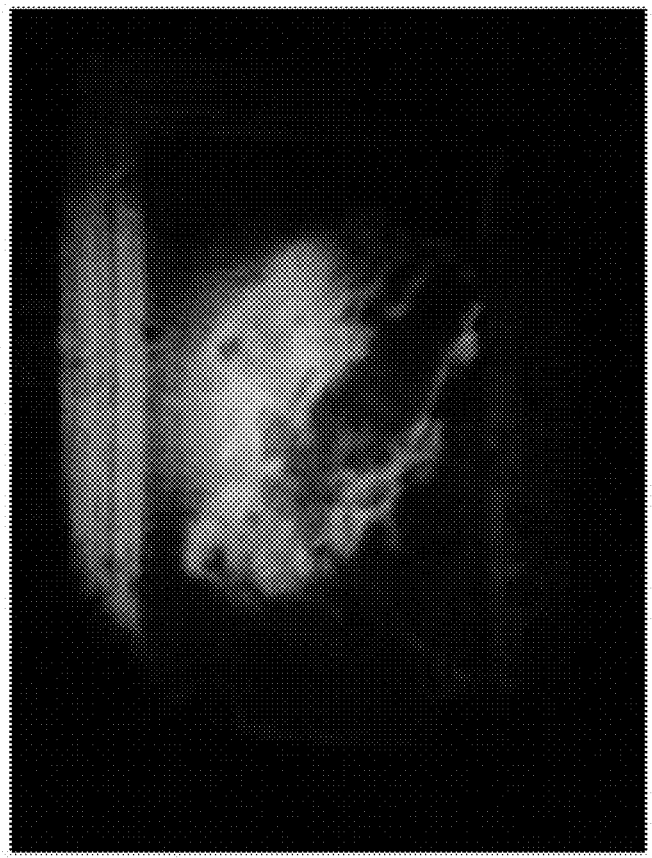
FIG. 38B Area-Parameterization
FIG. 38A target

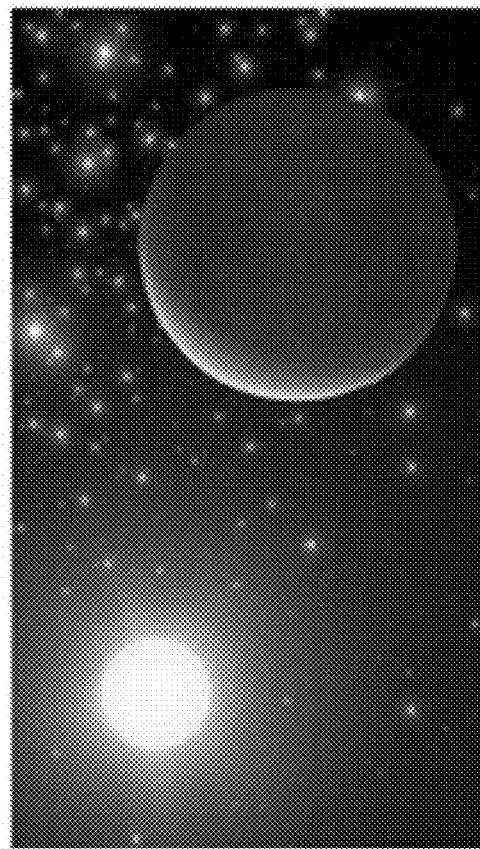
FIG. 39A  target
FIG. 39B  Area-Parameterization

NUMERICAL APPROACHES FOR FREE-FORM LENSING: AREA PARAMETERIZATION FREE-FORM LENSING

CROSS-REFERENCE TO RELATED APPLICATIONS

This application is a continuation of PCT International Application No. PCT/CA2015/050730 which is hereby incorporated herein by reference for all purposes. PCT International Application No. PCT/CA2015/050730 claims priority from U.S. Application No. 62/031,250 filed 31 Jul. 2014 and U.S. Application No. 62/194,728 filed 20 Jul. 2015. This application claims the benefit under 35 U.S.C. § 119 of U.S. Application No. 62/031,250 filed 31 Jul. 2014 and entitled METHODS AND APPARATUS LIGHT STEERING USING PHASE-MODULATED IMAGING and U.S. Application No. 62/194,728 filed 20 Jul. 2015 and entitled NUMERICAL APPROACHES FOR FREE-FORM LENSING: AREA PARAMETERIZATION FREE-FORM LENSING, both of which are hereby incorporated herein by reference for all purposes.

FIELD

This invention relates to projecting light using free-form lenses. In some embodiments the free form lenses comprise spatial phase modulators. Embodiments provide light projectors, methods for projecting light, components for light projectors and tangible media containing machine-readable instructions for implementing described methods.

BACKGROUND

There are many applications in which it is desirable to project patterns of light. These include displays (e.g. cinema projectors, computer displays, televisions, advertising displays—e.g. billboards, virtual reality displays etc.) as well as architectural lighting, automobile lighting (e.g. headlights, driving lights) and special effects lighting (e.g. theater stage lighting, concert lighting).

One technical problem is to provide displays capable of achieving high luminance levels. High luminance levels may be used to project light patterns having high dynamic ranges and/or to project light patterns viewable under various ambient lighting conditions, for example. With many current display technologies achieving high luminance levels is accompanied by undesirably high power consumption.

A major motivation for using light-steering in an imaging system is that peak luminance levels far above full-screen white (FSW) can be achieved. This is possible as light taken from the dark areas can be redistributed (steered) to areas that require higher luminance. Another consequence of steering light is that deeper black levels can also be reached. By extending the highlights and black levels in an image, a wider range of light levels ("increased contrast") can be displayed simultaneously.

Light can be steered by free-form lensing. Determining a configuration for a free-form lens that will steer light to provide a desired light pattern is computationally difficult for all but very simple light patterns. Computational caustics is a field of study which relates to how refractive and/or reflective optical layers affect distribution of light.

Some approaches to computational caustics involve determining an arrangement of pre-specified discrete primitives such as planar, quadratic or Gaussian patches. Methods based on pre-specified primitives often suffer from edge effects when primitives do not meet in a compatible way.

Some alternative approaches apply optimal transportation. Optimal transportation seeks a mapping from a source to a target distribution such that a user-specified cost-function is minimized. Optimal transportation has been applied in areas as diverse as operations research and mesh processing: an optimal transport formulation is used to determine a mapping of a source intensity distribution at the lens plane to a target distribution at the image plane. This approach can achieve high-contrast and very good image quality, but comes with high-computational cost. Typical images may require hours of computation. Furthermore the computation is difficult to parallelize.

There remains a need for light projectors which can create desired light fields. There is a particular need for ways to generate desired light fields that are computationally efficient and yet provide quality reproduction of a desired light field. There is also a desire for methods and apparatus for reproducing light fields that are energy efficient.

SUMMARY

This invention has a number of aspects. Some aspects provide light projectors. Some aspects provide methods for generating free-form optics (which may comprise spatial phase modulators) corresponding to desired light fields (which may comprise images—the images may be video frames in some embodiments). Some aspects provide methods for processing data specifying a light field to yield a configuration for a corresponding free-form lens.

This invention also relates to free-form lensing. Free-form lensing involves generating a desired light field by redistributing light from a source using a customized optical layer. Embodiments of the invention provide light projectors comprising free-form lenses, methods for projecting specified light fields, and methods and apparatus for processing data defining desired light patterns to generate configurations for free form lenses. In example embodiments the optical layer comprises a customized refractive and/or reflective element or a phase modulator. "Computational caustics" is a related field.

One example aspect provides methods for controlling a phase modulator to display an image defined by image data. The method comprises defining a plurality of non-overlapping source regions on a two-dimensional phase modulator and a plurality of display regions at a display plane, each of the source regions having a boundary and a source area and being associated with a corresponding one of the display regions; each of the display regions having a corresponding display region area; based on the image data, assigning a target light intensity value to each of a plurality of the display regions; adjusting: a configuration for the source regions; or a configuration for the display regions; or configurations for both the source regions and the display regions such that ratios of the display areas of the display regions to the source areas of the corresponding source regions is proportional to a ratio of source light intensity values for the source regions to the target light intensity value assigned to the corresponding display region; generating a phase surface for each of the source areas, the phase surface configured to redirect light incident on the source area onto the corresponding display area; and controlling the phase modulator to provide the phase surfaces for the source regions and illuminating the source regions with incident light according to the source intensity values.

Another example aspect provides a method for generating a free form lens configuration useful for displaying an image defined by image data. The method comprises: providing a model of a two-dimensional light source comprising a plurality of non-overlapping source regions. Each of the source regions has a boundary, a corresponding source light intensity value and a source area. Each of the source regions is associated with a corresponding display region of a display. Each of the display regions has a target area. The method proceeds to assign a light intensity value to each of the display regions based on the image data. The method sets a target source area for each of the source regions such that a ratio of the target source area of the source region to the display area of the corresponding display region is proportional to a ratio of the light intensity value assigned to the corresponding display region to the source light intensity value for the source region. The method performs an optimization to determine configurations for the boundaries of the source regions which best satisfy an objective function which quantifies aggregate deviations of the areas of the source regions from the target source areas corresponding to the source regions. Based on the configurations of the source region boundaries after the optimization the method determines a normal vector for each of the source regions and integrates the normal vectors to yield a solution phase function relating a phase to position in two dimensions. Where a phase modulator is used to provide the free-form lens the solution phase function may be applied to drive the phase modulator.

In some embodiments the source regions comprise non-overlapping source tiles defined by lines extending between a plurality of source vertices. Each of the source vertices has a location. In some embodiments the display tiles are defined by lines extending between a plurality of display vertices.

In some embodiments the source tiles and display tiles are triangles. The optimization may determine optimized locations for the source vertices.

In some embodiments determining the normal vectors for the source vertices is based on in-plane displacements of the source vertices relative to corresponding ones of the display vertices.

In some embodiments optimizing comprises applying a limited memory Broyden-Fletcher-Goldfarb-Shanno algorithm. Some embodiments comprise performing the optimization in a series of iterations at progressively finer scales such that, in each iteration the number of source vertices and display vertices is increased and the vertex positions for an immediately previous iteration are used as starting configurations for a current iteration.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIG. 1 is a schematic illustration of an example light projector. The incoming known light distribution (which may be but is not nec essarily uniform) is first steered, then amplitude-modulated. Amplitude modulation may be provided by a spatial light modulator. The embodiment of FIG. 1 illustrates a projector that uses transmissive elements. Implementations which apply other (e.g. reflective) light steering elements and/or amplitude modulators are possible.

FIGS. 2A and 2B illustrate schematically a free space implementation. Light falls onto a spatial phase modulator (e.g. a HOLOEYE™ LETO series phase only modulator is used in some embodiments) with a known distribution (which may be uniform). After phase modulation the light continues to a spatial light modulator (SLM). In one implementation, the different regions on the spatial phase modulator may be of different sizes, whereas the regions on the SLM may be of the same size. This enables altering of the light intensity in each respective region of the SLM. Intensity distributions for each step in the light path is indicated in the diagram. The spatial phase modulator and the SLM appear as being the same size in this diagram, but that is not a requirement.

FIGS. 3A and 3B illustrate an example implementation in which integration rods are used. The steered light from each region of the spatial phase modulator is focused onto centers of integration rods in an array of integration rods. Example intensity distributions for each step in the light path is indicated in the diagram. This light is relayed onto the SLM for a final clean-up. The factor $\alpha$ is a consequence of the focusing of the light from the spatial phase modulator onto each integration rod and should approximately account for power conservation.

FIGS. 7A, 7B and 7C illustrate processing image data to determine desired luminance levels for different display regions. An 8×16 sectioned image of Marilyn. (FIG. 7A) shows the complete image with the 8×16 zones superimposed. FIG. 7B shows the first bisection in x with resulting mean luminance levels. FIG. 7C shows the second bisection in y for each of the two halves calculated and shown in FIG. 7B.

FIGS. 16A through 16C are a set of images that illustrate the effect of padding. Images that are not padded properly often have boundary distortions due to periodicity assumptions in the Fourier transform. Mirrored padding around the target results in a periodic image. This reduces boundary distortions but reduces contrast.

FIGS. 17A to 17D illustrate the effect of varying a smoothness parameter on image quality. Reducing the smoothness parameter can result in significantly increased contrast but can also result in perceptible caustic artefacts.

FIGS. 18A through 18D illustrate the effect of regularization. FIGS. 18A and 18B are computed point positions for area-based parameterizations with and without curl-regularization (with weight 1.0). FIGS. 18C and 18D are the resulting output images. Incorporating curl-regularization helps to reduce shearing distortions and results in displacements.

FIG. 19A illustrates an example mapping of point positions for the Marilyn image. Marilyn's face and hair is mapped to nearly the entire lens surface, dramatically compressing low-intensity regions. Despite high-compression, the vast majority of mapped quadrilaterals are convex, indicating a bijective parameterization. Local contrast in the resulting image is determined by the ratio of areas of adjacent quadrilaterals. FIG. 19B is a magnified part of FIG. 19A corresponding to Marilyn's eye.

FIGS. 20A through 20C are images of Einstein which compare Fourier paraxial (FIG. 20A) and area-parameterization approaches (FIG. 20B) to free-form lensing. The area-parameterization image uses a gamma exponent of 3.0. FIG. 20C is the target image.

FIGS. 21A through 21C are images comparing Fourier paraxial (FIG. 21A) and area-parameterization (FIG. 21B) approaches on the fram-ref image. FIG. 21C is the target.

FIGS. 22A through 22C are images comparing Fourier paraxial (FIG. 22A) and area-parameterization (FIG. 22B) approaches on the Lena image. FIG. 22C is the target.

FIGS. 23A through 23C are images comparing Fourier paraxial (FIG. 23A) and area-parameterization (FIG. 23B) approaches on the Marilyn image. FIG. 23C is the target.

FIGS. 24A through 24C are images comparing Fourier paraxial (FIG. 24A) and area-parameterization (FIG. 24B) approaches on the "trooper" image. FIG. 24C is the target.

FIGS. 25A to 25D illustrate the effect of scale of area parameterization on the Marilyn image shown in FIG. 25E. Increasing resolution reduces the artefacts at highly stretched regions, indicating that a spatially adaptive discretization could be beneficial.

FIGS. 26A to 26D illustrate the effect of curl regularization on area parameterization results for the Einstein image shown in FIG. 26E. Increasing weight for the curl-regularizer results in more integrable displacements which reduces stretching and shearing artefacts, but decreases contrast. A typical value is 10.0.

FIGS. 27A to 27D illustrate the effect of varying a smoothness parameter on area parameterization results for the Marilyn image shown in FIG. 27E. Low values for the smoothness parameter result in higher-contrast, but more pronounced artefacts. High values for the smoothness parameter reduce contrast but help to suppress artefacts. A typical value is 0.05.

FIGS. 28A to 28D illustrate the effect of varying a minimum area on area parameterization results for the Einstein image shown in FIG. 28E. This parameter acts as a hard floor on the minimum area targeted by the optimization. When set too low, it results in low-quality images, but excellent contrast. When set too high, it prevents effective light redistribution. A typical value is 0.05.

FIGS. 29B and 29C are respectively an area parameterization image: in-scene contrast 106:1, peak brightness 2.8×FSW and a paraxial deblurring image: in-scene contrast: 67:1, peak brightness: 2:9×FSW for the Lena image of FIG. 29A.

FIGS. 30B and 30C are respectively an area-parameterization image: in-scene contrast 582:1, peak brightness 11.92×FSW and a paraxial deblurring image: in-scene contrast: 173:1, peak brightness 10.0×FSW for the Marilyn image of FIG. 30A.

FIGS. 31B and 31C are respectively an area-parameterization image: in-scene contrast 377:1, peak brightness 6.2×FSW, and a paraxial deblurring image: in-scene contrast 101:1, peak brightness 4×FSW for the "fram-ref" image shown in FIG. 31A.

FIGS. 32B and 32C are respectively an area-parameterization image: in-scene contrast 759:1, peak brightness 13.15×FSW, and a paraxial deblurring image: in-scene contrast 104:1, peak brightness 8.1×FSW for the Einstein image shown in FIG. 32A.

FIGS. 33A to 33H are photographs of projections from a prototype projector (LETO) with broadband illumination comparing area-parameterization and paraxial deblurring methods with same camera settings.

FIG. 35B is an experimental capture of the "avengers" image of FIG. 35A: in-scene contrast 1025:1, peak brightness 8.84×FSW.

FIG. 36B is an experimental capture of the "candle" image of FIG. 36A: in-scene contrast 697:1, peak brightness 9.85×FSW.

FIG. 37B is an experimental capture of the "F1" image of FIG. 37A: in-scene contrast 301:1, peak brightness 6.18× FSW.

FIG. 38B is an experimental capture of the "clouds" image of FIG. 38A: in-scene contrast 697:1, peak brightness 7.42×FSW.

FIG. 39B is an experimental capture of the "space" image of FIG. 39A, in-scene contrast 935:1, peak brightness 16.2× FSW.

DETAILED DESCRIPTION

Figure 4:
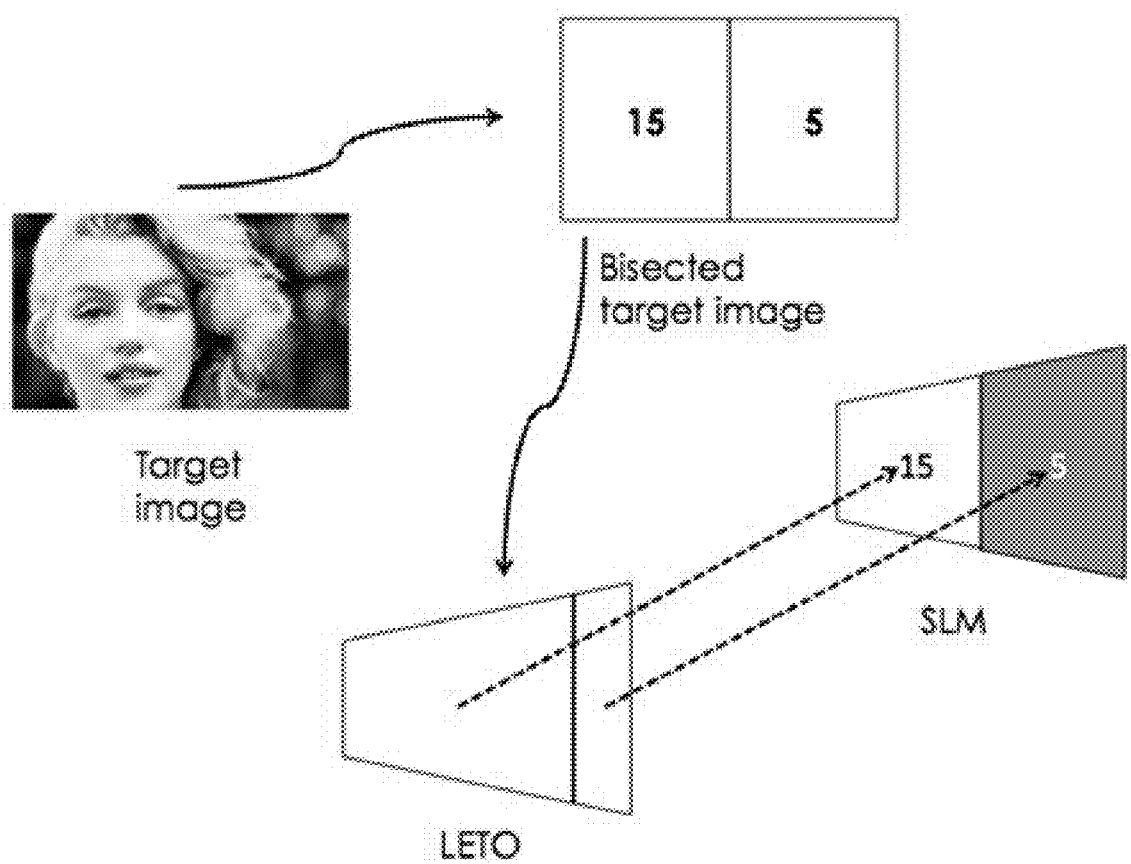
FIG. 4 is a diagram that illustrates the flow of an example shift and scale SNS algorithm and its incorporation with a physical system. The target image is bisected and in this example the required intensities in the two halves are found to be 15 (left) and 5 right) (arbitrary luminance units). This leads us to split the spatial phase modulator into two regions, where the area of the left hand side is 3× that of the right hand side. The light incident on the spatial phase modulator is then steered onto two equi-sized regions on the SLM.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

This document describes various embodiments of light projector as well as methods for configuring free form lenses to project desired light patterns. Some embodiments combine a light steering stage comprising a free form lens (which is provided by a spatial phase modulator in some embodiments) with a spatial amplitude modulation phase.

In some embodiments a configuration for the light steering phase is arrived at by a method that comprises associating source regions at a free-form lens with display regions of a projected light pattern. Desired light intensities in the display regions are adjusted by varying the relative areas of the display regions and their corresponding source regions. The relative areas of the source- and display regions may be altered by changing areas of the source regions, changing areas of the display regions or changing both areas of the source regions and areas of the display regions. The free form lens may be configured so that each source region directs light onto the corresponding display region. In some embodiments 90% or 95% or more of the light projected by each source region onto the target image plane falls within the corresponding display region. In some embodiments, the intensity of illumination of the free form lens is controlled based on an average or representative luminance of the desired light pattern. In some embodiments spatial amplitude modulation stages are provided one or both of upstream and downstream of the free form lens. An upstream SLM may vary the luminance at the source regions. A downstream SLM may further modulate light that illuminates the target image plane. The downstream SLM may have a spatial resolution finer than a resolution of the display regions in some embodiments.

The following description explains various ways to configure a free form lens in response to image data defining a desired light pattern. "Shift'n'scale" (SNS) is a procedural, forward-only algorithm that when used in conjunction with a phase-retarding imaging chip enables light steering in some embodiments. SNS beneficially can avoid or reduce edge effects in some embodiments. Some embodiments use computational caustics methods that involve determining an arrangement of pre-specified discrete primitives such as planar, quadratic or Gaussian patches, that can be used to configure a free form lens.

FIG. 1 is a basic diagram illustrating a light projector that combines the steering of light with amplitude modulation of the incoming light distribution in order to form images more efficiently.

This document describes a non-limiting example implementation of a light projector where light is steered by a phase-modulating imaging chip, for example an LCoS based phase-modulating microdisplay. An example of such a display is made by HoloEye Photonics AG called LETO (1080×1920 pixels and about 6.4 micrometer pixel pitch). Light reflected off the LETO is incident on an amplitude modulator, in our case a Sony™ liquid crystal on silicon modulator (LCoS), which is a non-limiting example of a spatial light modulator (SLM). The image from the SLM is then relayed onto a projection screen.

Alternative implementations are possible, for example by reversing the order of the two modulators: amplitude modulate the light first, then steer the light. Other possible implementations include phase-modulators that only modulate up to ½ of one wavelength of the light (so called "π-modulators"). Other possible amplitude modulators include the Digital Light Projector (DLP) or Digital Micromirror Device (DMD), examples of which are available from Texas Instruments.

One implementation of the system sees the incoming light distribution steered by a LETO directly onto the SLM as indicated in FIG. 2. In other embodiments optical systems of suitable kinds may be provided between the spatial phase modulator and the SLM. Such optical systems may comprise, for example, arrangements of one or more of lenses, mirrors, diffusers, free space, filters, etc.

As suggested in FIG. 2, steering is used to pre-modulate the light incident on the SLM. This can be done by lensing the light from several regions of the spatial phase modulator onto corresponding regions on the SLM. The lenses implemented are in our case simple parabolic lenses with focal distances in x and y derived from how much amplification is required in the two directions. Similarly, in order to shift a distribution in the plane, a slope is applied to the lensing solution in each region, one in x and one in y. These basic operations have led to the name "Shift'n'scale" (SNS).

An alternative implementation of this system uses equi-sized regions on the LETO, illuminating differently sized regions on the SLM. The derivation for the physical model is similar to the one for the preferred implementation.

Another alternative implementation is illustrated by FIG. 3, which shows a projector in which light is homogenized using an array of integration rods between the spatial phase modulator and the SLM. Homogenization may be beneficial in order to smooth out irregularities in a laser beam profile, for example.

The output from different integration rods may have different amplitudes, but their spatial distributions should be known or approximately known. The focal distances for each region are approximately the same, and indicated in FIGS. 3A and 3B. Small variations in the focal distances for the different regions could ensure similar numerical aperture or spread of light from each integration rod. The shifts for each region will vary.

Shift and Scale Algorithm

Many approaches can be used to calculate the appropriate phase-modulating image on the spatial phase modulator. In one approach, the spatial phase-modulator is divided into several regions where different lenses are defined in order to provide the required amount of magnification and steering for those regions. In a sense, this is like having a programmable array of parabolic lenses that each shifts and scales a region of light from the spatial phase modulator onto corresponding regions on the SLM on a frame-by-frame basis. The goal of the SNS algorithm is to provide a fast, low-resolution version of the target image. If the resulting fast low resolution image does not have sufficient resolution for a particular application then one can use an amplitude-modulator to create the desired high-resolution target image on the screen, but with minimal loss of light since excessive amplitude modulation can be avoided.

The following two sections describe two example cases for splitting up each of a spatial phase modulator and a target image plane (which may be on a SLM in some embodiments) into multiple regions. Alternative derivations using differently sized regions on both the spatial phase modulator and the SLM are also possible.

Approach 1: Differently-Sized Spatial Phase Modulator Regions; Equally Sized SLM Regions The SNS algorithm analyzes the image to be displayed and effectively translates intensity-requirements of the target image into areal distributions (this is in some sense similar to the Median Cut Algorithm [Ref.: http://en.wikipedia.org/wiki/Median_cut]). SNS is a recursive, multi-scale algorithm. An example embodiments starts by comparing the right and the left side of the image and sets aside according areas on the phase modulator to be able to match the illumination requirements of each side. SNS then repeatedly bisects the already-processed image regions and again translates intensity requirements into areas. This process can be repeated recursively. A diagram outlining the region-to-region mapping between source regions on the spatial phase modulator (or other free form lens) and display regions on the SLM (or other target plane) after one bisection step is shown in FIG. 4.

Determining the "illumination requirements" during each bisection step can be done in different ways. For examples, the most stringent requirement is that the maximum luminance levels of each part of the target image are to be achievable; this leaves the least amount of light available for re-direction and is therefore the most conservative approach. Requiring only the mean luminance per region will lead to lost light levels in each region and will surely reduce image quality although this approach may be acceptable for some applications. Alternatively, one can aim to reproduce some predetermined percentage of the light for each region, which will require only a small amount of per-region tone-mapping, for example by soft-clipping highlights and/or black levels that are beyond the available dynamic range of each region.

In summary, the SNS approach uses a free-form lens such as a phase modulator that is split into many regions whose areas may all differ depending on how much light they are required to deliver to a corresponding set of regions on the SLM. The size of the relative regions is what determines the amount of steering and amplification per region.

In one implementation, we determine the shape of each lens by calculating required focal in-plane distances as well as in-plane shifts for each region. A simple parabolic lens can be defined as follows:

$$\text{lens}_i = f_{x,i}(1-\sqrt{1-x^2/f_{x,i}^2})m_{x,i}x + f_{y,i}(1-\sqrt{1-y^2/f_{y,i}^2}) + m_{y,i}y \quad [1A]$$

where $(f_{x,i}, f_{y,i})$ are the focal distances in x and y of the $i_{th}$ region, and $(m_{x,i}, m_{y,i})$ are the tilts of the lens in that region. Other implementations are possible. For example, treating the incoming light distribution as bouncing off the phase modulator at a specular angle, a surface of gradients can be derived from knowing where the light should be sent onto the next modulator (e.g. a SLM) or other target plane. This gradient map can be integrated to form a phase map for the spatial phase modulator.

Two example ways of relaying light from a free from lens to a SLM are described above. In the "free-space approach", the focal distance for each region will be determined by how much magnification is required between the source region in question and the corresponding display region. The following expression will ensure correct magnification:

$$f_{x,i} = D/(1 - a_{x,i}/b_{x,i}) \quad [2A]$$

where D is the distance between the free form lens (e.g. spatial phase modulator) and the SLM, $a_{x,i}$ is the x-size of the source region on the spatial phase modulator and $b_{x,i}$ is the x-size of the corresponding display region (e.g. on the SLM). These parameters are illustrated in FIG. 6.

In an alternative implementation, light from the phase modulator is focused onto an array of integration rods. In this case the exact value of the focal distance is of less importance. One may chose to focus all light from each source region onto the input face of the integration rod array, in other words f=D. As mentioned in that section, small variations in the focal distances for each region can be determined in order to ensure similar light spread at the outputs of the array of integration rods.

Figure 5:
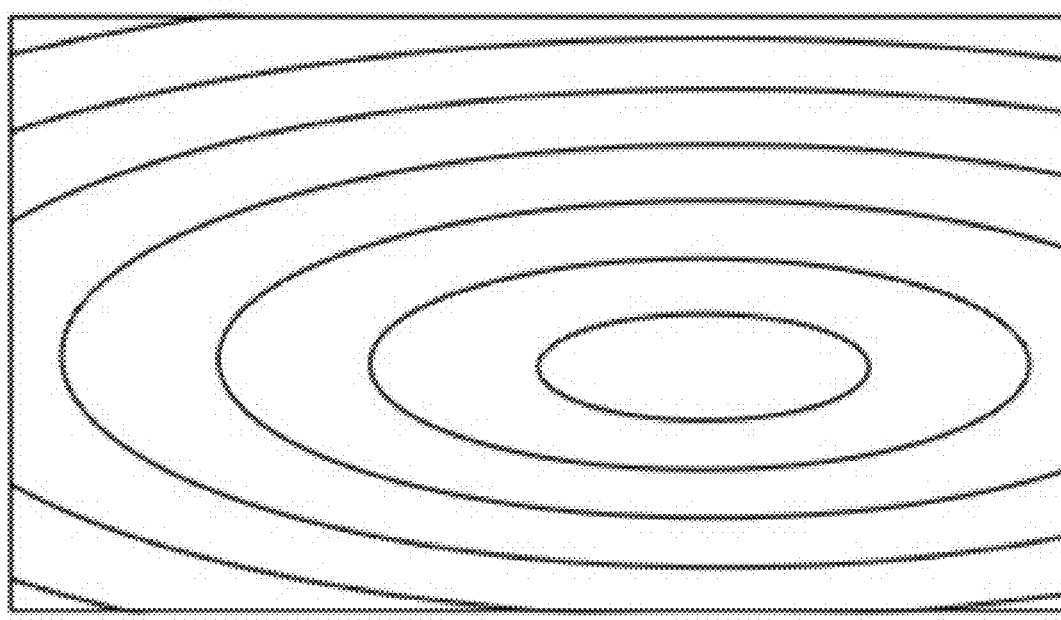
FIG. 5 shows an example of a tilted, parabolic lens. A region of a spatial phase modulator may be configured to provide such a lens. The configuration of the lens may be controlled depending on the location and size of a corresponding region on the SLM to which the lens should steer light.

The resulting lens per region may look something like that shown in FIG. 5.

Figure 6A:
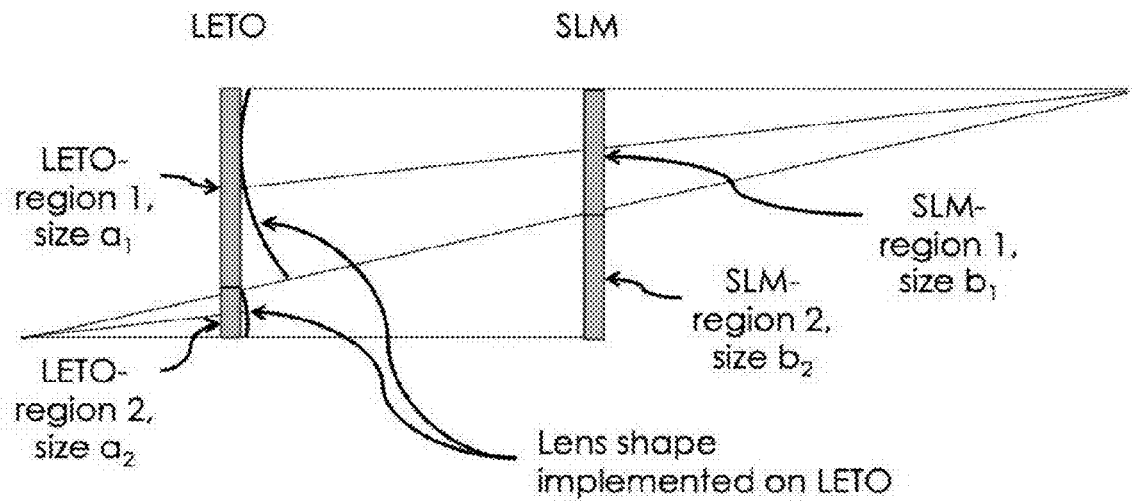
FIG. 6A is a diagram (not to scale) suggesting shapes of lenses that may be implemented on a spatial phase modulator for a free space implementation. The sizes of the spatial phase modulator regions may be determined by the SNS algorithm. The focal points of each region of the spatial phase modulator are indicated in the diagram, to the right of the LETO-SLM assembly for region 1, and to the left of the LETO-SLM assembly for region 2.
Figure 6B:
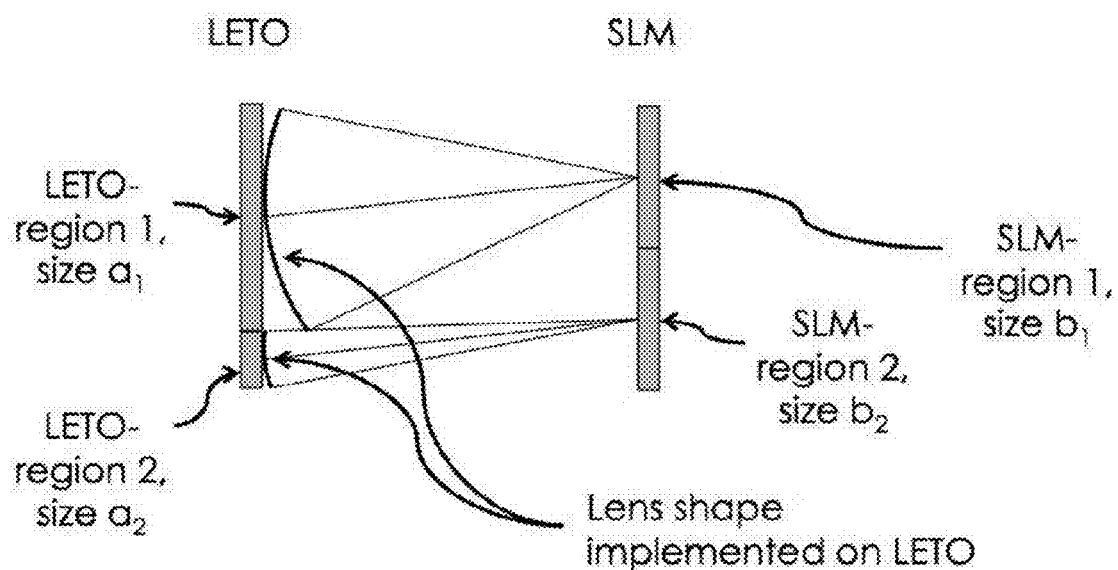
FIG. 6B is a diagram (not to scale) suggesting a shape of lens that may be implemented on a spatial phase modulator (e.g. LETO) for an integration rod implementation. The sizes of the regions on the spatial light modulator may be determined by the SNS algorithm. Diagram is not to scale.

FIG. 6 shows the cross section of two lenses with different sizes focusing light onto an SLM.

An example prototype implementation of SNS breaks down the target image into 8 y-zones by 16 x-zones ("x" being the horizontal width, and "y" being the vertical height of the image). The image is repeatedly bisected (alternating in the x, then y, then x . . . directions) until the desired number of regions has been obtained.

FIGS. 7A to 7C illustrate repeated bi-section for an input image of Marilyn Monroe. The target image is 1080×1920 (HD-resolution), so each of the 8×16 cells is 135×120 pixels large.

In FIG. 7B we see that the luminance requirement is 51 on the left hand side of the image, and 48 on the right. As a result, the area of the left hand side (LHS) will be 51/(51+48) of the total spatial phase modulator area, and the right hand side (RHS) will be 48/(51+48) of the total spatial phase modulator area. Very little redirection will be necessary for this skew: only a small amount of added light should be incident on the LHS. Because of the left-leaning skew, the lenses that we form on the RHS should have a slight tilt or slope towards the left.

In FIG. 7C, the LHS and RHS of the image are further bisected. The bisection of the LHS results in 55 for the top and 48 for the bottom. Therefore, the top left quadrant of this image will require more light than the bottom left quadrant. The tilt of the bottom lens will be slight in the upwards direction. This process is repeated for the RHS and so on with further bisections until the image is split into 8×16 sub regions.

We now calculate the lens shape for each of these regions. The in-plane focal distances (x and y) for each of the 8×16 regions of the spatial phase modulator are determined according to Equation 2A. The tilt of each lens is determined by the central coordinates of the spatial phase modulator regions and the corresponding display regions on the SLM; call these points $(x1, y1)_i$ for the $i_{th}$ region on the spatial phase modulator and $(x2, y2)_i$ for the $i^{th}$ display region on the SLM. The shift $m_{x,i}$ in x is then calculated by:

$$mx_i = -(x_{2,i} - x_{1,i})/2f_{x,i} \quad [3A]$$

and a similar expression can be used for the slopes in the y-direction. The lens shapes for each of the 8×16 regions are calculated using the derived focal distances and tilts inserted into Equation 1A.

Figure 8:
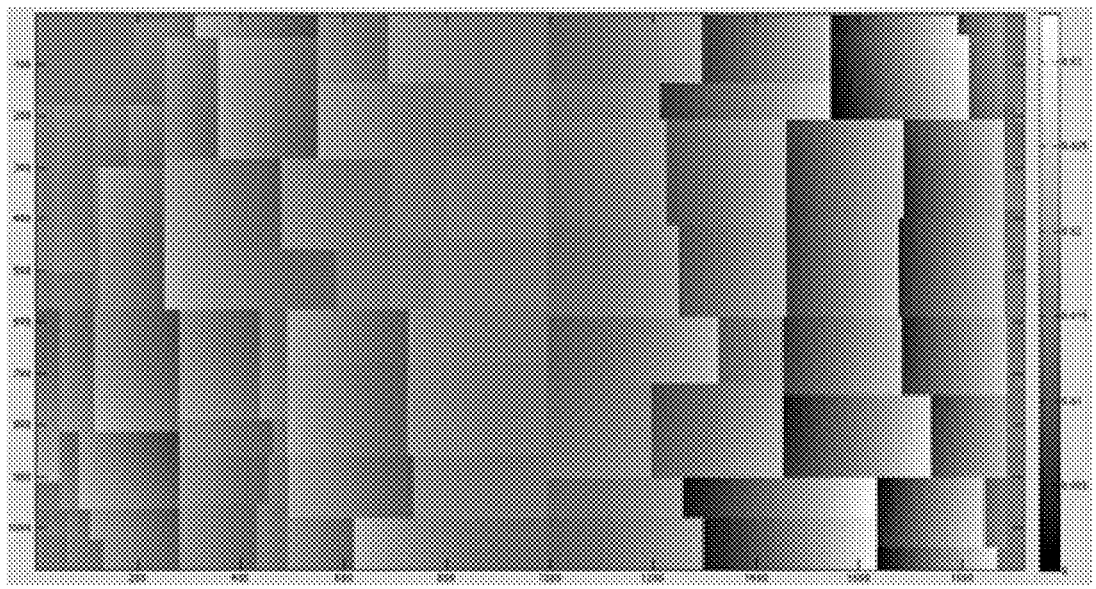
FIG. 8 illustrates an 8×16 zone set of lenses calculated for the image of Marilyn shown in FIG. 7A. The units on the right hand side are in mm.
Figure 9:
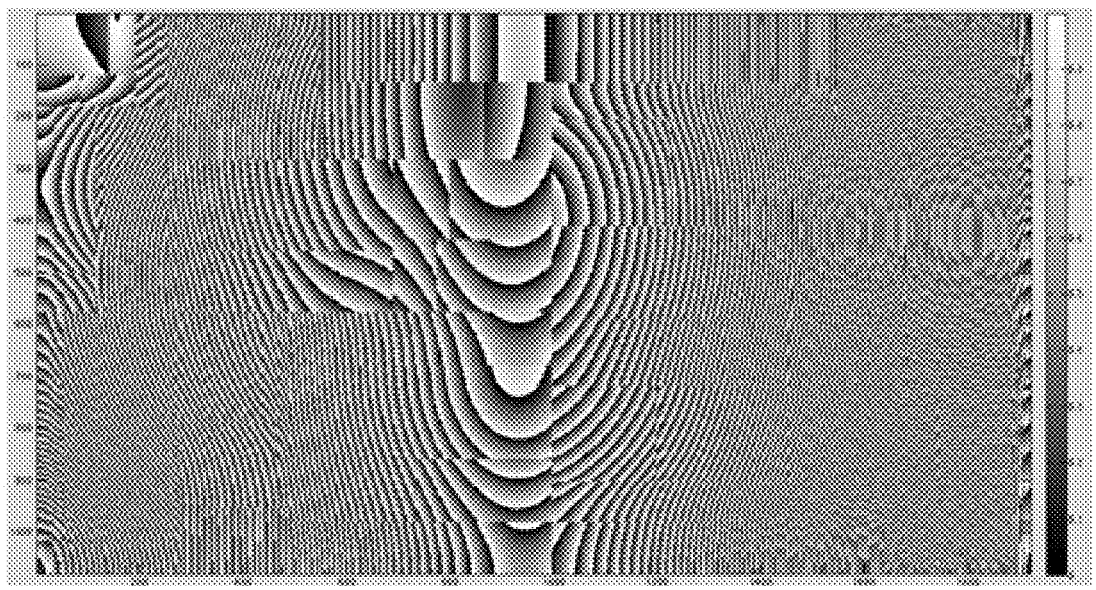
FIG. 9 shows the lens calculated in FIG. 8, wrapped to multiples of the wavelength of the light, lambda (638 nm in this particular example). The units on the right hand side (RHS) are in multiples of lambda. This mathematical mod-operation, mod(phase-pattern, lambda), is also known as phase-wrapping.

An example resulting lens array for the fully bisected 8×16 zone SNS process is shown in FIGS. 8 and 9.

Figure 10:
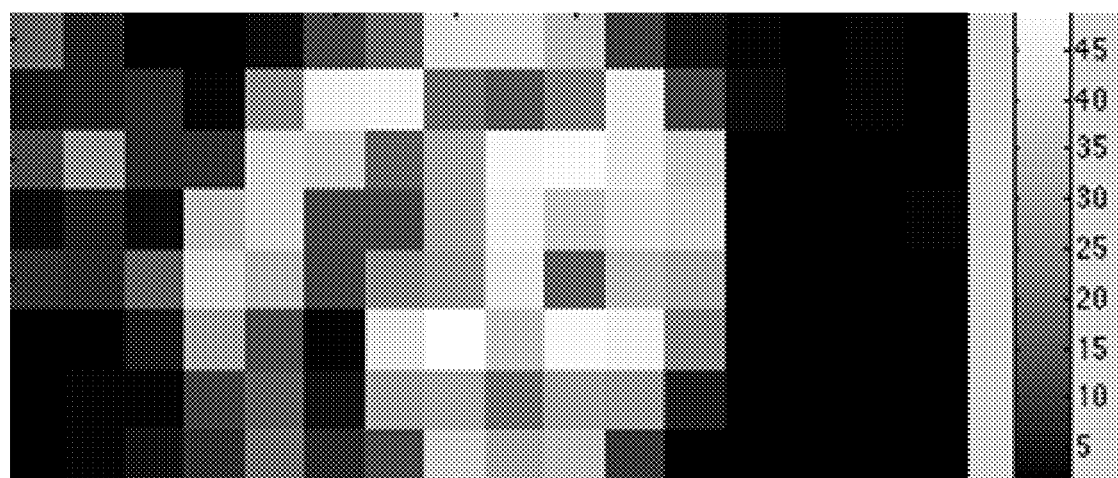
FIG. 10 is a calculated (ideal) output of the SNS-derived lens.

FIG. 10 shows the calculated result of bouncing light off the lens image shown in FIG. 9. In this example, the distance between the spatial phase modulator and the SLM was 170 mm.

Steered light from the spatial phase modulator shown in FIG. 10 can now be relayed onto the SLM. Note the units on the right hand side of FIG. 10. We see that by redirecting the light using only 8×16 zones, we can reach peak luminance levels over 45× above that which a uniformly illuminated imaging device could deliver. In some embodiments the peak luminance levels are in excess of 30 times or 40 times the full screen white level of the projector.

It is entirely possible that steering of light enables light levels above what is required for the image in question. In this case, a global reduction in light source power can be implemented (for example by pulse-width modulating it), or some of the light can be steered into a light-dump or some of the light can be removed by focusing the light through a variable aperture.

The regions where the various lenses meet (e.g. along edges of the source regions) may be smoothed out in order to eliminate sharp edges and possibly unwanted artifacts. A simple low-pass filter may suffice, or the offsets between neighbouring regions can be minimized for an adequate effect.

Approach 2: Equally Sized LETO Regions; Differently Sized SLM Regions.

For this discussion, we assume that a uniform light distribution is incident on the spatial phase modulator plane and is redirected onto a target image plane at some distance from the modulator plane. Other incoming light distributions can be used and accounted for. An SLM may optionally be placed in the target plane, but it is not important for the immediately following discussion.

Figure 11:
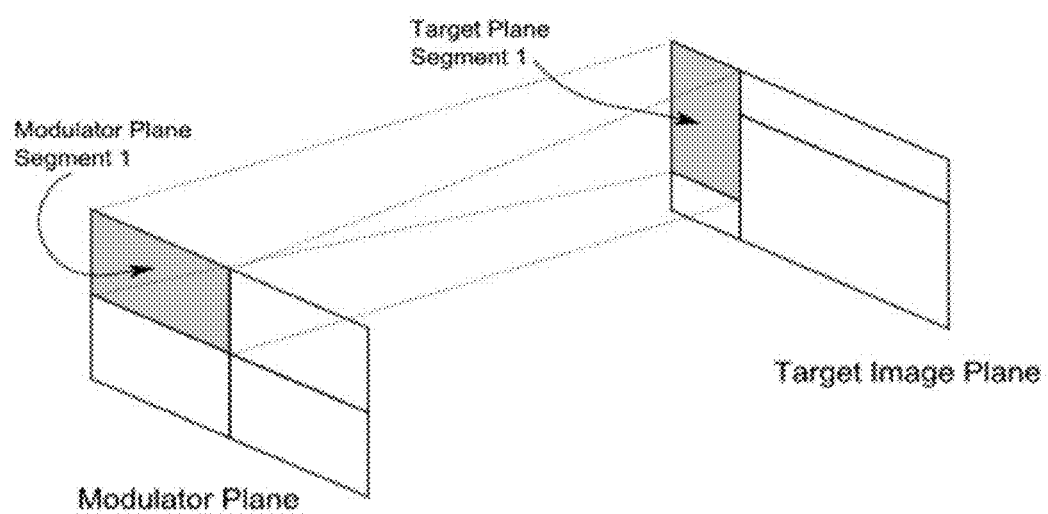
FIG. 11 shows how light from different regions or segments in the modulator plane (these may be called source regions) is redistributed by scaling and shifting it towards corresponding regions or segments in the target plane (these may be called display regions).

Uniform light incident on the modulator plane is redirected onto a target image plane at some distance from the modulator plane. The modulator plane is divided into segments (source regions) of equal area, each responsible for redirecting light onto a particular segment (display region) of the target image plane (see FIG. 11).

It is the intention of this approach that the portion of optical power confined in each display region relative to the overall target image is the same as the portion confined in each source region relative to that of the overall modulator.

The geometries of the display regions are subject to the desired image plane illumination profile, and may be computed using algorithms such as the Median Cut algorithm. In the Median Cut example, a target image plane segment with one quarter of the optical power of the entire image can be achieved by redirecting light from a modulator plane segment with one quarter of the area of the overall modulator.

Phase Modulator

A phase profile established on the modulator is used to redirect light to the target image plane in order to achieve the desired illumination profile. The phase profile can be computed on a source region-by-source region basis, where light incident on a source region is redirected by the phase profile on that source region toward the corresponding display region.

Calculating the phase profile for each source region can be made easier by defining both the source regions in the modulator plane and the display regions in the target plane as a grid of points denoting the respective location and orientation of each region.

A typical choice for the number of points in a source region or modulator segment is the number of pixels in that segment available for phase modulation. Each pair of corresponding source region and display region should have the same number of points distributed uniformly across the respective regions such that a one-to-one point map relating each pair of source region and display region is possible.

Redirection

Given the point map relating a particular pair of a source region and a corresponding display region, the phase profile that will achieve the desired light redirection can be obtained by a number of different approaches. The relationship between the phase profile and surface profile is given by the Hyugens-Fresnel principle. The gradient of the phase profile determines the steering effect of the phase profile on light. The phase profile is related to the surface profile of a physical lens by the refractive index of the medium (for a physical lens) and the governing equations of wave optics.

Since it is well known that a phase profile can be related to a surface profile of optical path lengths, the following approaches are described in terms of path lengths rather than phase.

Figure 12:
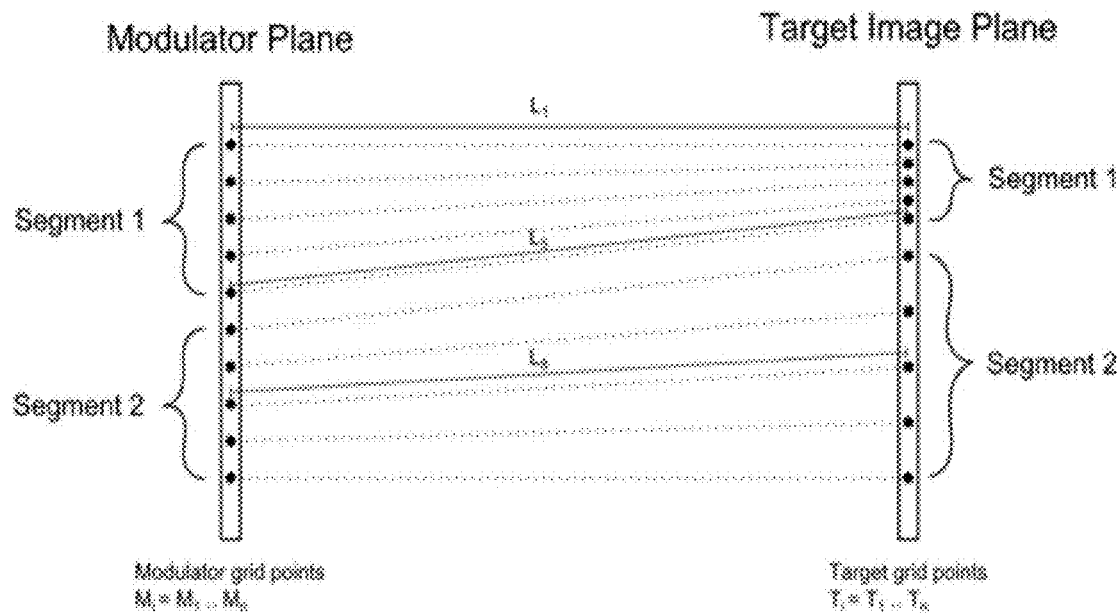
FIG. 12 is a diagram showing a modulator plane and target image plane, with corresponding regions on each, as well as a point array to be used in the mathematical derivation. In some embodiments the point array is constructed so that each point corresponds to a pixel of a spatial phase modulator in the modulator plane.

In one approach, the path length profile for the modulator segment consists of the physical distances separating corresponding points in the segment pair, see FIG. 12.

Referring to FIG. 12, we see that the optical path lengths between the modulator plane point map and the corresponding target image plane point map can be expressed as:

$$L_i = |\overrightarrow{M_i T_i}|, \quad [4A]$$

where $M_i$ is the coordinate of a particular point i in the modulator plane, $T_i$ contains the coordinates of the corresponding point in the target image plane, and $L_i$ is the length of the vector between the two points.

In other approaches, the center points of both a source region and a corresponding display region in the region pair are utilized. In one of those approaches, the path length profile consists of the distances separating the points in the source region (modulator segment) with points in a virtual plane located on the center of the display region (target plane segment) and that is normal to the vector connecting the segment centers. The points in the virtual plane used for the distances correspond to positions where the virtual plane intersects lines connecting the segment pair (see FIG. 13).

Figure 13:
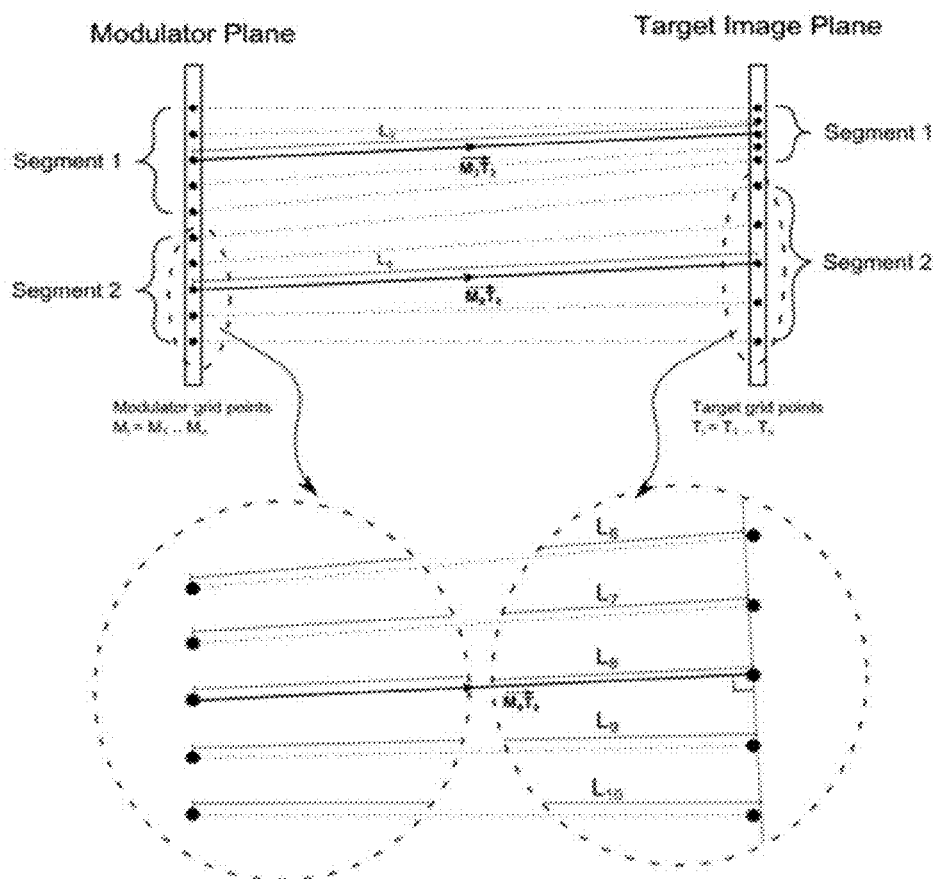
FIG. 13 is a diagram illustrating optical path lengths between a modulator plane point array and the corresponding target image plane point array.

Referring to FIG. 13, the optical path lengths between the modulator plane point map and the corresponding target image plane point map can be expressed as:

$$L_i = \frac{\overrightarrow{M_c T_c} \bullet \overrightarrow{M_i T_c}}{\overrightarrow{M_c T_c} \bullet \left(\overrightarrow{M_i T_i} / |\overrightarrow{M_i T_i}|\right)}, \quad [5A]$$

where $\overrightarrow{M_c T_c}$ is the vector connecting the segment pair centers, and $\overrightarrow{M_i T_c}$ is the vector connecting point $M_i$ on the modulator plane segment with $T_c$, the center point of the corresponding target plane segment. The dot • between the vectors denote the commonly used symbol for the vector dot-product.

In another approach, the path length profile consists of the distances separating the points in the source region (modulator segment) from points in a virtual parabola centered on the center of the corresponding display region (target plane segment). The points in the virtual parabola used for the distances may be located where the lines connecting the segment pair intersect at 90 degree angles with lines connecting the virtual parabola points to the center of the target plane segment (see FIG. 14).

Figure 14:
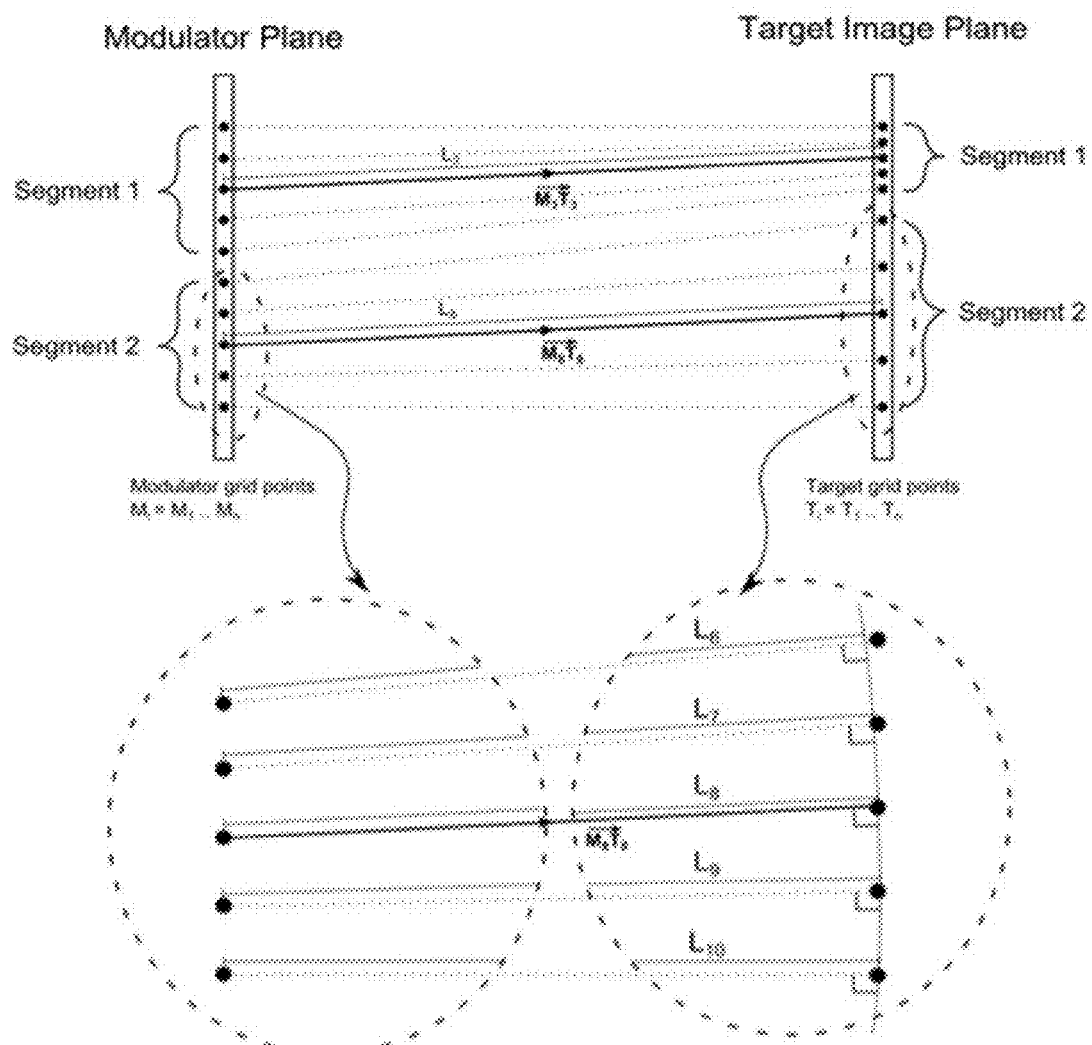
FIG. 14 is a diagram illustrating optical path lengths between a modulator plane point array and the corresponding target image plane point array according to an embodiment where the path length profile is made up of distances separating the points in a source region from points in a virtual parabola associated with a corresponding display region.

Referring to FIG. 14, the optical path lengths between the modulator plane point map and the corresponding target image plane point map can be expressed as:

$$L_i = \overrightarrow{M_i T_c} \cdot (\overrightarrow{M_i T_i} / |\overrightarrow{M_i T_i}|),\qquad [6A]$$

Another aspect of this invention provides other example methods for determining a configuration of a configurable optical element (e.g. a refractive or phase-modulating element) which will result in generation of a desired light field when light from a source interacts with the configurable optical element. In some embodiment the configurable optical element is dynamically reconfigurable. Such methods may be used to generate light fields corresponding to image data for high-dynamic range projection. In some embodiments the image data comprises video data and displaying frames of the video data comprises configuring the configurable optical element. In some alternative embodiments the method is applied to define a configuration for a fixed physical lens (e.g. a configuration that can be applied to make a lens by molding, machining etc.) in order to provide a lens that will create a desired image by interacting with light from a light source.

Figure 15:
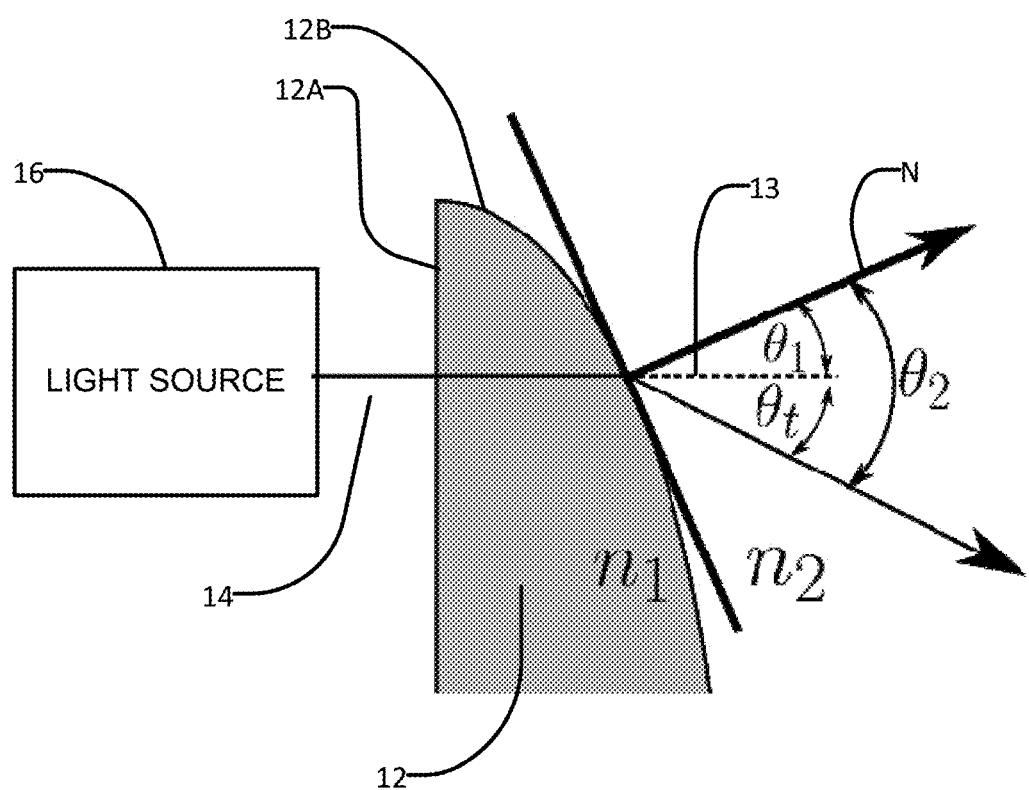
FIG. 15 is a diagram of an example physical lens. Light enters along the optical axis, is transmitted without deflection after entering the back lens surface and is then refracted at the front lens surface which makes an angle $\theta_1$ with respect to the optical axis. The transmitted angle $\theta_t$ with respect to the optical axis is then given by Snell's law.
Figure 34A:
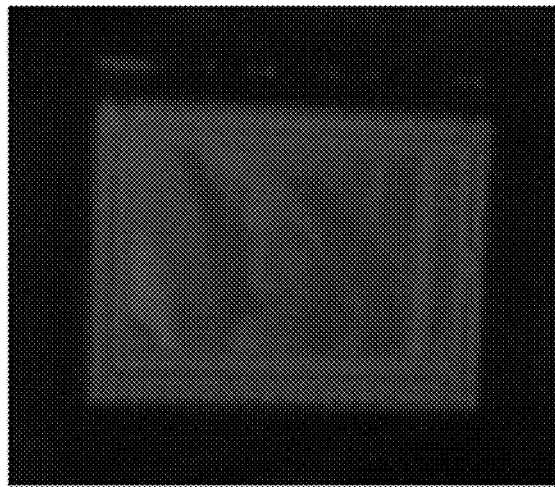
FIGS. 34A to 34D are photographs of projections from a prototype projector (LETO) with broadband illumination.
Figure 34B:
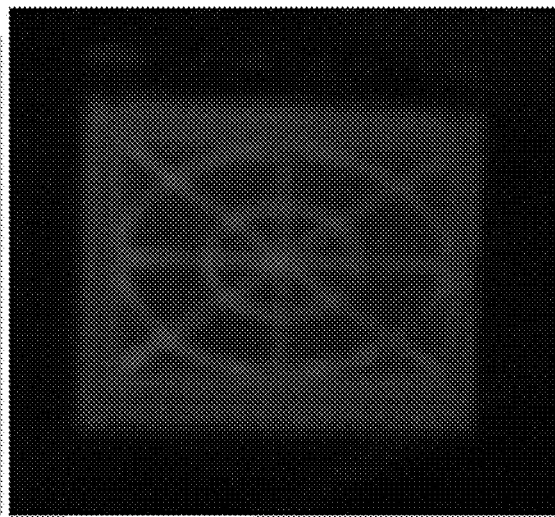
Figure 34C:
Figure 34D:
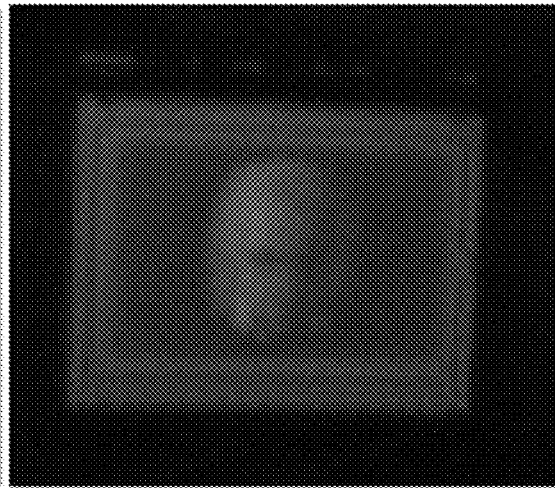

FIG. 15 shows an example arrangement 10 of a generalized refractive optical element 12 interacting with light 14 from a light source 16. This arrangement represents a general projector. Arrangement 10 is simplified in that element 12 has a planar rear surface 12A and light from light source 14 is collimated and arrives perpendicular to rear surface 12A. These conditions are not absolutely necessary but they simplify calculations and are useful to provide a clear explanation of the algorithms that may be applied to determine a configuration for element 12. Algorithms suitable for generating a configuration for element 12 may be modified in ways that will be apparent to those of skill in the art for cases in which the optical system in which element 10 is more complicated.

In arrangement 10, light reaches lens plane 12A travelling parallel to optical axis 13, enter a physical lens 12 at a surface 12A perpendicular to optical axis 13 and is refracted on reaching the far surface 12B of element 12 after which the light travels to an image surface. Under the assumption that the thickness of element 12 can be neglected for most purposes ("thin lens assumption") and surface 12B has relatively shallow gradients, the transmission coefficient of element 12 is near-constant.

The Fresnel equations serve as the imaging model when physical lens surfaces are desired. These equations relate the incident and transmitted angles ($\theta_1$ & $\theta_2$) to the refractive indices of the two materials ($n_1$ & $n_2$). Angles $\theta_1$ & $\theta_2$ are measured with respect to the surface normal vector, N which points from material of element 12 to material surrounding element 12. The incident and transmitted angles are related by the Snell equation:

$$\frac{\sin\theta_1}{\sin\theta_2} = \frac{n_2}{n_1}$$

where an incident ray 14 is parallel to optical axis 13, normal N is consequently oriented at $\theta_1$ with respect to axis 13. The angle of the transmitted ray $\theta_t$ with respect to optical axis 13 is then $\theta_t = \theta_2 - \theta_1$. This results in the following expression for the angle $\theta_1$ required to yield a given angle $\theta_t$.

$$\theta_1 = \tan^{-1}\left(\frac{\sin\theta_t}{\frac{n_1}{n_2} - \cos\theta_t}\right)$$

For thin lenses that are aligned with the optical axis, a paraxial approximation can be used which assumes $\sin\theta \approx \theta$ and $\cos\theta \approx 1$. With this assumption, the previous equation simplifies to:

$$\theta_1 = \left(\frac{n_2}{n_1 - n_2}\right)\theta_t$$

where element 12 is replaced by a phase modulator the relationship simplifies to the following:

$$\theta_1 = \theta_t$$

These relationships determine how incoming light rays are deflected by either physical refraction at the lens surface or by a phase-modulator. The goal of free-form lensing is to use these relationships to determine a lens or phase surface that focuses light in bright regions of the target image and defocuses light in dark regions. The following sections discuss three approaches that may be used to generate configurations for refractive and/or reflective and/or phase shifting elements that will yield desired light fields when illuminated.

Approach 3: Paraxial Deblurring Formulation

The paraxial deblurring formulation couples the mapping of light from source to target with lens-surface computation by introducing a paraxial assumption to the image formation model that greatly simplifies the problem to be solved.

The benefit of this approach is that the re-distribution of light is guaranteed to produce a valid physical lens that does not rely on appropriately chosen discrete elements. The challenge is that the problem to be solved is a poorly conditioned biharmonic system that tends to converge slowly with iterative methods while being too dense to factor and solve effectively, particularly on highly parallel hardware such as GPUs or FPGAs.

This section introduces an alternative solver based upon deconvolution. Conditioning issues with the system are reduced by solving the problem as a deconvolution problem in Fourier space, resulting in speedups of several orders of magnitude. The following sections introduce a basic paraxial model and then present an alternative formulation that is solved in Fourier space.

Image Formation Model

The image of a point on the lens plane on an image plane located at focal distance f is given by the following equations for a physical lens phase surface, respectively.

$$v^* = v + f\tan\left(\frac{n_1 - n_2}{n_2}\theta_1\right)$$

$$v^* = v + f\tan(\theta_1)$$

These equations can be approximated with the following linear equations using the paraxial assumption that $\sin\theta \approx \theta$ and $\cos\theta \approx 1$:

$$v^* = v + f\frac{n_1 - n_2}{n_2}\theta_1$$

$$v^* = v + f\theta_1$$

Using the paraxial approximation, the angle $\theta_1$ can further be related to the gradient of the lens surface or phase surface p(v) giving:

$$v^* = v + f\frac{n_1 - n_2}{n_2}\nabla p(v)$$

$$v^* = v + f\nabla p(v)$$

By defining a nominal focal length $\hat{f}$ to be f for a phase surface or $$\frac{n_1 - n_2}{n_2}f$$

for a physical lens, these two formulas can be collapsed into a single expression. The determinant of the Jacobian, J, of this mapping from v→v* then determines the magnification at any point on the image plane.

$$|J| = \left\|\begin{bmatrix}\frac{\partial}{\partial x}v^*(v)\\ \frac{\partial}{\partial y}v^*(v)\end{bmatrix}\right\|$$

$$= \left|\frac{\partial}{\partial x}v^*(v) \times \frac{\partial^*}{\partial y}(v)\right|$$

$$= \left\|\begin{bmatrix}1 + \frac{\partial}{\partial x}p(v)\\ \frac{\partial}{\partial y}p(v)\end{bmatrix} \times \begin{bmatrix}\frac{\partial}{\partial x}p(v)\\ 1 + \frac{\partial}{\partial y}p(v)\end{bmatrix}\right\|$$

$$= \left|\frac{\partial}{\partial x}(v + \hat{f}\nabla p(v)) \times \frac{\partial}{\partial y}(v + \hat{f}\nabla p(v))\right|$$

$$= 1 + \hat{f}\frac{\partial^2}{\partial x^2}p(v) + \hat{f}\frac{\partial^2}{\partial y^2}p(v) = 1 + \hat{f}\nabla^2 p(v)$$

The magnification is inversely proportional to the brightness on the image plane. Using the mapping v→v* and the above expression relates the intensity of the image of a point v, i.e.:

$$I(v + \hat{f}\nabla p(v)) = \frac{1}{|J|} = \frac{1}{1 + \hat{f}\nabla^2 p(v)}$$

This can subsequently be linearized via a first-order Taylor series to obtain the non-linear image-formation model in Equation 1.

$$I(v+\hat{f}\nabla p(v)) \approx 1 - \hat{f}\nabla^2 p(v) \quad (1)$$

This image formation model can be expressed as an inverse problem in which a phase/lens surface is sought that reproduces a target image as closely as possible. The resulting optimization problem is shown in Equation 2.

$$p(v)^* = \mathrm{argmin}_{p(v)}\int_\Omega (I(v+\hat{f}\nabla p(v)) - 1 + \hat{f}\nabla^2 p(v))^2 d\Omega \quad (2)$$

In Equation (2), I(.) is the image data (intensity at each point in an image); p(v) is phase as a function of position v on the optical element; $\Omega$ is the area of the image; $\hat{f}$ is the nominal focal length (defined above) and p(v)* is the solution configuration for the optical element.

A function (v)* that minimizes Equation (2) defines the lens or phase surface that best approximates the target image.

Solution Algorithm

This objective function provided by Equation (2) is non-linear due to the term $I(v+\hat{f}\nabla p(v))$, which can be interpreted as a warping of the target image 1. In order to obtain a linear model, a linearization of this warping may be introduced. Equation 2 may then be minimized in an iterative fashion as shown in Algorithm 1.

---
Algorithm1 1 Linearized optimization of Equation (2)
---

Procedure PARAXIAL CAUSTICS (I,f)
 // Initialize phase surface as a constant value: $p_0(v) \leftarrow 0$
 // Initialize iteration counter and start solve: $k \leftarrow 0$
 while $k < k_{max}$ do:
  // Warp target image by current solution: $I_p^k(v) \leftarrow I(v + \hat{f}\nabla p_k(v))$
  // Update the current solution by solving Equation (2)
   $p^{k+1}(v) \leftarrow \mathrm{argmin}_{p(v)}\int_\Omega (I_k^p(v) - 1 + \hat{f}\nabla^2 p(v))^2 d\Omega$
  // Update iteration index: $k \leftarrow k + 1$
 // Return computed mapping: return $p_{kmax}(v)$
 // Stop

---

At each iteration of Algorithm1, after discretization into pixels, a linearized least-squares problem is solved to minimize the sum of squared residuals $\frac{1}{2}\|I_p^k - 1 + \hat{f}\nabla^2 p\|_2^2$. This problem can be solved using commercially available solvers and other solvers currently known in in the art. Algorithm 1 has been validated in simulations and on a physical prototype setup and produces good results. However, the problem is poorly conditioned due to the squaring of the Laplace operator $\nabla^2$. For this reason, convergence using iterative solvers can be slow, while the system density makes direct solvers memory intensive.

Approach 4: Solution in Fourier Domain

For periodic boundary conditions, the problem exemplified by Equation (2) can be solved even more efficiently in Fourier-space. One approach is to apply proximal operators. For an arbitrary convex function, F(x), the proximal operator, $\mathrm{prox}_{\gamma F}$, (defined in Equation 3) acts like a single step of a trust region optimization in which a value of x is sought that reduces F but does not stray too far from the input argument q.

$$\mathrm{prox}_{\gamma F}(q) = \mathrm{argmin}_x F(x) + \frac{\gamma}{2}\|x - q\|_2^2 \quad (3)$$

For a least-squares objective $F(x) = \frac{1}{2}\|Ax - b\|_2^2$, the resulting proximal operator is shown below.

$$\mathrm{prox}_{\gamma F}(q) = (\gamma + A^T A)^{-1}(\gamma q + A^T b)$$

With periodic boundary conditions and A is a circulant matrix, this can be evaluated extremely efficiently in Fourier-space, shown in Equation 4.

$$\mathrm{prox}_{\gamma F}(q) = \mathcal{F}^{-1}\left(\frac{\mathcal{F}(b)\mathcal{F}(A)^*\gamma\mathcal{F}(q)}{(1 + \alpha)\mathcal{F}(A)^2 + \gamma}\right) \quad (4)$$

The notation $\mathcal{F}$ & $\mathcal{F}^{-1}$ indicate the forward and inverse Fourier transform, * indicates convex conjugation and multiplication/division are performed pointwise. The parameter $\alpha>0$ acts as an $L_2$ regularization parameter on the lens curvature. $L_2$ gradient penalties were also tried but found to have an adverse effect on solution quality.

By defining $A=\hat{f}\nabla^2$ and $b=1-I_p^k(v)$ and $q=p^k(v)$, the problem can be solved iteratively in Fourier space, resulting in Algorithm 2.

---
Algorithm 2 Paraxial caustics in Fourier space
--- procedure PARAXIALCAUSTICSFOURIER (I,f̂,γ)
   //Initialize phase surface as a constant value
   $p^0(v) \leftarrow 0$
   //Initialize iteration counter and constant parameters
   $A \leftarrow \hat{f}\nabla^2$
   $k \leftarrow 0$
   while $k < k_{max}$ do
     //Warp target image by current solution
     $I_p^k(v) \leftarrow I(v + \hat{f}\nabla p^k(v))$
     //initialize right hand side of least-squares problem
     $b \leftarrow 1 - I(v + \hat{f}\nabla p^k(v))$
     //Update the current solution by evaluating
     //the proximal operator in Equation 4
     $p^{k+1}(v) = \text{prox}_{\gamma F}(p^k(v))$
     //update iteration index
     $k \leftarrow k + 1$
   //Return computed mapping
   return $p^{k_{max}}(v)$

---

By caching the Fourier transform of $p^k(v)$, Algorithm 2 can be implemented with one image warping, some vector operations and one forward/reverse Fourier transform per iteration. All of these operations are highly parallelizable, either into per-pixel or per-scanline operations.

As shown, Algorithm 2 is a non-linear variant of a common proximal algorithm, the proximal-point method, which is a fixed-point algorithm for minimizing an arbitrary convex F consisting of recursively calling $\text{prox}_{\gamma F}$ by evaluating: $x^{k+1} \leftarrow \text{prox}_{\gamma F}(x^k)$.

A difficulty in the deblurring formulation is in assigning boundary conditions to the resulting lens/phase surface. It is desirable to map a rectangular lens to a rectangular image area, however the periodicity assumption when using Fourier can result in severe distortions near boundaries. FIG. 16A is an example image in which such distortions can be seen, especially along central portions of the top and bottom image boundaries.

Results

A selection of results for physical lenses made according to solutions obtained using Algorithm 2 are shown in FIGS. 20A, 21A, 22A, 23A and 24A. All lenses were computed at a resolution of 256×128 with a pixel pitch of 0.5 mm, a 100 mm focal length, with γ=1000 and α=2.0 using mirrored padding. Non-uniform rescaling, due to non-power-of-two input dimensions, resulted in a slightly wrong focal length. All renderings were computed at 130 mm focal length using Blender+LuxRender with normal smoothing and loop subdivision. All images are gamma corrected for display with a gamma of 2.2. The border around each image shows nominal full-screen white values. Computation times were approximately 1 second per image, but there is substantial room for code optimization via parallelization, pipelining and porting to GPU.

Algorithm 2 is able to reproduce relatively fine details. Redistribution of light is limited to roughly ¼ of the screen dimension, which can limit contrast for some very high contrast images. Lowering the smoothness parameter α can improve this, but might introduce artefacts as can be seen by comparing FIGS. 17B, 17C and 17D.

Approach 5: Area-Based Parameterization Formulation

Another approach to determining mappings from source to target is area-based parameterization. Area-based parameterization methods are based on subdividing the lens or phase surface into patches or regions which are then mapped onto the image-plane. Some examples of this approach are described for light field projectors in U.S. 61/893,270 (Light Field Projectors and Methods) and U.S. 62/031,250 (Methods and Apparatus for Light Steering Using Phase Modulated Imaging) both of which are hereby incorporated herein by reference for all purposes.

Mappings from source to target may be embodied in Fresnel mappings in the case of a physical lens or as gradients of the phase function in the case of phase modulation. Regardless of which image formation model is used, a method must be provided to determine what region on the lens plane should map to a particular corresponding region in the image plane for best reproduction of a desired light pattern.

The intensity of light within a region in the image plane may be controlled by varying the size of the corresponding region in the lens plane. Increasing the size of the corresponding region in the lens plane will increase the light intensity in the corresponding region of the image plane.

Figure 40:
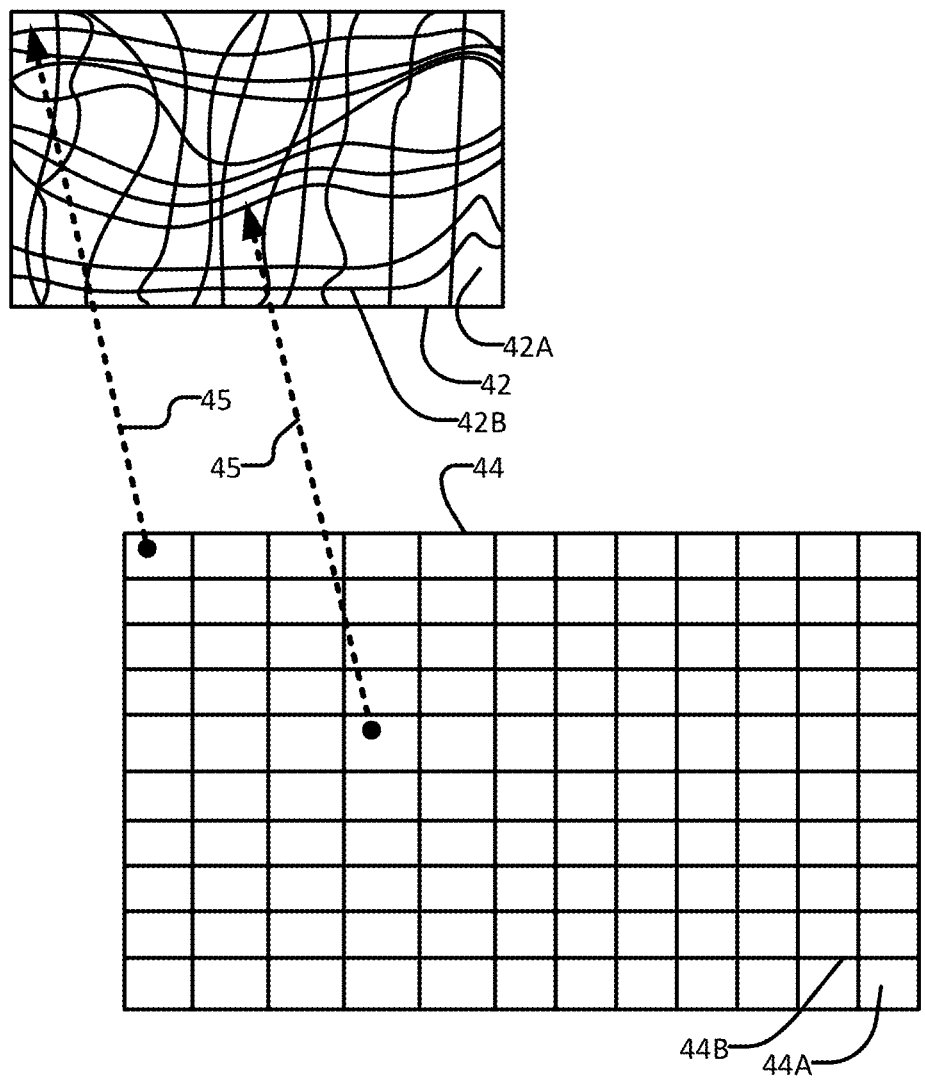
FIG. 40 schematically illustrates a mapping between source regions and target regions.

One way to establish mappings between a lens plane and an image plane is to divide both the lens plane and image plane into regions having boundaries and to establish a correspondence between regions of the lens plane and corresponding regions of the image plane. For example, FIG. 40 shows schematically a lens plane 42 divided into areas 42A by boundaries 42B and an image plane 44 divided into areas 44A by boundaries 44B. As indicated by arrows 45, each area 44A of image plane 44 corresponds to a corresponding area 42A of lens plane 42.

At this point it is worth noting that it is convenient but not mandatory that the image plane and lens plane are planar. In general, either or both of these surfaces may be curved. Also, although it is the case in some embodiments, it is not mandatory that there be a 1:1 correspondence between regions 42A and regions 44A. For example, in some embodiments two or more regions 42A may correspond to one region 44A. Also, it is not mandatory (although it is generally desirable) that regions 42A completely cover lens plane 42.

Conveniently, regions 42A tile lens plane 42 and regions 44A tile image plane 44. Regions 42 may be called "source regions" and regions 44 may be called "target regions" because regions 42 serve as sources of the light that illuminate corresponding regions 44 to replicate a target light pattern.

Conveniently, boundaries 42A are parameterized such that the sizes of regions 42A may be varied by altering the parameters that define boundaries 42B. Boundaries 42A and 42B comprise straight lines in some embodiments. In other embodiments boundaries 42A and/or 42B are curved.

One way to define regions 42A and 44A is by a triangulation with piecewise linear boundaries defining triangular regions. In such embodiments, the boundaries of the triangles may be conveniently defined (parameterized) by positions of the triangle vertices. Triangle vertex displacements then correspond to gradients of the phase function, while regions interior to the triangles correspond to areas of constant curvature. With this area parameterization, the mappings map piecewise constant regions on the lens plane to piecewise constant regions in the image plane.

An algorithm may be applied to find boundary configurations for boundaries 42B that will result in reproduction of a target light intensity in areas 44A in the image plane. For example, to determine triangle vertex point positions in the lens plane that will reproduce a target intensity within each triangle in the image plane. Where the lens plane is uniformly illuminated by a light source, the light intensity within a region of the image plane is given by the ratio of areas of the region of the image plane to the corresponding region(s) in the lens plane. In the following example, uniform illumination of the lens plane is assumed. However, the algorithm may readily be modified to account for non-uniformities in the illumination of the lens plane.

Example Embodiment

Input to the algorithm is a triangular mesh $M=\{T, V\}$. Here $V=\{V_1, \ldots, V_n\}$ is a set of vertices where $v_i \in \mathbb{R}^2$ and $T=\{T_1, \ldots, T_m\}$ where $t_j \in \mathbb{Z}^3$ are integer indices into V defining oriented triangles. The collection of triangles defines a piecewise linear discretization of space $\phi(x)=\{\phi_1(x), \ldots, \phi_m(x)\}$. The signed area of $t_j$ is then $A(V,t_j)=\frac{1}{2}(v_{t_{j,2}}-v_{t_{j,1}}) \times (v_{t_{j,3}}-v_{t_{j,1}})$.

The parameterization formulation of light redistribution seeks a set of vertex positions $V^*=\{V_1^*, \ldots, V_n^*\}$ on a source surface such that $A(V^*,t_j)=I_j A(V,t_j) \forall j \in [1, m]$, where $I_j$ is the target intensity with respect to the source intensity. This source intensity is assumed constant. It is straightforward to accommodate a known non-constant light intensity from the light source. In some embodiments the source may be controlled to provide a non-constant light intensity that facilitates display of a particular image. For example, the source may be controlled to provide an intensity distribution that is more intense in regions corresponding to larger intensity in the image and less intense in regions corresponding to darker regions in the image.

Since the target intensities may have wide variation, this condition can be expressed by the following objective function:

$$E_T(V^*) = \frac{1}{2} \sum_{j=1}^{m} \left( \frac{A(V^*, t_j)}{I_j + \varepsilon} - A(V, t_j) \right)^2 \quad (5)$$

Normalizing by the target intensity ensures that errors are weighted equally regardless of whether they correspond to bright or dark regions of the target image. The constant $0 < \varepsilon \ll 1$ serves to regularize the problem in the event that the target intensity is exactly zero.

Conservation of energy requires that $\Sigma_{j=1}^{m} A(V^*,T) = \Sigma_{j=1}^{m} A(V,T)$ (assuming no losses in whatever optical system takes light from the lens plane to the image plane). It is therefore desirable to adjust the total amount of light that reaches the image plane to match the integrated target intensity. This can be achieved by pre-scaling the source intensity, for example, by modulating the output of a light source, passing light from the light source through an optical system comprising a variable aperture and/or including a light modulator in an optical path between the lens plane and image plane.

A further physical constraint is that light cannot be subtracted. Therefore, negative-area source regions do not make physical sense. An algorithm may include the constraint that $A(V^*,T_j)) \geq 0 \forall j$, which also requires that the resulting parameterizations are bijective.

Vertex positions, $V^*$, which result in a minimization of Equation 5 yield triangles corresponding to high target intensity levels dilating and triangles corresponding to low target intensity levels contracting. There is little need for additional constraint on the vertex positions beyond that the resulting triangles maintain positive area.

Attempting to optimize Equation 5 directly can result in poorly distributed vertices. An example is shown in FIGS. 18A and 18C. Accuracy of reproduction of a target light field (e.g. an image) can be improved significantly by introducing curl-regularization, which restricts the solution space to those with low curl. For example, compare FIGS. 18B and 18D to FIGS. 18A and 18C.

Approach 6: Adding Curl & Smoothness Regularization to Approach 5

An example curl-regularizer is defined by Equation 6, which is expressed per-triangle of the computational mesh.

$$E_{V\times}(V^*) = \sum_{j=1}^{m} \int_{x \in t_j} (\nabla \times \Psi_j(V^* - V, x))^2 \, dx \quad (6)$$

If the input is in the form of a tessellated regular grid, the regularizer can be equivalently expressed in the form of finite differences on the grid rather than its component triangles.

Incorporating curl-regularization results in lower distortion in the point mappings. Reducing curl in the point mappings also advantageously results in vertex displacements that can be better approximated by the gradient of a smooth and continuous lens surface. This is because the positions of the vertices are ultimately applied to define the gradient of the resulting lens or phase field, either explicitly in the case of phase, or implicitly through the Fresnel mapping in the case of a physical lens.

In addition to the curl-regularization, some embodiments also apply a smoothness regularizer. Equation 7 provides one example of a smoothness regularizer.

$$E_V(V^*) = \sum_{j=1}^{m} \int_{x \in t_j} (\nabla \Psi_j(V^*))^2 \, dx \quad (7)$$

An example optimization incorporating both curl and smoothness regularizer terms is shown in Equation 8.

$$V^* = \operatorname{argmin}_{V^*} E_T(V^*) + \beta E_{V\times}(V^*) + \alpha E_V(V^*) \quad (8)$$

subject to: $A(V^*,T_j) \geq 0 \forall j$ \quad (8)

Equation 8 is a non-convex quartic function of the vertex positions $V^*$ subject to quadratic constraints and is consequently non-trivial to optimize. The following section describes approaches that may be used to find optimal solutions to Equation 8.

Numerical Solution

In some embodiments the curl-regularized objective in Equation 8 is solved using the limited memory Broyden-Fletcher-Goldfarb-Shanno method (L-BFGS). Various implementations of L-BFGS are publicly available. These include libBFGS for the C programming language.

L-BFGS uses a history of objective function gradient evaluations to build an approximation to the inverse Hessian matrix to compute a search direction. Once found, a secondary 1D optimization is performed along this search direction seeking an approximate minimizer. Advantageously L-BFGS does not require that the Hessian be re-evaluated for every value of $V^*$.

The non-negativity constraints $A(V^*,t_j) \geq 0$, prevent pre-computing system matrices or preconditioners. These constraints may be implemented using a log-barrier method which introduces a penalty term for each triangle. An example penalty term is shown in Equation 9 which may be added to Equation 8.

$$E_N(V^*, \mu) = \sum_{j=1}^{m} -\frac{1}{\mu} \log(A(V^*, t_j)) \qquad (9)$$

Initially the barrier parameter $\mu$ is set to to a large value that is progressively decreased. For example, the barrier parameter may be scaled by a factor $\tau \in (0,1)$. The factor may be constant. The resulting penalty rapidly becomes a more accurate approximation to the original constraint condition $A(V^*,t_j) \geq 0$.

---
Algorithm 3 Numerical optimization of area-based parameterization
---

```
procedure AREAPARAMETERIZATIONSOLVE (I, V̂*, T)
  //Initialize barrier parameter
  μ ← 1
  //Initialize initial mapping
  V* ← V̂*
  while μ > μ_min do
    //Solve for updated mapping via L-BFGS
```

$$V^* \leftarrow \operatorname{argmin}_{V^*} E_T(V^*) + \frac{\beta}{2} E_{\nabla} \times (V^*) + \frac{\alpha}{2} E_{\nabla}(V^*) + \delta E_N(V^*, \mu)$$

```
    //Adjust barrier parameter
    μ ← τμ
  //Return computed mapping
  return V*
```

In many cases, the penalty can be omitted completely (e.g. by setting $\delta=0$) since the inverse scaling by target intensity causes flipped triangles to only occur in dark areas of the image. This dramatically improves the performance of the method, since multiple optimizations at different $\delta$ values can be replaced by a single optimization.

Solution in a Scale-Space

Although the curl-regularizer helps to restrict solution to those that are integrable, since the objective function is a quartic function of point mappings, it is possible for the optimization to become stuck in a local minimum of the objective function in Equation 8. In order to help improve this, the optimization can be performed in a scale-space from coarse to fine.

In order to help avoid getting stuck in local minima, Equation 8 is solved in a scale-space from coarse to fine. Pseudo-code for this is shown in Algorithm 4.

---
Algorithm 4 Scale-space optimization of area-based parameterization
---

```
procedure AREAPARAMETERIZATIONRECURSIVE (I, k)
  w ← width(I)/2^k
  h ← height(I)/2^k
  I_C ← BlurAndDownsample (I, w, h, σ)
  if w < 10 or h < 10 then
    //Base level, compute root parameterization
```

$$\sigma \leftarrow \frac{2^k}{2}$$

---
Algorithm 4 Scale-space optimization of area-based parameterization
-continued
---

```
    //Generate a uniform triangulation of the image domain
    V, T ← UniformMesh (w, h)
    //Optimize for the mapped point positions
    V* ← AreaParameterizationSolve (I_C, V, T)
    //Return computed mappings
    return V*, T
  else
    //Recursively compute parameterization and linearly upsample
    V_C*, T_C ← AreaParameterizationRecursive (I, k + 1)
    V̂*, T ← UpsampleLinear2X(V_C*, T_C)
    //Solve for current scale using V̂*, T as initial conditions
    V* ← AreaParameterizationSolve (I_C, V̂*, T)
    //Return computed mappings
    return V*, T
```

Provided that $\beta \neq 0$, Algorithm 4 ensures that the resulting parameterizations are bijective. This is guaranteed since triangles are upsampled by a factor of 2×, so every subdivided triangle is entirely-contained within a single source triangle.

The multiscale procedure allows the method to recover point mappings with large displacement and low curl. This results in point displacement fields that are almost integrable. This may be addressed by the code when integrating the point displacements to compute the final lens surface or phase function.

Phase & Lens Surface Generation

Once the parameterization is complete one can generate a physical lens surface from the point displacements $V-V^*$, where V represents the points on the target image plane and $V^*$ represents the points on the lens surface. These displacements determine the in-plane offset from a point on the lens surface to the image plane and consequently determine the angle from the lens surface to the mapped point with respect to the optical axis.

$$\theta_1 = \tan^{-1}\left(\frac{v - v^*}{f}\right)$$

$$\theta_1 = \frac{n_2}{n_1 - n_2} \tan^{-1}\left(\frac{v - v^*}{f}\right)$$

These formulas assume that incident light is parallel to the optical axis and are measured with respect to the optical axis in a plane parallel to the plane containing the optical axis and outgoing ray direction.

The normal of the phase/lens surface is consequently constrained to a plane parallel to the plane containing the optical axis and outgoing ray direction, making an angle with respect to the optical axis of $\theta_1$. Integrating these normals, in the ideal case of curl-free displacements, yields the desired phase/lens surface. However, these vectors are only defined at mesh vertices. To accommodate this, the integration may be performed using an unstructured mesh (e.g. using the finite element method) or the normals may be resampled to the pixels of the phase/lens surface. The following example implementation takes the latter approach. This allows flexibility in the integration method chosen.

To perform the resampling, the triangulation normals may be rasterized onto an image representing the phase/lens surface. Phong interpolation may be used in this rasterization which results in normal fields that can be exactly represented with piecewise quadratic patches.

If the resampled normal field is curl-free, the lens/phase surface can be integrated directly by solving a Poisson equation. In practice the resampled normal field is usually not curl-free. This does not necessarily imply that a physical lens cannot reproduce the target normal field, only that a continuous and smooth physical lens cannot. Non-smooth, and possibly even discontinuous, lenses can reproduce a much wider range of normal fields, at the possible expense of visual artefacts near the discontinuities.

This leads naturally to the idea of using sparse optimization methods to perform the integration, seeking a lens surface that satisfies the normal fields well except at a sparse set of kinks or discontinuities. These methods are attractive since they automatically determine the topology of any non-smooth regions. This is unlike using proscribed patches.

Some suitable sparse optimization methods are variations of least absolute deviation (LAD) problems, which is defined below:

$$p = \operatorname{argmin}_p \|Gp - N\|_1 \quad (10)$$

In Equation 10, the matrix G represents the discrete gradient operator, p is the lens or phase surface to be recovered and N is the target normal field. Variations of the LAD problem include using a sparser norm, e.g. the zero norm or a non-convex but still continuous norm. After experimenting with several options, a weighted LAD formulation, shown in Equation 11, was chosen for a prototype embodiment.

$$p = \operatorname{argmin}_p \|WGp - WN\|_1 \quad (11)$$

W is a diagonal weighting matrix that is used to favor certain discontinuity locations over others. With two rows in the gradient matrix per pixel in the resulting normal field, the weight for the $W_{2i,2i}$ and $W_{2i+1,2i+1}$ may be set to:

$$\sqrt{\frac{1.0}{\max(\varepsilon, a_i)}},$$

where $a_i$ is the mapped area of pixel i. This weighting function magnifies normal errors in dark regions, which encourages the $L_1$ optimization to place discontinuities there. Alternative weighting could consider smoothness of the parameterization. Equation 11 may be solved using any number of numerical methods for sparse reconstruction, including ADMM, Primal-Dual methods or Linear Programming formulations.

The area parameterization methods described herein can be parallelized on a GPU or FPGA or other suitable hardware since these methods can be performed using a matrix-free algorithm that relies on only gradient evaluations and simple vector operations as inputs to a L-BFGS optimization. Gradient computation can be performed analytically in parallel per-pixel.

Methods as described herein may be optimized for faster processing and/or more accurate rendition of a target light pattern in various ways. For example, L-BFGS can parallelize across dot and outer products. Furthermore, tuning of line-search parameters in the L-BFGS algorithm, parallelizing gradient computation and/or avoiding temporaries as well as optimizing for cache reads and removing temporaries may result in significant speed increases in comparison to the prototype system used to generate the example images shown in FIGS. 106B, 107B, 108B, 109B, 110B, 121B, 122B, 123B, 124B and 125B.

By exploiting the multiscale structure, faster methods with better parallelizability could be achieved by performing the area optimization using a variation of the method which parallelizes over independent sets of vertices.

Undesirable artefacts in dark regions may be reduced by altering the normal integration procedure to work on the triangle mesh, rather than a resampled pixel grid as described above. Further improvement could be achieved by optimizing for the projection of each lens/modulator pixel onto the target image rather than each target image pixel onto the lens/modulator. This would reverse the roles of light and dark in the resulting optimization, possibly leading to artefacts in bright regions, but would avoid resampling. A disadvantage is that the resulting optimization is likely to be less stable: minor variations in the positioning of a modulator/lens pixel may result in very rapidly changing intensities within the target image when optimizing for projections onto the target image.

Figure 43A:
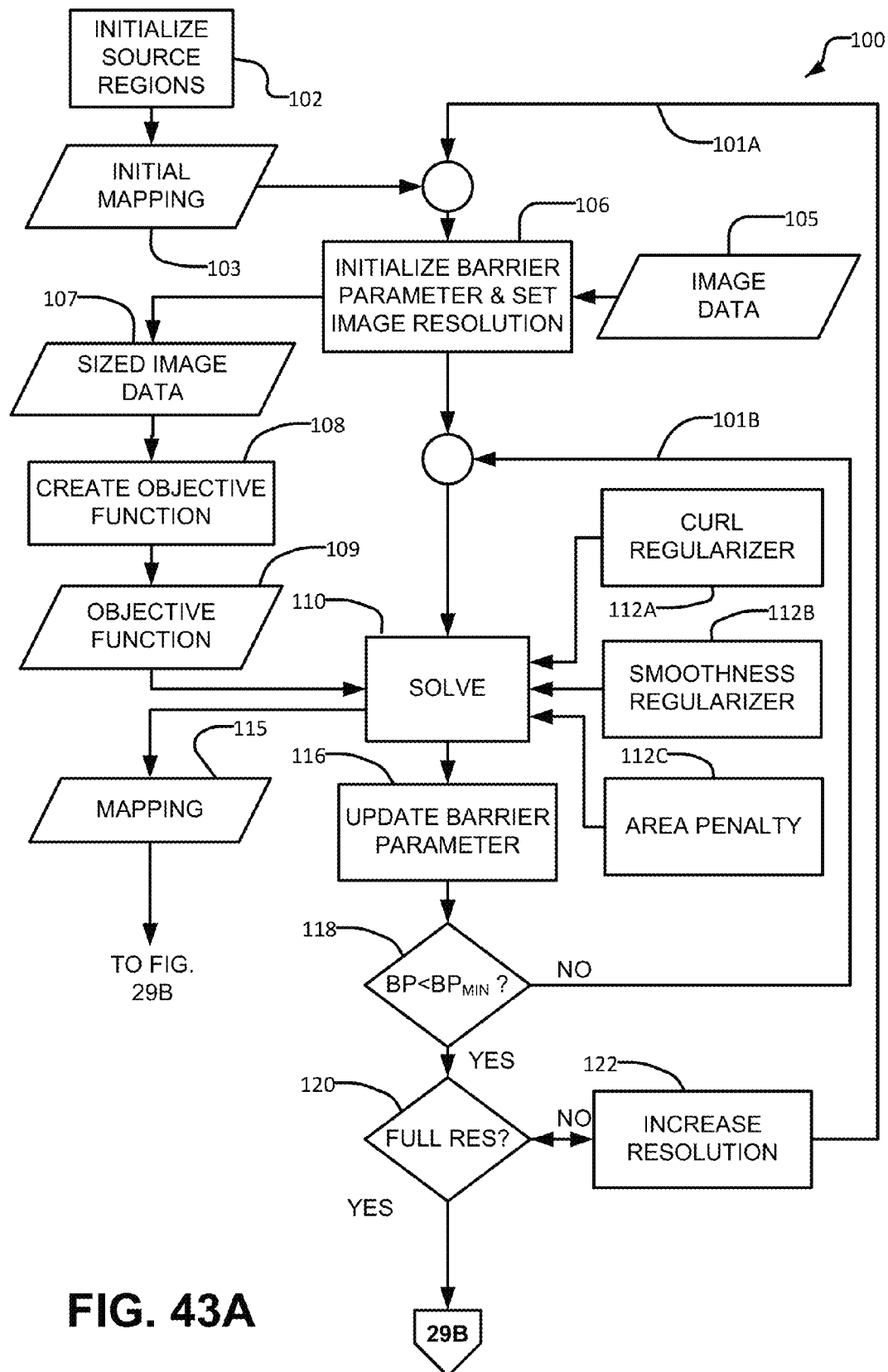
FIGS. 43A and 43B are a flow chart illustrating a method according to an example embodiment.
Figure 43B:
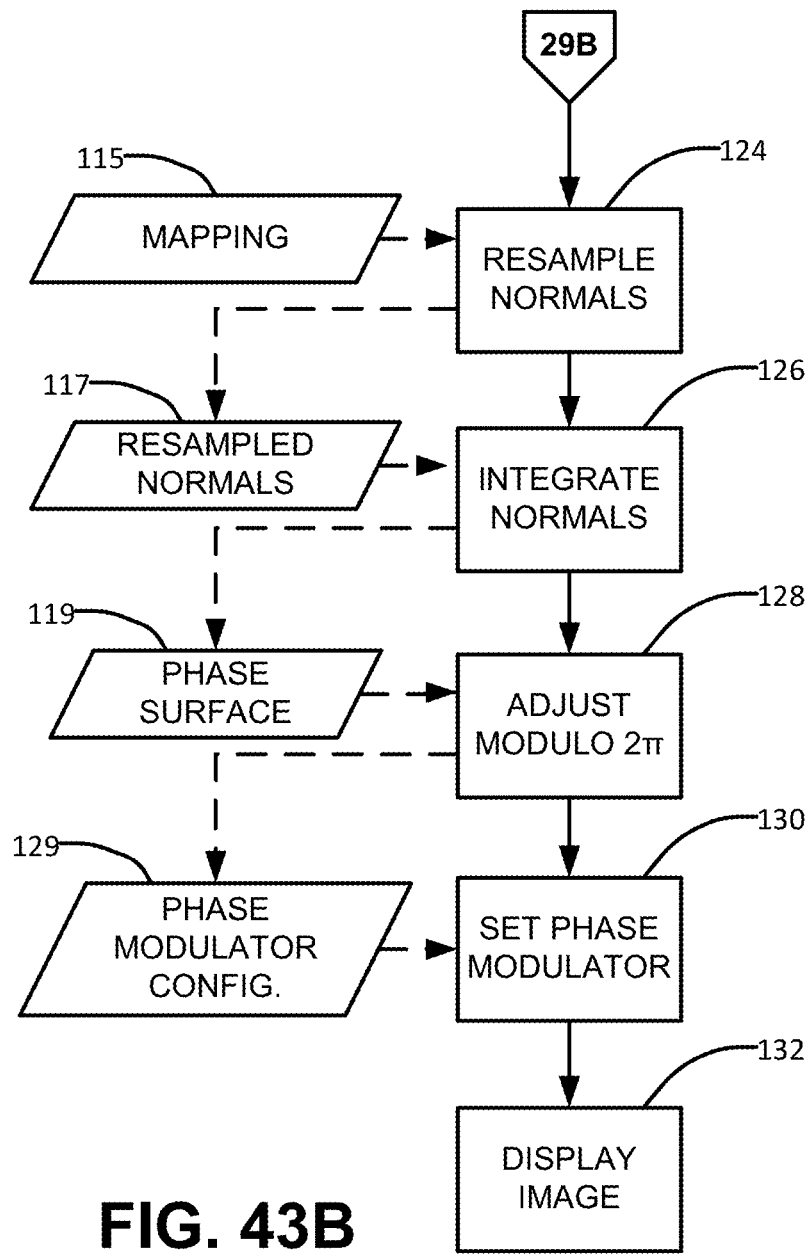

FIGS. 43A and 43B illustrate a non-limiting example method 100. Method 100 incorporates both multi-scale processing performed by loop 101A which repeats for increasing resolution levels and a variable barrier parameter implemented by loop 101B which repeats for decreasing values of a barrier parameter. Alternative methods perform only one or neither one of loops 101A and 101B.

At block 102 source regions are initialized to provide an initial mapping 103. Block 102 may, for example, comprise assigning locations to vertices defining triangular or otherwise-shaped source regions. The number of source regions (as well as the number of corresponding display regions) may vary with the current scale/resolution.

Image data 105 is used to construct an objective function 109. In the illustrated embodiment, the resolution of image data 105 is set at block 106 which also sets a current value for a barrier parameter. Block 106 may, for example, comprise downsampling or downsampling and filtering image data 105 to yield sized image data 107. Block 108 uses the sized image data to generate an objective function 109. Objective function 109 is supplied to block 110 which solves for an updated mapping 115. Block 110 may implement a L-BFGS solver algorithm, for example. Block 110 may invoke one or more of a curl regularizer 112A, a smoothness regularizer 112B and an area penalty 112C as described above.

In block 116 the barrier parameter is updated (for example by scaling the current value for the barrier parameter or selecting a next one of a plurality of decreasing barrier parameters. Block 118 checks to see whether the updated barrier parameter is below the smallest barrier parameter value to be used. If the updated barrier parameter value is not below the smallest barrier parameter value to be used (NO result in block 18) processing loops back via loop 101B to repeat for the next barrier parameter value. Blocks 116 and 118 may be reversed in order with an appropriate change to the test of block 118.

In the case of a YES result at block 118 (indicating that all barrier parameter values for the current scale have been completed), block 120 checks to see if all scales have been completed (e.g. to see whether the current resolution is full resolution or a maximum resolution. If so, processing continues in FIG. 43B. Otherwise block 122 increases the resolution of mapping 115 and the objective function and processing loops back by loop 101A to obtain an updated mapping at the new resolution.

FIG. 43B illustrates a continuation of method 100 in which mapping 115 is processed to drive a light projector. In block 124, the normals for source areas defined by in mapping 115 are resampled to yield resampled normal 117. In block 136 the resampled normal are integrated to yield a target phase surface 119. In block 128 the phase shift values in phase surface 119 are adjusted modulo $2\pi$ to yield phase modulator configuration data 129 so that they are within the range of a phase modulator. In block 130 the phase modulator is driven according to phase modulator configuration data 129. In block 132 an image is displayed.

Approach 7: Assignment Problem Formulation

A variation of the above approach generates mappings from illumination source to target image using an assignment problem formulation instead of or in addition to a formulation exemplified by Equation 8. Assignment problems and techniques for solving them are common within the field of operations research. An example definition of an assignment problem is shown in Equation 12 for a set of source points $s_i$ and target points $t_j$ of equal cardinality.

$$w = \operatorname{argmin}_w \sum_i \sum_j C(i, j) w_{i,j} \qquad (12)$$
$$\text{subject to: } \sum_j w_{i,j} = 1 \, \forall \, i$$

The matrix $C(i,j)$ is a cost function indicating the cost of mapping $w_{i,j}$ units of source point i to target point j, while the constraints ensure that sources and targets are completely mapped. In the standard linear assignment problem, the weights $w_{i,j}$ are allowed to be fractional. Variations can require binary $w_{i,j}$.

If $s_i$ is a source position and $t_j$ is a target position, common cost functions $C(i,j)$ are the Manhattan and Euclidean distances. In many cases, the cost function is sparse, meaning that only a subset of possible assignments (i,j) are permitted, with infeasible matches implicitly assigned infinite cost.

This problem can be applied to caustic generation by generating source and target point distributions proportionally to source and target luminance and then computing the optimal assignments between source and target by solving Equation 12. These assignments then determine the outgoing angles from the source, and the Snell mapping and normal integration methods discussed above can then be used to arrive at a configuration for an optical element at the lens plane. To solve Equation 12 several approaches can be used including linear programming, or, in the discrete case seeking a 1:1 mapping, the auction algorithm or the Hungarian algorithm.

Caustic formation via Equation 12 may be advantageous, e.g. to minimize shear which induces curl in the resulting normal fields These advantages can be traded off against the computation expense of solving Equation 12 on the point set in question. Equation 12 can require considerable computation to solve especially for large point sets with non-sparse cost functions. Introducing sparsity in distance (Manhattan or Euclidean) cost functions limits the steering effect of lensing, effectively constraining modifications to local regions.

In an example method, the assignment problem formulation is applied to refine the point mappings computed by the area parameterization method described above to reduce curl in the resulting normal maps. This would also avoid having to solve a dense assignment problem, which is computationally expensive, replacing it instead with a sparse problem that is quicker to solve.

Comparison of Results

This section presents a comparison of the paraxial deblurring and area parameterization approaches. For paraxial-deblurring, all lenses were computed at a resolution of 256×128 with a pixel pitch of 0.5 mm, a 100 mm focal length, with $\gamma=1000$ and $\alpha=2.0$ using mirrored padding. Non-uniform rescaling, due to non-power-of-two input dimensions, resulted in a slightly wrong focal length. All renderings were computed at 130 mm focal length. Computation times were approximately 1 second per image but there is substantial room for code optimization via parallelization, pipelining and porting to GPU.

For area-parameterization, all lenses were computed with $\epsilon=0.05$, $\alpha=0.05$ and $\beta=10.0$ and $\delta=0$. This selection of parameters disables the requirement that all source areas (e.g. triangles) are constrained to have positive area. However, the resulting parameterizations are often bijective or close to bijective. This can be seen in FIGS. 105A and 105B, where even though dark regions of the image are severely compressed (indicating very little light being mapped to them), they remain convex. The tendency of the algorithm to yield bijective mappings results at least in part from the normalization by target intensity, which results in the optimization penalizing the relative error in achieving a target magnification factor rather than an absolute error. Computation time was approximately 5-10 seconds per frame, but could be sped up by a factor of 4 by working at the same resolution as the paraxial deblurring results, bringing the two computation times closer together.

A comparison of the Paraxial-deblurring and area-parameterization approaches is presented in FIGS. 20A to 24C. Each image has a grey border that indicates the nominal incident illumination and a thin black border indicating no illumination. All images are gamma corrected with a gamma of 2.2 except for the Einstein area parameterization image of FIG. 20B which uses a gamma of 3.0. The images were rendered from mesh files using Blender+LuxRender with normal smoothing and Loop subdivision enabled. Computation times were approximately 1 second per image, but there is substantial room for code optimization via parallelization, pipelining and porting to GPU.

Overall, it can be seen that the paraxial-deblurring formulation does a better job of reproducing fine details than the area-parameterization method: results were computed at approximately ⅛ scale for the paraxial-deblurring method compared to ¼ resolution for the area-parameterization and yet still show finer details than are present in the area-parameterization results. This difference can be attributed mostly to the fact that the area-parameterization method can provide considerably stronger steering than the paraxial-deblurring method.

Both methods distort the input images somewhat. This is partly due to resizing artefacts and part due to the lenses becoming thick enough that the thin-lens assumption does not apply well. Some lenses have thickness approximately 10% of their focal lengths. Much of the distortion can be corrected by slightly adjusting the distance of the lens from the image-plane.

Experimental Results

Several phase patterns were computed for use on a prototype projector. The prototype projector uses a coherent 532 nm green laser source which is expanded and relayed onto a $2\pi$ "LETO" phase modulator. The output of the phase modulator is then relayed to a projection lens and onto the screen. Most patterns used default parameters from the previous section. However, the "candle" image used $\epsilon=0.1$. The "candle" (FIG. 36A), "Einstein" (FIG. 32A) and "avengers" (FIG. 35A) images used $L_2$ integration.

Comparison images between the paraxial deblurring and area parameterization results as captured using the same camera settings ($ISO_{800}$, 0.01 s, F20) are shown in FIGS.

29B to 32C. The paraxial deblurring results have relatively low contrast which can make it challenging to see the structure of the image. The area parameterization results have much better contrast, but are sensitive to alignment within the projector optics as well as to uniformity of the illumination of the LETO. Minor misalignments in the projector can result in severe local distortion of the resulting images; several of the results show these distortions.

FIGS. 33A to 33H show similar comparisons for broadband illumination of the LETO from a low-power white LED with the output image focused on a white business card using the same phase patterns as in FIGS. 29B to 29C. Distortions are reduced somewhat, as are artefacts introduced by wrapping in the phase patterns, at the expense of a raised black level and chromatic aberrations. In this case the area-parameterization still out-performs the paraxial deblurring approach.

A set of results from the area-parameterization method using camera settings that highlight contrast is shown in FIGS. 34A to 34D. These images show that the area-parameterization method diverts significant portions of the light from dark regions to light regions.

Figure 41:
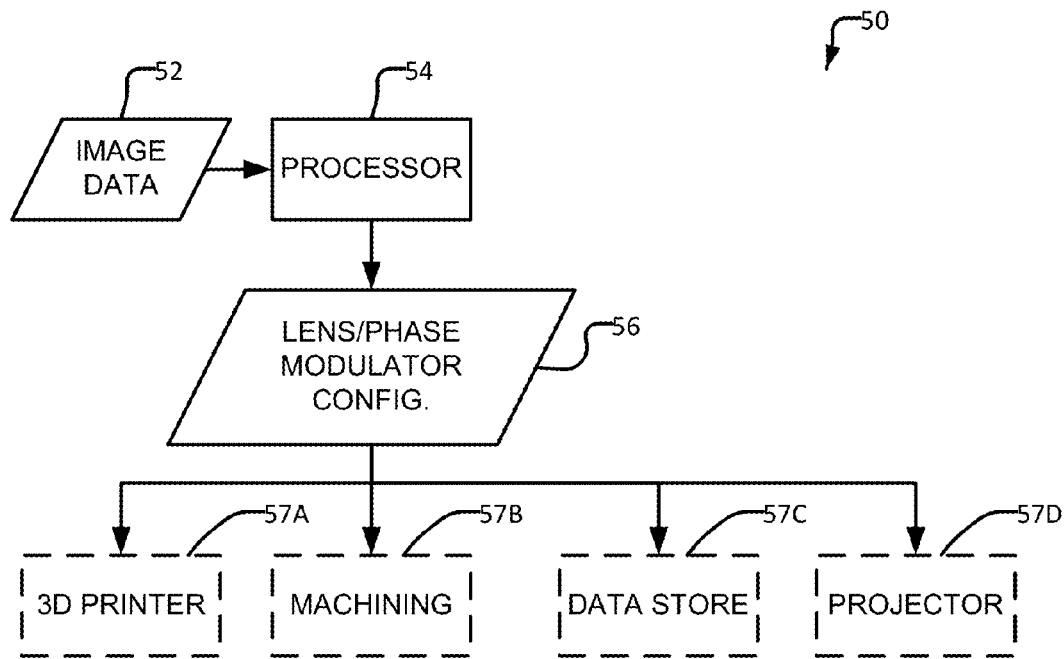
FIG. 41 is a block diagram illustrating apparatus according to an example embodiment.

The technology described herein may be implemented in various ways. FIG. 41 shows apparatus 50 according to one embodiment of the invention. Apparatus 50 comprises a processor 54 that takes in image data 52 that specifies a desired light field (which may be a picture, light pattern, video frame etc.) and produces data specifying a lens or phase modulator configuration. Data 56 may be used to control a 3D printer 57A to yield a printed physical lens or a milling machine or other machining center 57B to yield a physical lens or a mold for a physical lens or a data store 57C for later use. Data 56 may be supplied to a light projector 57D comprising a controllable lens, mirror/phase modulator or the like.

Figure 42:
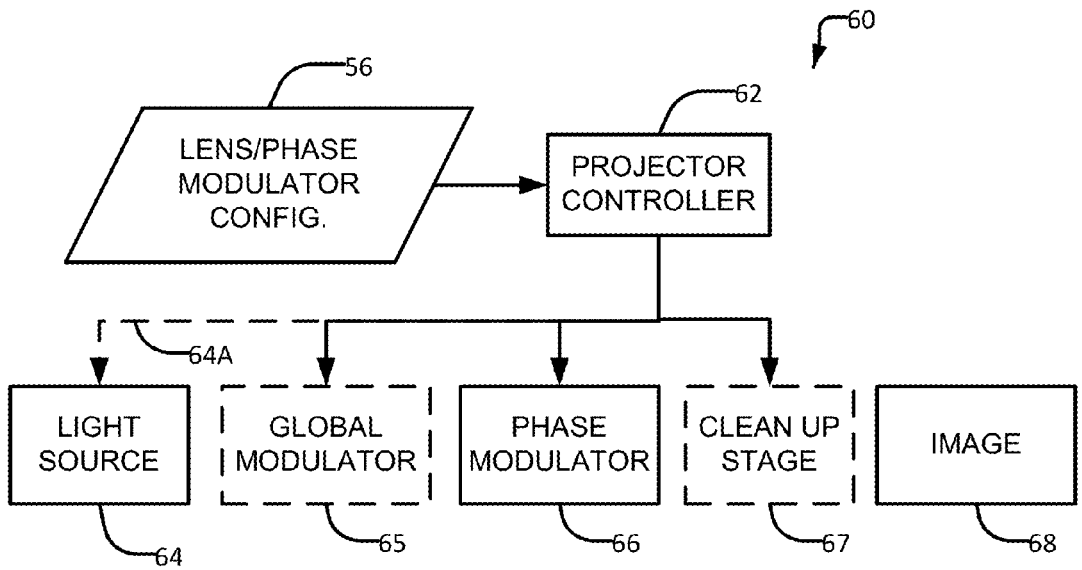
FIG. 42 is a block diagram illustrating a projector according to an example embodiment.

FIG. 42 illustrates a light projector 60 that comprises a controller 62 connected to receive data 56. Note that the functions of controller 62 and processor 54 of apparatus 50 may be combined such that light projector 60 takes in and processes image data. In other embodiments light projector 60 may work together with a pre-processor apparatus that partially performs the functions of apparatus 50. Light projector 60 may then perform further steps to process the data.

Projector 60 includes a light source 64 and a phase modulator 66. In some embodiments phase modulator 66 is replaced by a dynamically variable mirror or dynamically variable lens. Phase modulator 66 is controlled by display controller 62 to adjust the phase of light incident from light source 64 on a pixel-by-pixel basis to cause a desired image to be displayed at image 68. Image 68 may comprise a surface onto which light is projected from the front or rear for example.

Projector 60 may include one or more mechanisms to adjust the average brightness of a projected image to match the image data. The illustrated embodiment includes an optional control signal 64A which varies light output of light source 64. The illustrated embodiment also includes an optional global modulator 65 such as a variable aperture in the light path between light source 64 and phase modulator 66. Global modulator 65 is operable to controllably attenuate the light incident at phase modulator 66. In another example embodiment phase modulator 66 is configured to direct some light away from image 68 in cases where directing all light received from light source 64 to image 68 would result in higher than desired average image luminance.

Projector 60 also includes an optional clean up stage 67. Clean up stage 67 may comprise a spatial light modulator such as an LCD panel or digital mirror device or the like that is capable of adjusting transmission of light to image 66 on a pixel basis. Clean up stage 67 may be used to adjust average luminance of projected image and also may be used to correct for artifacts in the projected images.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Software may include or consist of instructions for configuring a configurable logic device such as a FPGA to implement logic for executing a method. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, video projectors, video processors, video editors, audio-visual receivers, displays (such as televisions), digital cinema projectors, media players, multi-processor systems, microprocessor-based or programmable consumer electronics, network PCs, mini-computers, mainframe computers, and the like as well as other devices suitable for the purposes described herein. Those skilled in the relevant art will appreciate that aspects of the system can be practised with other communications, data processing, or computer system configurations.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

The following are non-limiting enumerated example embodiments of the disclosed invention.

1. A method for controlling a phase modulator to display an image defined by image data, the method comprising:
    defining a plurality of non-overlapping source regions on a two-dimensional phase modulator and a plurality of display regions at a display plane, each of the source regions having a boundary and a source area and being associated with a corresponding one of the display regions; each of the display regions having a corresponding display region area;
    based on the image data, assigning a target light intensity value to each of a plurality of the display regions;
    adjusting: a configuration for the source regions; or a configuration for the display regions; or configurations for both the source regions and the display regions such that ratios of the display areas of the display regions to the source areas of the corresponding source regions is proportional to a ratio of source light intensity values for the source regions to the target light intensity value assigned to the corresponding display region;
    generating a phase surface for each of the source areas, the phase surface configured to redirect light incident on the source area onto the corresponding display area; and
    controlling the phase modulator to provide the phase surfaces for the source regions and illuminating the source regions with incident light according to the source intensity values.

2. A method according to example aspect 1 (or any other example aspect herein) comprising determining target source areas based on the image data and adjusting the configuration for the source regions by performing an optimization to determine configurations for the boundaries of the source regions which best satisfy an objective function which quantifies aggregate deviations of the areas of the source regions from the target source areas corresponding to the source regions.

3. A method according to example aspect 2 (or any other example aspect herein) wherein generating the phase surfaces comprises, based on the configurations of the source region boundaries after the optimization, determining a normal vector for each of the source regions and integrating the normal vectors to yield a solution phase function relating a phase of the phase modulator to position in two dimensions.

4. A method according to example aspect 2 (or any other example aspect herein) wherein the source regions comprise non-overlapping source tiles defined by lines extending between a plurality of source vertices, each of the source vertices having a location and wherein the display regions comprise non-overlapping display tiles defined by lines extending between a plurality of display vertices.

5. A method according to example aspect 4 (or any other example aspect herein) wherein the source tiles and display tiles are triangles.

6. A method according to example aspect 4 or 5 (or any other example aspect herein) wherein the optimization determines optimized locations for the source vertices.
7. A method according to example aspect 1 (or any other example aspect herein) comprising adjusting the configuration for the source regions by performing a median cut algorithm.
8. A method according to example aspect 1 (or any other example aspect herein) or example aspect 7 wherein generating the phase surface for each of the source areas comprises generating the phase surface corresponding to a parabolic lens.
9. A method according to example aspect 8 (or any other example aspect herein) comprising defining the parabolic lens by a pair of focal lengths on orthogonal directions based on differences in size of the source areas and corresponding display areas in the orthogonal directions.
10. A method according to example aspect 9 (or any other example aspect herein) wherein defining the parabolic lens comprises specifying slopes in the two orthogonal directions, the slopes based on displacements of the source regions relative to the target regions in the orthogonal directions.
11. A method according to any one of example aspects 1 to 10 (or any other example aspect herein) wherein generating the phase surface comprises low-pass filtering.
12. A method according to any one of example aspects 1 to 11 (or any other example aspect herein) wherein generating the phase surface comprises phase wrapping.
13. A method according to any one of example aspects 1 to 12 (or any other example aspect herein) wherein illuminating the source regions comprises controlling an output of a light source based on the image data.
14. A method according to example aspect 13 (or any other example aspect herein) comprising controlling the output of the light source based on an average luminance of the image.
15. A method according to example aspect 13 or 14 (or any other example aspect herein) wherein controlling the output of the light source comprises passing the output of the light source through a variable aperture and controlling a size of the variable aperture.
16. A method according to any one of example aspects 13 to 15 (or any other example aspect herein) wherein controlling the output of the light source comprises varying an intensity of the light source.
17. A method according to any one of example aspects 1 to 16 (or any other example aspect herein) wherein at least 95% of the light redirected by each of source regions falls within the corresponding display region.
18. A method according to any one of example aspects 1 to 16 (or any other example aspect herein) wherein the light redirected by each of the source regions substantially fills the corresponding display region.
19. A method according to any one of example aspects 1 to 18 (or any other example aspect herein) comprising passing light from the phase modulator to the display regions by way of an array of integrating rods.
20. A method according to any one of example aspects 1 to 19 (or any other example aspect herein) comprising amplitude modulating light from the display regions.
21. A method for controlling a phase modulator to display an image defined by image data, the method comprising:
providing a model of a two-dimensional light source comprising a plurality of non-overlapping source regions, each of the source regions having a boundary, a corresponding source light intensity value and a source area and being associated with a corresponding display region of a display, each of the display regions having a corresponding display area;
based on the image data, assigning a light intensity value to each of the display regions;
setting a target source area for each of the source regions such that a ratio of the target source area of the source region to the display area of the corresponding display region is proportional to a ratio of the light intensity value assigned to the corresponding display region to the source light intensity value for the source region;
performing an optimization to determine configurations for the boundaries of the source regions which best satisfy an objective function which quantifies aggregate deviations of the areas of the source regions from the target source areas corresponding to the source regions;
based on the configurations of the source region boundaries after the optimization, determining a normal vector for each of the source regions;
integrating the normal vectors to yield a solution phase function relating a phase of the phase modulator to position in two dimensions.
22. A method according to example aspect 21 (or any other example aspect herein) wherein the source regions comprise non-overlapping source tiles defined by lines extending between a plurality of source vertices, each of the source vertices having a location and wherein the display regions comprise non-overlapping display tiles defined by lines extending between a plurality of display vertices.
23. A method according to example aspect 22 (or any other example aspect herein) wherein the source tiles and display tiles are triangles.
24. A method according to example aspect 22 or 23 (or any other example aspect herein) wherein the optimization determines optimized locations for the source vertices.
25. A method according to example aspect 22 or 23 (or any other example aspect herein) wherein the normal vectors are located at the source vertices.
26. A method according to any one of example aspects 21 to 25 (or any other example aspect herein) wherein determining the normal vectors for the source vertices is based on in-plane displacements of the source vertices relative to corresponding ones of the display vertices.
27. A method according to example aspect 22 (or any other example aspect herein) wherein determining the normal vectors comprises determining inverse tangents of the quotients of the displacements and an optical distance between the light source and the display.
28. A method according to any one of example aspects 21 to 27 (or any other example aspect herein) comprising determining the source light intensities based on an average intensity of the image data.
29. A method according to example aspect 28 (or any other example aspect herein) comprising controlling an illumination source illuminating a phase modulator according to the source light intensities.
30. A method according to any one of example aspects 21 to 29 (or any other example aspect herein) wherein the source light intensities are equal.
31. A method according to any one of example aspects 21 to 30 (or any other example aspect herein) wherein optimizing comprises including a cost for curl of the solution phase function.

32. A method according to example aspect 31 (or any other example aspect herein) wherein the cost for curl is determined according to $E_{\nabla x}(V^*)=\Sigma_{j=1}{}^m\int_{x\in t_j}(\nabla\times\Psi_j(V^*-V,x))^2 dx$.
33. A method according to any one of example aspects 21 to 32 (or any other example aspect herein) wherein optimizing comprises including a cost for non-smoothness of the solution phase function.
34. A method according to example aspect 33 (or any other example aspect herein) wherein the cost for non-smoothness of the solution phase function is determined according to $E_\nabla(V^*)=\Sigma_{j=1}{}^m\int_{x\in t_j}(\nabla\Psi_j(V^*))^2 dx$.

35. A method according to any one of example aspects 21 to 34 (or any other example aspect herein) wherein the source regions are triangles.
36. A method according to any one of example aspects 21 to 35 (or any other example aspect herein) wherein the display regions are triangles.
37. A method according to any one of example aspects 21 to 36 (or any other example aspect herein) wherein optimizing comprises applying a limited memory Broyden-Fletcher-Goldfarb-Shanno algorithm.
38. A method according to any one of example aspects 21 to 37 (or any other example aspect herein) comprising performing the optimization in a series of iterations at progressively finer scales such that, in each iteration the number of source vertices and display vertices is increased and the vertex positions for an immediately previous iteration are used as starting configurations for a current iteration.
39. A method according to any one of example aspects 21 to 38 (or any other example aspect herein) wherein integrating comprises resampling the normal vectors to provide a resampled normal vector for each pixel of the phase modulator.
40. A method according to example aspect 39 (or any other example aspect herein) wherein resampling comprises performing Phong interpolation on the normal vectors.
41. A method according to any one of example aspects 21 to 40 (or any other example aspect herein) wherein integrating comprises applying a sparse optimization method.
42. A method according to example aspect 41 (or any other example aspect herein) wherein the sparse optimization method comprises finding the solution phase function that minimizes a difference between a gradient of the solution phase function and a field of the normal vectors.
43. A method according to example aspect 42 (or any other example aspect herein) wherein the difference is a weighted difference that magnifies normal errors in dark regions of the image.
44. A method according to any one of example aspects 21 to 43 comprising initializing the source regions and display regions to uniform triangulations.
45. A method according to any one of example aspects 21 to 44 comprising constraining the optimization to require all of the source regions to have positive area.
46. A method according to example aspect 45 (or any other example aspect herein) wherein constraining the optimization comprises including in the objective function a penalty term for each source region (or any other example aspect herein) wherein the penalty term is proportional to an area of the source region and has a sign opposite to a term of the objective function that quantifies the aggregate deviations of the areas of the source regions from the target source areas and the method comprises successively reducing a proportionality parameter in the penalty term in each of a plurality of iterations wherein the positions for the vertices determined in one of the plurality of iterations are used as an initial condition for a next one of the plurality of iterations.
47. A method according to any one of example aspects 21 (or any other example aspect herein) wherein a luminance within at least one of the display regions exceeds a full screen white level.
48. A method according to example aspect 47 (or any other example aspect herein) wherein a peak luminance exceeds 30 times a full screen white level.
49. A method according to any one of example aspects 21 to 48 (or any other example aspect herein) comprising amplitude modulating light incident on the phase modulator such that different ones of the source regions are illuminated by light of different intensities.
50. A method according to any one of example aspects 21 to 48 (or any other example aspect herein) comprising uniformly illuminating the phase modulator.
51. A method for generating a desired light pattern, the method comprising:
    establishing a correspondence between source regions on a phase retarding modulator and corresponding display regions in an image plane;
    determining from image data desired optical power densities for the display regions;
    adjusting one or both of the source regions and the display regions using the image data to achieve a distribution of power densities in the display regions corresponding to the image data; and
    controlling the phase modulator to provide a pattern of phase shifts operative to redistribute light from each of the source regions of the imaging chip to a corresponding one of the display regions by scaling and/or shifting light incident on the source regions of the phase modulator.
52. A method according to example aspect 51 (or any other example aspect herein) comprising configuring the source regions to provide lenses having focal lengths configured to provide the scaling.
53. A method according to example aspect 52 (or any other example aspect herein) wherein the lenses have different focal lengths in x- and y-directions.
54. A method according to example aspect 52 (or any other example aspect herein) comprising configuring the lenses to include slopes configured to provide the shifting.
55. A method according to example aspect 54 (or any other example aspect herein) comprising separately controlling the slopes in x- and y-directions.
56. A method according to any one of example aspects 51 to 55 (or any other example aspect herein) wherein controlling the phase modulator comprises phase wrapping the pattern of phase shifts.
57. A method according to any one of example aspects 51 to 55 (or any other example aspect herein) comprising varying the areas of the source regions.
58. A method according to any one of example aspects 51 to 57 (or any other example aspect herein) comprising varying the areas of the display regions.
59. A method according to any one of example aspects 51 to 58 (or any other example aspect herein) wherein the source regions are rectangular.
60. A method according to any one of example aspects 51 to 59 (or any other example aspect herein) wherein the display regions are rectangular.

61. A method according to any one of example aspects 51 to 60 (or any other example aspect herein) wherein the source regions are triangular.
62. A method according to any one of example aspects 51 to 60 (or any other example aspect herein) wherein the display regions are triangular.
63. A method according to any one of example aspects 51 to 62 (or any other example aspect herein) wherein ratios of areas of the source regions to the corresponding display regions are at least equal to a ratio of optical power density at the source region to a maximum optical power density specified in the image data for the corresponding display region.
64. A method according to any one of example aspects 51 to 62 (or any other example aspect herein) comprising clipping the image data to yield clipped image data wherein ratios of areas of the source regions to the corresponding display regions are at least equal to a ratio of optical power density at the source region to a maximum optical power density specified in the clipped image data for the corresponding display region.
65. A method according to any one of example aspects 51 to 62 (or any other example aspect herein) wherein ratios of areas of the source regions to the corresponding display regions are at least equal to a ratio of optical power density at the source region to a mean optical power density specified in the image data for the corresponding display region.
66. A method according to any one of example aspects 51 to 65 (or any other example aspect herein) wherein the optical power density within at least one of the display regions exceeds a full screen white level.
67. A method according to example aspect 66 (or any other example aspect herein) wherein a luminance of at least one of the display regions exceeds 40 times the full screen white level.
68. A method according to example aspect 66 (or any other example aspect herein) wherein a luminance of at least one of the display regions exceeds 30 times the full screen white level.
69. A method according to any one of example aspects 51 to 69 (or any other example aspect herein) comprising spatially amplitude modulating light incident on the phase modulator such that different ones of the source regions are illuminated by light of different intensities.
70. A method according to any one of example aspects 51 to 69 (or any other example aspect herein) comprising uniformly illuminating the phase modulator.
71. A method according to any one of example aspects 51 to 70 (or any other example aspect herein) comprising homogenizing light that has been redirected by the phase modulator.
72. A method according to example aspect 71 (or any other example aspect herein) wherein homogenizing the light comprises passing the light through an array of integration rods.
73. A method according to any one of example aspects 51 to 73 (or any other example aspect herein) comprising calculating the pattern of phase shifts for the phase modulator on a source region-by-source region basis.
74. A method according to any one of example aspects 51 to 73 (or any other example aspect herein) comprising establishing a first grid of points in one of the source regions and a second grid of points in a display region corresponding to the source region such that there is a 1 to 1 correspondence between the points of the first and second grids of points, determining path lengths corresponding to pairs of corresponding ones of the points in the first and second grids of points and setting the a pattern of phase shifts in the source region according to the path lengths.
75. A method according to example aspect 74 (or any other example aspect herein) wherein the path lengths extend perpendicular to a plane associated with the display region.
76. A method according to example aspect 74 (or any other example aspect herein) wherein the path lengths extend perpendicular to a parabolic surface associated with the display region.
77. A method according to any one of example aspects 74 to 76 (or any other example aspect herein) wherein the first grid of points comprises one point for each pixel of the phase modulator within the source region.
78. A method according to example aspect 51 (or any other example aspect herein) wherein adjusting one or both of the source regions and the display regions comprises executing an optimization algorithm to find boundaries for the source regions and/or the corresponding display regions such that ratios of the areas of the source regions to the corresponding display regions provide a best match to target optical power densities for the source regions.
79. A method according to example aspect 78 (or any other example aspect herein) wherein the optimization algorithm comprises a cost function term that penalizes curl in a field of points defining the source regions.
80. A method according to example aspect 78 or 79 (or any other example aspect herein) wherein the optimization algorithm comprises a cost function term that penalizes lack of smoothness of the pattern of phase shifts.
81. A method for generating a light pattern defined by image data, the method comprising:
for each of a plurality of light source regions determining a size and location for a corresponding display region;
controlling a phase modulator to emulate an array of lenses, each of the lenses corresponding to one of the light source regions and configuring the plurality of lenses to have focal lengths and slopes such that light incident on each of the plurality of lenses is redirected onto the corresponding display region.
82. A method according to example aspect 81 (or any other example aspect herein) comprising setting the sizes of the display regions such that ratios of the areas of the source regions to the areas of the corresponding display regions are proportional to luminance of the source regions to luminance specified by the image data for the corresponding display region.
83. A method according to example aspect 82 (or any other example aspect herein) wherein determining sizes and locations for the display regions comprises processing the image data to iteratively:
divide a part of the image into plural parts such that areas of the plural parts decrease with increases in average luminance specified by the image data for the plural parts.
84. A method according to example aspect 83 (or any other example aspect herein) wherein dividing the part of the image into plural parts comprises dividing the part of the image into two parts.
85. A method according to example aspect 83 or 84 (or any other example aspect herein) wherein the parts are rectangular in outline.
86. A method according to example aspect 81 (or any other example aspect herein) wherein determining the sizes and locations for the display regions comprises performing a plurality of iterations of a median cut algorithm.

87. A method according to any one of example aspects 81 to 86 (or any other example aspect herein) wherein controlling the phase modulator comprises generating a phase surface corresponding to the array of lenses and low-pass filtering the phase surface.

88. A method according to any one of example aspects 81 to 87 (or any other example aspect herein) wherein configuring the lenses comprises phase wrapping.

89. A method according to any one of example aspects 81 to 87 (or any other example aspect herein) comprising controlling an output of the light source based on the image data.

90. A method according to example aspect 88 (or any other example aspect herein) comprising controlling the output of the light source based on an average luminance of the light pattern.

91. A method according to example aspect 88 or 89 (or any other example aspect herein) wherein controlling the output of the light source comprises passing the output of the light source through a variable aperture and controlling a size of the variable aperture.

92. A method according to any one of example aspects 89 to 91 (or any other example aspect herein) wherein controlling the output of the light source comprises varying an intensity of the light source.

93. A method according to any one of example aspects 81 to 92 (or any other example aspect herein) wherein the display regions are non-overlapping.

94. A method according to any one of example aspects 81 to 93 (or any other example aspect herein) wherein at least 95% of the light redirected by each of the lenses falls within the corresponding display region.

95. A method according to any one of example aspects 81 to 94 (or any other example aspect herein) wherein the light redirected by each of the lenses substantially fills the corresponding display region.

96. A method according to any one of example aspects 81 to 94 (or any other example aspect herein) comprising redirecting the light onto the corresponding display regions by way of an array of integrating rods.

97. A method according to any one of example aspects 81 to 96 (or any other example aspect herein) comprising amplitude modulating light from the display regions.

98. A method according to example aspect 97 (or any other example aspect herein) wherein amplitude modulating the light comprises controlling pixels of a spatial light modulator located to interact with the light.

99. A program product comprising a non-transitory data storage medium having recorded thereon computer-readable instructions which, when executed by a data processor, cause the data processor to execute a method according to any one of example aspects 1 to 98 (or any other example aspect herein).

100. A program product comprising a non-transitory data storage medium having recorded thereon machine-readable instructions which, when executed by a data processor, cause the data processor to configure a programmable logic device to perform a method according to any one of example aspects 1 to 98 (or any other example aspect herein).

101. A light projector comprising:
a free form lens illuminated by a light source; and
a controller connected to control a configuration of the free form lens, the controller configured to:
associate pixels of the free form lens to a plurality of source regions, each of the source regions corresponding to a display region;
based on image data, adjust relative sizes of the source and corresponding display regions; and
control the pixels within each source region to cause light incident on the source region to illuminate the corresponding display region.

102. A projector according to example aspect 101 (or any other example aspect herein) wherein the free form lens comprises a spatial phase modulator and the controller is connected to control phase retardations provided by pixels of the spatial phase modulator.

103. A projector according to example aspect 101 or 102 (or any other example aspect herein) wherein the controller is configured to control an optical power of light from the light source incident on the free form lens in response to the image data.

104. A projector according to example aspect 103 (or any other example aspect herein) wherein the controller is operative to control amplitudes and/or widths and/or duty cycle of power supplied to the light source.

105. A projector according to example aspect 103 or 104 (or any other example aspect herein) wherein the controller is connected to control an optical element operable to selectively direct a portion of light emitted by the light source to a light dump.

106. A projector according to any one of example aspects 103 to 105 (or any other example aspect herein) comprising a variable aperture in an optical path between the light source and the free form lens wherein the controller is operable to control an opening of the aperture.

107. A projector according to any one of example aspects 101 to 106 (or any other example aspect herein) comprising an upstream spatial light modulator in an optical path between the light source and the free form lens wherein the controller is connected to control the upstream spatial light modulator to differently illuminate different ones of the source regions.

108. A projector according to any one of example aspects 101 to 107 (or any other example aspect herein) comprising a downstream spatial light modulator located in an optical path downstream from the free form lens, the controller connected to control pixels of the downstream spatial light modulator to vary amplitudes of light in a light pattern produced by the projector at a target plane.

109. A projector according to example aspect 108 (or any other example aspect herein) wherein the downstream spatial light modulator has a resolution sufficient to provide a plurality of pixels operable to modulate light from each of the display regions.

110. A projector according to any one of example aspects 101 to 109 (or any other example aspect herein) comprising an array of integration rods in an optical path between the free form lens and the display regions wherein the controller is operable to control the free form lens to selectively steer different amounts of light into different ones of the integrating rods.

111. A projector according to any one of example aspects 101 to 110 (or any other example aspect herein) wherein the controller comprises a programmed data processor.

112. A projector according to any one of example aspects 101 to 111 (or any other example aspect herein) wherein the controller comprises a configurable logic unit and a data store comprising instructions for configuring the configurable logic unit.

113. A projector according to example aspect 112 (or any other example aspect herein) wherein the configurable logic unit comprises a FPGA.

114. Apparatus for controlling a free form lens to display an image defined by image data, the apparatus comprising a processor configured by software instructions to:
define a plurality of non-overlapping source regions on a two-dimensional phase modulator and a plurality of display regions at a display plane, each of the source regions having a boundary and a source area and being associated with a corresponding one of the display regions; each of the display regions having a corresponding display region area;
based on the image data, assign a target light intensity value to each of a plurality of the display regions; and
determine: a configuration for the source regions; or a configuration for the display regions; or configurations for both the source regions and the display regions such that ratios of the display areas of the display regions to the source areas of the corresponding source regions is proportional to a ratio of source light intensity values for the source regions to the target light intensity value assigned to the corresponding display region and the configuration causes light incident on a source area to be redirected onto the corresponding display area.

115. Apparatus according to example aspect 114 (or any other example aspect herein) comprising a driver circuit connectable to drive a free form lens.

116. Apparatus according to example aspect 114 or 115 (or any other example aspect herein) wherein the free form lens comprises a spatial phase modulator and the apparatus is configured to generate a phase surface for each of the source areas.

117. Apparatus according to any one of example aspects 114 to 116 (or any other example aspect herein) comprising an optimizer configured to perform an optimization to determine configurations for the boundaries of the source regions which best satisfy an objective function which quantifies aggregate deviations of the areas of the source regions from the target source areas corresponding to the source regions.

118. Apparatus according to example aspect 117 (or any other example aspect herein) wherein the optimizer comprises a curl regularizer.

119. Apparatus according to example aspect 117 or 118 (or any other example aspect herein) wherein the optimizer comprises a smoothness regularizer.

120. Apparatus for controlling a phase modulator to display an image defined by image data, the apparatus comprising:
a controller configured with a model of a two-dimensional light source comprising a plurality of non-overlapping source regions, each of the source regions having a boundary, a corresponding source light intensity value and a source area and being associated with a corresponding display region of a display, each of the display regions having a corresponding display area;
the controller configured by software instructions to cause the controller to:
based on the image data, assign a light intensity value to each of the display regions;
set a target source area for each of the source regions such that a ratio of the target source area of the source region to the display area of the corresponding display region is proportional to a ratio of the light intensity value assigned to the corresponding display region to the source light intensity value for the source region;
perform an optimization to determine configurations for the boundaries of the source regions which best satisfy an objective function which quantifies aggregate deviations of the areas of the source regions from the target source areas corresponding to the source regions;
based on the configurations of the source region boundaries after the optimization, determine a normal vector for each of the source regions; and
integrate the normal vectors to yield a solution phase function relating a phase of the phase modulator to position in two dimensions.

121. Apparatus for generating a desired light pattern, the apparatus comprising:
a light source;
a phase retarding modulator illuminated by the light source;
a controller configured to:
establish a correspondence between source regions on the phase retarding modulator and corresponding display regions in an image plane;
determine from image data desired optical power densities for the display regions;
adjust one or both of the source regions and the display regions using the image data to achieve a distribution of power densities in the display regions corresponding to the image data; and
control the phase modulator to provide a pattern of phase shifts operative to redistribute light from each of the source regions of the imaging chip to a corresponding one of the display regions by scaling and/or shifting light incident on the source regions of the phase modulator.

122. Apparatus for generating a light pattern defined by image data, the apparatus comprising:
a light source;
a phase modulator illuminated by the light source;
a controller configured to, for each of a plurality of light source regions: determine a size and location for a corresponding display region; and
control the phase modulator to emulate an array of lenses, each of the lenses corresponding to one of the light source regions and configuring the plurality of lenses to have focal lengths and slopes such that light incident on each of the plurality of lenses is redirected onto the corresponding display region.

123. A controller for a light projector comprising a data processor, and a data store comprising computer-readable instructions for execution by the data processor, the instructions configured to cause the data processor to execute a method according to any one of example aspects 1 to 99.

124. A method for controlling a free form lens to display an image defined by image data, the method comprising:
defining a plurality of non-overlapping source regions on the free form lens and a plurality of display regions at a display plane, each of the source regions having a boundary and a source area and one or more source intensity values and being associated with a corresponding one of the display regions; each of the display regions having a corresponding display region area;
based on the image data, assigning a target light intensity value to each of a plurality of the display regions;
adjusting: a configuration for the source regions; or a configuration for the display regions; or configurations for both the source regions and the display regions such that ratios of the display areas of the display regions to the source areas of the corresponding source regions is proportional to a ratio of source light intensity values for the source regions to the target light intensity value assigned to the corresponding display region;

generating a configuration for the free form lens in each of the source areas, the configuration arranged to redirect light incident on the source area onto the corresponding display area; and controlling the free form lens according to the configuration and illuminating the source regions with incident light according to the source intensity values.

125. Apparatus having any new and inventive feature, combination of features, or sub-combination of features as described herein.

126. Methods having any new and inventive steps, acts, combination of steps and/or acts or sub-combination of steps and/or acts as described herein.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for generating a desired light pattern, the method comprising:
   establishing a correspondence between source regions on a phase retarding modulator and corresponding display regions in an image plane;
   determining from image data desired optical power densities for the display regions;
   adjusting one or both of the source regions and the display regions using the image data to achieve a distribution of power densities in the display regions corresponding to the image data;
   controlling the phase retarding modulator to provide a pattern of phase shifts operative to redistribute light from each of the source regions of the phase retarding modulator to a corresponding one of the display regions by scaling and/or shifting light incident on the source regions of the phase retarding modulator;
   configuring the source regions to provide lenses having focal lengths configured to provide the scaling; and
   configuring the lenses to include slopes configured to provide the shifting.

2. A method according to claim 1 comprising separately controlling the slopes in x- and y-directions.

3. A method for generating a desired light pattern, the method comprising:
   establishing a correspondence between source regions on a phase retarding modulator and corresponding display regions in an image plane;
   determining from image data desired optical power densities for the display regions;
   adjusting one or both of the source regions and the display regions using the image data to achieve a distribution of power densities in the display regions corresponding to the image data; and
   controlling the phase retarding modulator to provide a pattern of phase shifts operative to redistribute light from each of the source regions of the phase retarding modulator to a corresponding one of the display regions by scaling and/or shifting light incident on the source regions of the phase retarding modulator;
   wherein ratios of areas of the source regions to the corresponding display regions are at least equal to a ratio of optical power density at the source region to a maximum optical power density specified in the image data for the corresponding display region.

4. A method according to claim 3 comprising configuring the source regions to provide lenses having focal lengths configured to provide the scaling.

5. A method according to claim 4 wherein the lenses have different focal lengths in x- and y-directions.

6. A method according to claim 3 wherein controlling the phase retarding modulator comprises phase wrapping the pattern of phase shifts.

7. A method according to claim 3 comprising varying the areas of the source regions.

8. A method according to claim 7 comprising varying the areas of the display regions.

9. A method according to claim 3 wherein the source regions are triangular and the display regions are triangular.

10. A method according to claim 3 comprising clipping the image data to yield clipped image data wherein the maximum optical power density corresponds to that specified in the clipped image data.

11. A method according to claim 3 wherein the optical power density within at least one of the display regions exceeds a full screen white level.

12. A method according to claim 3 wherein a luminance of at least one of the display regions exceeds 30 times a full screen white level.

13. A method according to claim 3 comprising spatially amplitude modulating light incident on the phase retarding modulator such that different ones of the source regions are illuminated by light of different intensities.

14. A method according to claim 3 comprising uniformly illuminating the phase retarding modulator.

15. A method according to claim 3 comprising homogenizing light that has been redirected by the phase retarding modulator.

16. A method according to claim 15 wherein homogenizing the light comprises passing the light through an array of integration rods.

17. A method according to claim 3 comprising calculating the pattern of phase shifts for the phase retarding modulator on a source region-by-source region basis.

18. A method according to claim 3 comprising establishing a first grid of points in one of the source regions and a second grid of points in a display region corresponding to the source region such that there is a 1to 1correspondence between the points of the first and second grids of points, determining path lengths corresponding to pairs of corresponding ones of the points in the first and second grids of points and setting the pattern of phase shifts in the source region according to the path lengths.

19. A method according to claim 18 wherein the path lengths extend perpendicular to a plane associated with the display region.

20. A method according to claim 18 wherein the path lengths extend perpendicular to a parabolic surface associated with the display region.

21. A method according to claim 18 wherein the first grid of points comprises one point for each pixel of the phase retarding modulator within the source region.

22. A method according to claim 3 wherein adjusting one or both of the source regions and the display regions comprises executing an optimization algorithm to find boundaries for the source regions and/or the corresponding display regions such that ratios of the areas of the source regions to the corresponding display regions provide a best match to target optical power densities for the source regions.

23. A method for generating a desired light pattern, the method comprising:
    establishing a correspondence between source regions on a phase retarding modulator and corresponding display regions in an image plane;
    determining from image data desired optical power densities for the display regions;
    adjusting one or both of the source regions and the display regions using the image data to achieve a distribution of power densities in the display regions corresponding to the image data; and
    controlling the phase retarding modulator to provide a pattern of phase shifts operative to redistribute light from each of the source regions of the phase retarding modulator to a corresponding one of the display regions by scaling and/or shifting light incident on the source regions of the phase retarding modulator;
    wherein ratios of areas of the source regions to the corresponding display regions are at least equal to a ratio of optical power density at the source region to a mean optical power density specified in the image data for the corresponding display region.

24. A method according to claim 23 comprising configuring the source regions to provide lenses having focal lengths configured to provide the scaling wherein the lenses have different focal lengths in x- and y- directions.

25. A method according to claim 23 comprising varying the areas of the source regions and/or the display regions.

26. A method according to claim 23 comprising calculating the pattern of phase shifts for the phase retarding modulator on a source region-by-source region basis.

27. A method according to claim 23 comprising establishing a first grid of points in one of the source regions and a second grid of points in a display region corresponding to the source region such that there is a 1 to 1 correspondence between the points of the first and second grids of points, determining path lengths corresponding to pairs of corresponding ones of the points in the first and second grids of points and setting the pattern of phase shifts in the source region according to the path lengths.

28. A method according to claim 23 wherein adjusting one or both of the source regions and the display regions comprises executing an optimization algorithm to find boundaries for the source regions and/or the corresponding display regions such that ratios of the areas of the source regions to the corresponding display regions provide a best match to target optical power densities for the source regions.

29. A method for generating a desired light pattern, the method comprising:
    establishing a correspondence between source regions on a phase retarding modulator and corresponding display regions in an image plane;
    determining from image data desired optical power densities for the display regions;
    adjusting one or both of the source regions and the display regions using the image data to achieve a distribution of power densities in the display regions corresponding to the image data; and
    controlling the phase retarding modulator to provide a pattern of phase shifts operative to redistribute light from each of the source regions of the phase retarding modulator to a corresponding one of the display regions by scaling and/or shifting light incident on the source regions of the phase retarding modulator;
    wherein adjusting one or both of the source regions and the display regions comprises executing an optimization algorithm to find boundaries for the source regions and/or the corresponding display regions such that ratios of the areas of the source regions to the corresponding display regions provide a best match to target optical power densities for the source regions;
    and the optimization algorithm comprises a cost function term that penalizes curl in a field of points defining the source regions.

30. A method according to claim 22 wherein the optimization algorithm comprises a cost function term that penalizes lack of smoothness of the pattern of phase shifts.

* * * * *